United States Patent
Goulden et al.

(10) Patent No.: US 10,416,537 B2
(45) Date of Patent: Sep. 17, 2019

(54) HEAT SINK OF A CAMERA

(71) Applicant: GOOGLE LLC, Mountain View, CA (US)

(72) Inventors: Jason Evans Goulden, Los Gatos, CA (US); Poll Shih, New Taipei (TW)

(73) Assignee: GOOGLE LLC, Mountain View, CA (US)

( * ) Notice: Subject to any disclaimer, the term of this patent is extended or adjusted under 35 U.S.C. 154(b) by 36 days.

(21) Appl. No.: 15/209,740

(22) Filed: Jul. 13, 2016

(65) Prior Publication Data
US 2018/0011390 A1    Jan. 11, 2018

Related U.S. Application Data

(63) Continuation-in-part of application No. 29/570,403, filed on Jul. 7, 2016, now Pat. No. Des. 805,480, and
(Continued)

(51) Int. Cl.
*G03B 17/55* (2006.01)
*H04N 5/232* (2006.01)
*H04N 5/225* (2006.01)

(52) U.S. Cl.
CPC ........... *G03B 17/55* (2013.01); *H04N 5/2252* (2013.01); *H04N 5/23203* (2013.01);
(Continued)

(58) Field of Classification Search
CPC ..... G06T 3/4053; G06T 3/0093; G06T 15/50; G09G 3/00; H04N 5/208; G06K 7/1469
See application file for complete search history.

(56) References Cited

U.S. PATENT DOCUMENTS

| | | |
|---|---|---|
| 1,934,911 A | 11/1933 | Campbell |
| D234,218 S | 1/1975 | Donato |

(Continued)

FOREIGN PATENT DOCUMENTS

| | | |
|---|---|---|
| CN | 303729172 | 6/2016 |
| EM | 003361435-001 | 9/2016 |

(Continued)

OTHER PUBLICATIONS

DropCapsule Pro for Dropcam Pro, announced Jun. 7, 2015 [online], [site visited Sep. 29, 2017], Available from Internet, URL: <https://web.archive.org/web/20150607115212/http://www.connectedcrib.com/dropcapsule-pro-dropcam-pro/>.
(Continued)

*Primary Examiner* — Christopher K Peterson
(74) *Attorney, Agent, or Firm* — Morgan, Lewis & Bockius LLP

(57) ABSTRACT

This application is directed to a camera that includes a housing, a lens assembly and a plurality of electronic components. The lens assembly is arranged at a front portion of the housing and configured for focusing light received from outside of the camera. The plurality of electronic components is arranged at the front portion of the housing, and further includes an image sensor coupled to receive light through the lens assembly, a memory for storing information, a processor for processing information from the image sensor, and a wireless communication module for wirelessly communicating with an electronic device. The camera further includes a heat dissipation element arranged at a rear portion of the housing and located between the plurality of electronic components and a rear surface of the housing. The heat dissipation element is configured to transfer heat from the plurality of electronic components to the rear portion of the housing.

20 Claims, 47 Drawing Sheets

Related U.S. Application Data a continuation-in-part of application No. 29/570,417, filed on Jul. 7, 2016, now Pat. No. Des. 831,565, and a continuation-in-part of application No. 29/570,406, filed on Jul. 7, 2016, now Pat. No. Des. 831,595, and a continuation-in-part of application No. 29/570,414, filed on Jul. 7, 2016, now Pat. No. Des. 838,274, and a continuation-in-part of application No. 29/570,401, filed on Jul. 7, 2016, now Pat. No. Des. 845,373, and a continuation-in-part of application No. 29/570,412, filed on Jul. 7, 2016, now Pat. No. Des. 806,644, and a continuation-in-part of application No. 29/570,409, filed on Jul. 7, 2016, now Pat. No. Des. 838,304.

(52) U.S. Cl.
CPC ........ *G03B 2206/00* (2013.01); *H04N 5/2253* (2013.01); *H04N 5/2254* (2013.01)

(56) References Cited

U.S. PATENT DOCUMENTS

| | | |
|---|---|---|
| 3,906,592 A | 9/1975 | Sakasegawa et al. |
| 4,309,096 A | 1/1982 | Sethi |
| D268,672 S | 4/1983 | McPherson |
| 4,439,643 A | 3/1984 | Schweizer |
| D296,013 S | 5/1988 | Layne et al. |
| 5,039,366 A | 8/1991 | Strattman |
| D349,714 S | 8/1994 | Hasegawa |
| D353,904 S | 12/1994 | Swanson |
| 5,439,387 A | 8/1995 | Hayashi |
| 5,441,224 A | 8/1995 | Ludwig |
| 5,482,234 A | 1/1996 | Lyon |
| D390,482 S | 2/1998 | Pasquarette |
| D399,584 S | 10/1998 | Giese et al. |
| 6,007,136 A | 12/1999 | Zittwitz et al. |
| D427,696 S | 7/2000 | Scott et al. |
| D431,307 S | 9/2000 | Zelina, Jr. et al. |
| D433,994 S | 11/2000 | Jobs et al. |
| 6,176,142 B1 | 1/2001 | Ericson |
| 6,196,915 B1 | 3/2001 | Schiedegger et al. |
| D440,330 S | 4/2001 | Scott et al. |
| 6,234,277 B1 | 5/2001 | Kaczmarek |
| 6,644,617 B2 | 11/2003 | Pitlor |
| D488,800 S | 4/2004 | Wiener |
| 6,732,983 B1 | 5/2004 | Blake et al. |
| D506,565 S | 6/2005 | Yurich |
| D509,842 S | 9/2005 | Ou |
| D528,576 S | 9/2006 | Chung et al. |
| 7,162,790 B1 | 1/2007 | Daniels |
| D537,784 S | 3/2007 | Suckle et al. |
| D541,228 S | 4/2007 | Thursfield |
| D553,659 S | 10/2007 | Kweon |
| D554,171 S | 10/2007 | Deng |
| D566,698 S | 4/2008 | Choi et al. |
| D592,650 S | 5/2009 | Tsang et al. |
| D593,071 S | 5/2009 | Laituri et al. |
| 7,551,225 B2 | 6/2009 | Overstreet |
| 7,641,161 B2 | 1/2010 | Bauer |
| D623,594 S | 9/2010 | Akana et al. |
| D632,265 S | 2/2011 | Choi et al. |
| D640,721 S | 6/2011 | Satine |
| D644,259 S | 8/2011 | Barley et al. |
| D651,900 S | 1/2012 | Ashiwa et al. |
| D659,282 S | 5/2012 | Richmond |
| D659,497 S | 5/2012 | Blazevic |
| D660,711 S | 5/2012 | Watabe |
| D662,122 S | 6/2012 | Goodwin et al. |
| D670,426 S | 11/2012 | Bouroullec et al. |
| D689,846 S | 9/2013 | Nylen |
| D691,587 S | 10/2013 | Ferber et al. |
| D697,481 S | 1/2014 | Akana et al. |
| D700,075 S | 2/2014 | Bould et al. |
| D708,378 S | 6/2014 | Recker et al. |
| D720,755 S | 1/2015 | Nokuo |
| D729,773 S | 5/2015 | Salojarvi et al. |
| D729,923 S | 5/2015 | Chou |
| 9,024,581 B2 | 5/2015 | McGinley |
| D732,033 S | 6/2015 | Sakaguchi |
| D733,859 S | 7/2015 | Hsiao |
| D737,762 S | 9/2015 | Aumiller et al. |
| D742,573 S | 11/2015 | Kern et al. |
| D742,884 S | 11/2015 | Seflic et al. |
| D743,468 S | 11/2015 | Ribeiro et al. |
| D743,954 S | 11/2015 | Chuang et al. |
| 9,190,767 B2 | 11/2015 | Makimura |
| D747,524 S | 1/2016 | Jacq et al. |
| D750,980 S | 3/2016 | Takach et al. |
| 9,300,078 B2 | 3/2016 | Liu |
| D754,233 S | 4/2016 | Du et al. |
| D755,184 S | 5/2016 | Uranga et al. |
| D757,587 S | 5/2016 | Li |
| 9,353,487 B1 | 5/2016 | Szekely |
| D761,343 S | 7/2016 | Schmidt et al. |
| 9,388,934 B1 | 7/2016 | Kilgore et al. |
| D764,320 S | 8/2016 | Li |
| 9,437,962 B2 | 9/2016 | Liu |
| 9,451,727 B2 * | 9/2016 | Tolbert ................. H05K 1/0209 |
| D768,604 S | 10/2016 | Flowers et al. |
| D769,246 S | 10/2016 | Mielnik et al. |
| D771,800 S | 11/2016 | Englehard et al. |
| D772,391 S | 11/2016 | Zimmerli |
| D775,233 S | 12/2016 | Beck et al. |
| 9,515,414 B1 | 12/2016 | Liu |
| D776,659 S | 1/2017 | Hou |
| D776,850 S | 1/2017 | Hodgson |
| D777,672 S | 1/2017 | Park et al. |
| 9,556,641 B2 | 1/2017 | Milanowski |
| D778,878 S | 2/2017 | de Vaal |
| D778,973 S | 2/2017 | Lee et al. |
| D783,609 S | 4/2017 | Mikelson |
| D784,263 S | 4/2017 | Xu |
| D785,632 S | 5/2017 | VanDuyn et al. |
| D785,693 S | 5/2017 | Kim |
| D786,875 S | 5/2017 | Kaminaga |
| D788,112 S | 5/2017 | Liao |
| D788,708 S | 6/2017 | Vo et al. |
| D788,777 S | 6/2017 | Bargetzi |
| D789,371 S | 6/2017 | Iwamoto et al. |
| D790,620 S | 6/2017 | Lee et al. |
| D791,740 S | 7/2017 | Fuller |
| D792,468 S | 7/2017 | Langhammer et al. |
| D794,028 S | 8/2017 | Lin |
| D795,941 S | 8/2017 | Dimitriadis et al. |
| D796,513 S | 9/2017 | Feldstein et al. |
| D797,087 S | 9/2017 | Burton et al. |
| 9,771,985 B2 | 9/2017 | Peterson et al. |
| D800,886 S | 10/2017 | Lin |
| D802,760 S | 11/2017 | Neby |
| D806,644 S | 1/2018 | Mittleman et al. |
| D808,392 S | 1/2018 | Bo |
| D809,043 S | 1/2018 | Kamei |
| 9,882,305 B1 | 1/2018 | Goulden et al. |
| D810,086 S | 2/2018 | Xie |
| D810,087 S | 2/2018 | Xie |
| D810,169 S | 2/2018 | Bhattacharya |
| D811,463 S | 2/2018 | Kim |
| D813,289 S | 3/2018 | Laffon De Mazieres et al. |
| D814,544 S | 4/2018 | Moon et al. |
| D815,531 S | 4/2018 | Wahl et al. |
| D819,109 S | 5/2018 | Yamauchi et al. |
| D819,113 S | 5/2018 | Li et al. |
| D820,238 S | 6/2018 | Boshemitzan et al. |
| D821,477 S | 6/2018 | Moon et al. |
| D822,716 S | 7/2018 | Mangum et al. |
| D827,011 S | 8/2018 | Kip et al. |
| D828,425 S | 9/2018 | Piekarski et al. |
| D830,622 S | 10/2018 | Galekop |
| D831,089 S | 10/2018 | Laffon de Mazieres et al. |
| D831,565 S | 10/2018 | Mittleman et al. |
| D831,595 S | 10/2018 | Mittleman et al. |
| D832,907 S | 11/2018 | Jeong et al. |
| 2004/0031335 A1 | 2/2004 | Fromme et al. |

(56) References Cited

U.S. PATENT DOCUMENTS

| | | | |
|---|---|---|---|
| 2004/0251392 | A1 | 12/2004 | Franks, Jr. |
| 2007/0090237 | A1 | 4/2007 | Hsu |
| 2007/0184708 | A1 | 8/2007 | Murakami |
| 2008/0048079 | A1 | 2/2008 | Albritton et al. |
| 2008/0218092 | A1 | 9/2008 | Chang et al. |
| 2009/0061694 | A1 | 3/2009 | Kawasaki |
| 2009/0088010 | A1 | 4/2009 | Smith |
| 2009/0196593 | A1 | 8/2009 | Cheng |
| 2009/0196597 | A1 | 8/2009 | Messinger et al. |
| 2010/0124834 | A1 | 5/2010 | De Chazal et al. |
| 2010/0150543 | A1 | 6/2010 | Fong |
| 2011/0037387 | A1* | 2/2011 | Chou .............. F21V 29/004 315/35 |
| 2011/0053394 | A1 | 3/2011 | Hood, III |
| 2011/0181002 | A1 | 7/2011 | Fujita et al. |
| 2011/0255855 | A1 | 10/2011 | Lee et al. |
| 2011/0315733 | A1 | 12/2011 | White |
| 2012/0162929 | A1 | 6/2012 | Huang |
| 2013/0023161 | A9 | 1/2013 | Youssefi-Shams et al. |
| 2013/0130530 | A1 | 5/2013 | Casses et al. |
| 2013/0203277 | A1 | 8/2013 | Gaubert |
| 2013/0292477 | A1* | 11/2013 | Hennick ............ G06K 7/10732 235/469 |
| 2013/0302023 | A1 | 11/2013 | Chamberlayne |
| 2014/0073161 | A1 | 3/2014 | Winningham et al. |
| 2014/0099811 | A1 | 4/2014 | Chiu |
| 2014/0268578 | A1 | 9/2014 | Dolci et al. |
| 2014/0355218 | A1* | 12/2014 | Vinciarelli .......... H01R 43/205 361/728 |
| 2015/0049243 | A1* | 2/2015 | Samuels ............ G03B 17/568 348/374 |
| 2015/0100335 | A1 | 4/2015 | Englehard et al. |
| 2015/0251605 | A1 | 9/2015 | Uken et al. |
| 2015/0281650 | A1 | 10/2015 | Mohan |
| 2015/0316837 | A1 | 11/2015 | Maltese |
| 2016/0127643 | A1* | 5/2016 | Huerta ............... H04N 5/23241 348/211.2 |
| 2016/0153633 | A1* | 6/2016 | Shibata ................ F21S 41/14 362/510 |
| 2016/0182116 | A1 | 6/2016 | Mase |

FOREIGN PATENT DOCUMENTS

| | | |
|---|---|---|
| KR | 300903865000 | 4/2017 |
| KR | 300905205000 | 4/2017 |

OTHER PUBLICATIONS

DIY Project Dropcam Pro outdoor enclosure, announced Oct. 20, 2014 [online], [site visited Sep. 29, 2017], Available from Internet, URL: https://the-gadgeteer.com/2014/10/20/diy-project-dropcam-pro-outdoor-enclosure/.

Nest Learning Thermostat posted by Detriot Borg posted date Feb. 10, 2012, © YouTube, [online], [site visited Sep. 18, 2017]. Available from Internet, https://www.youtube.com/watch?v—KrgcOL4oLzc.

Nest Learning Review posted by Lindsay Turrentine posted date Apr. 23, 2013, © CNET, [online], [site visited Sep. 18, 2017]. Available from Internet, https://www.cnet.com/products/nest-learning-thermostat/review/.

HMW posted by Heres My World posted date Oct. 28, 2016, © Amazon, [online], [site visited Sep. 18, 2017]. Available from Internet, https://www.amazon.com/Pyramid-Bluetooth-Rechargeable-Hands-Free-Speakerphone/dp/B01JJ5KT3E/ref=sr_1_19?ie=UTF88,4d=1505758713&sr=8-19&keywords=bluetooth°/02Bpuck&th=1.

Google, EU Design Registration, 003303460-0001/0002, Oct. 14, 2016, 14 pgs.

Google, EU Design Registration, 003302330-0001/0002, Oct. 14, 2016, 16 pgs.

Google, EU Design Registration, 003304310-0001/0008, Oct. 20, 2016, 37 pgs.

Dropcam Pro, posted at Youtube.com, posted on Oct. 10, 2013, [online], [site visited Jun. 16, 2017]. Available from Internet, <https://www.youtube.com/watch?v=NokAzHXsCQQ> 1 pg.

Nest Cam Indoor security camera, posted at Amazon.com, posted on Jun. 17, 2015, [online], [site visited Jun. 16, 2017]. Available from Internet, https://www.amazon.com/Nest-Cam-Indoor-security-camera/dp/BOOWBJGUA2 1 pg.

Simplicam review, posted at Connectedly.com, posted on Nov. 26, 2014, [online], [site visited Jun. 16, 2017]. Available from Internet, <https://www.connectedly.com/simplicam-review> 1 pg.

Review of the googo camera HD, posted at Youtube.com, posted on Jun. 9, 2013, [online], [site visited Jun. 16, 2017]. Available from Internet, <https://www.youtube.com/watch?v=R1c8Q6oDI9k> 1 pg.

Google, Office Action, CN 201630316676.1, dated Nov. 25, 2016, 2 pgs.

Google, Office Action, CN 201630316605.1, dated Nov. 24, 2016, 1 pg.

Google, Letters Patent Design Registration, JP 1588675, Sep. 29, 2017, 3 pgs.

* cited by examiner

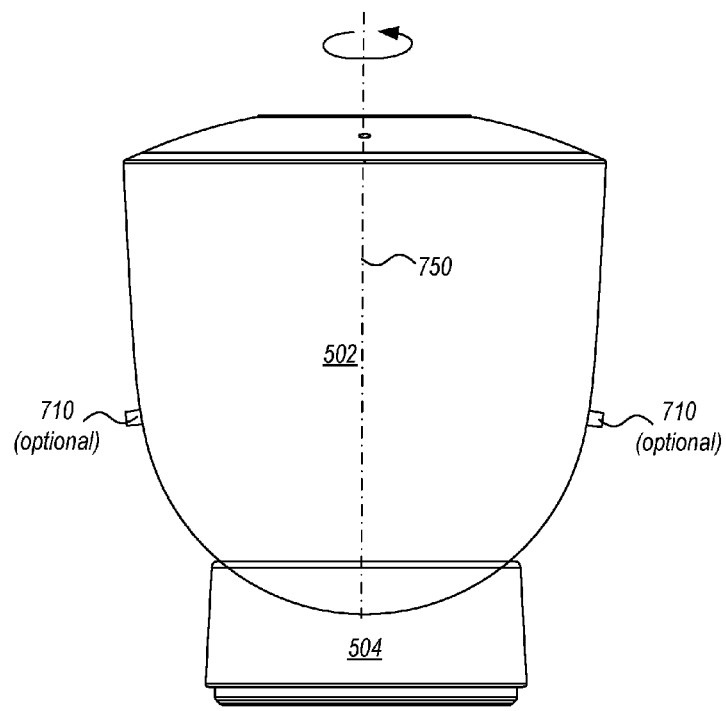
Figure 7F
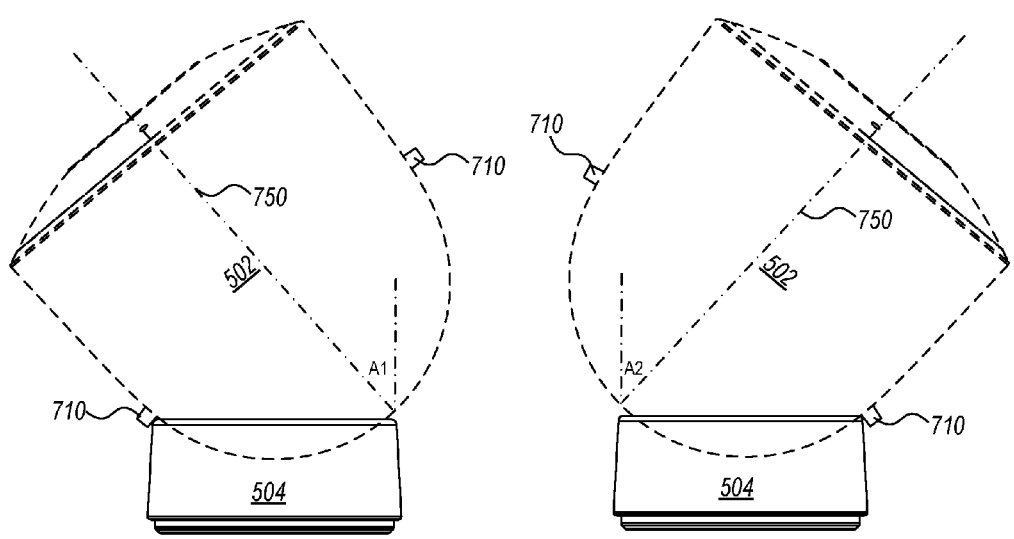
Figure 7G      Figure 7H

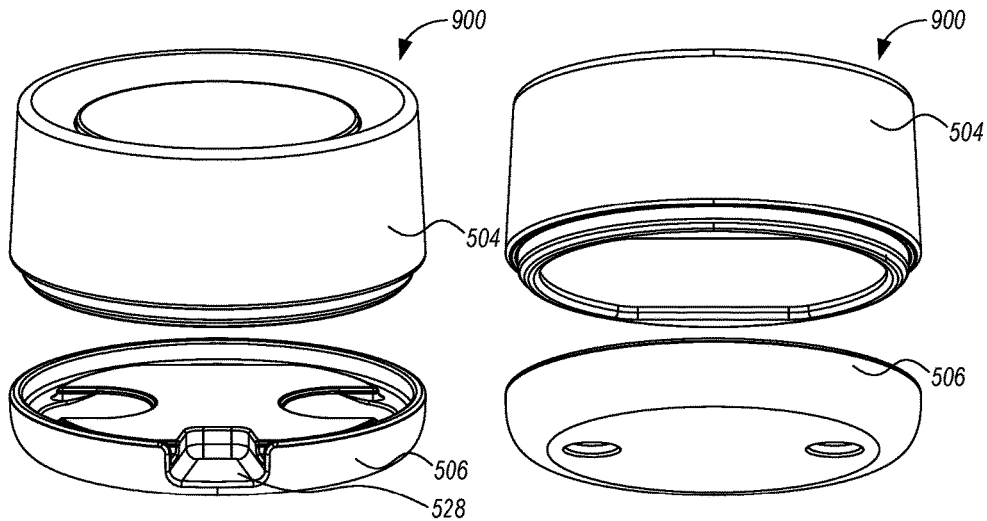
Figure 10A  Figure 10B
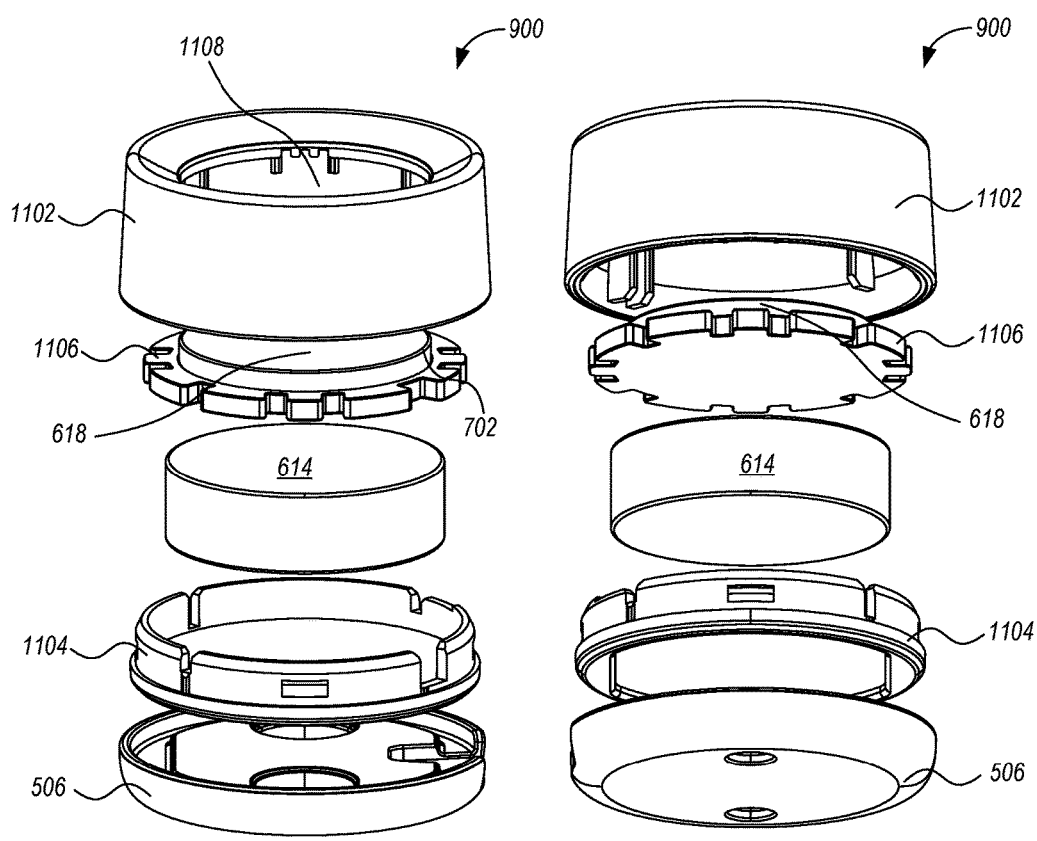
Figure 11A  Figure 11B

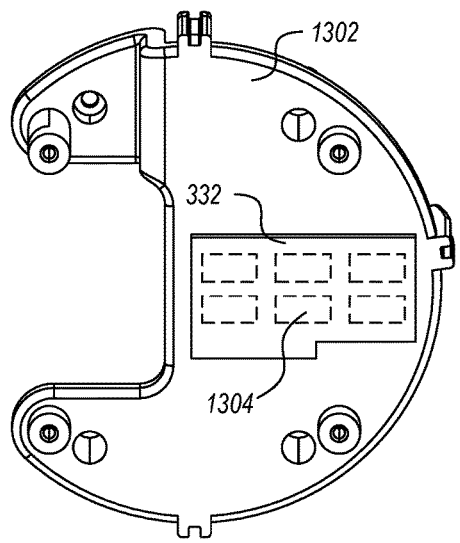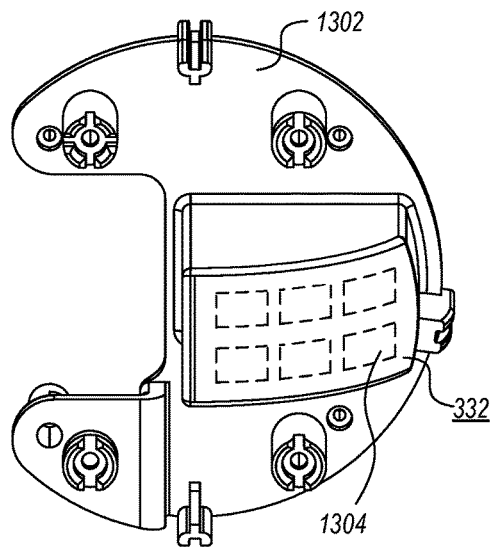
Figure 13A  Figure 13B
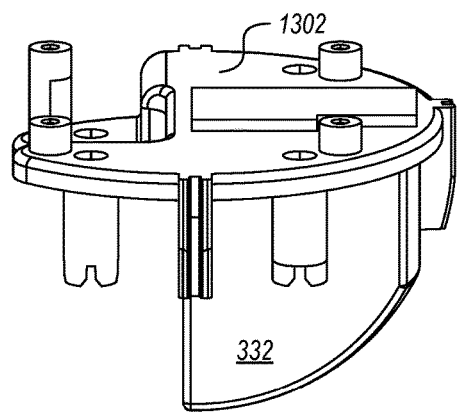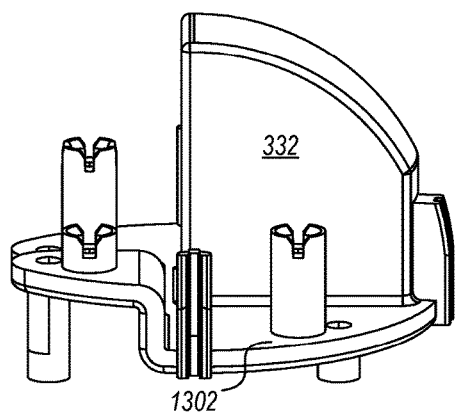
Figure 13C  Figure 13D

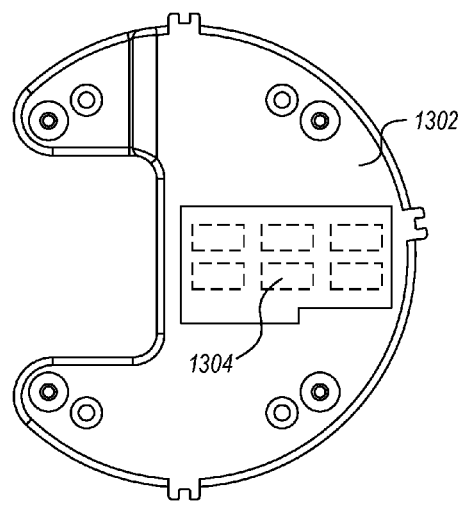
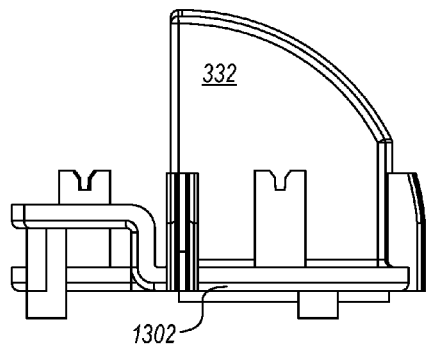
Figure 13E
Figure 13F
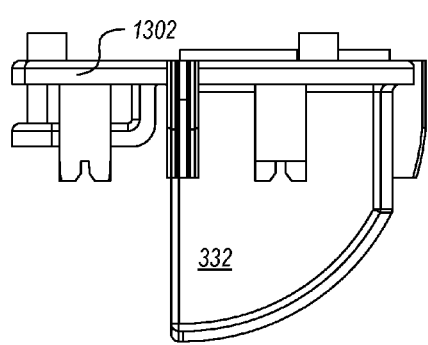
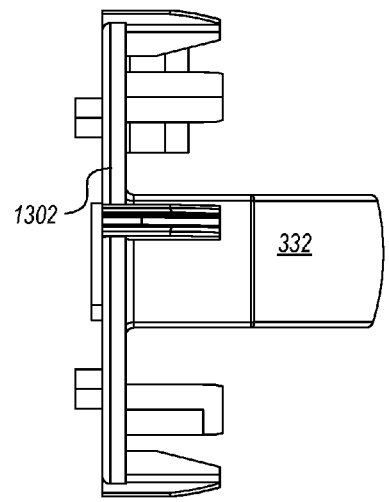
Figure 13G
Figure 13H

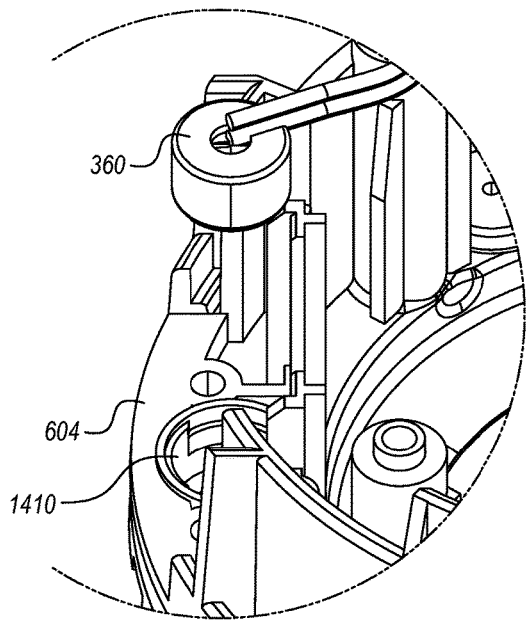
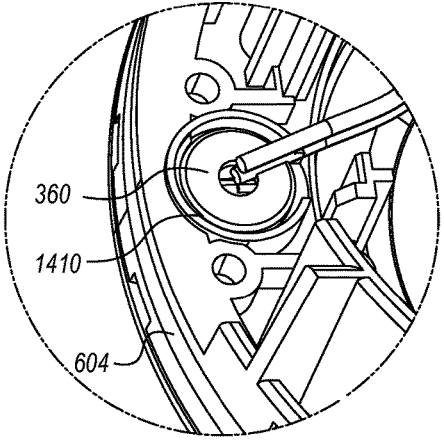
Figure 14C         Figure 14D
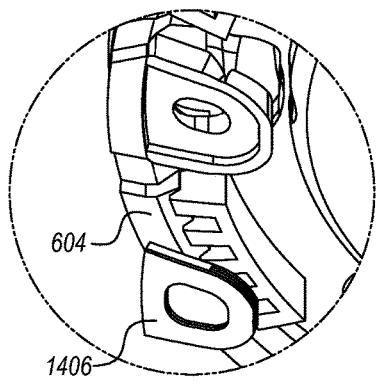
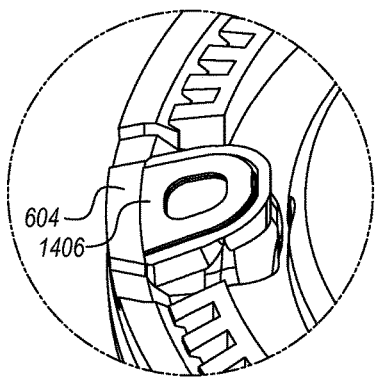
Figure 14E         Figure 14F

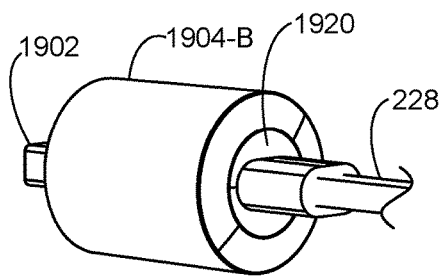 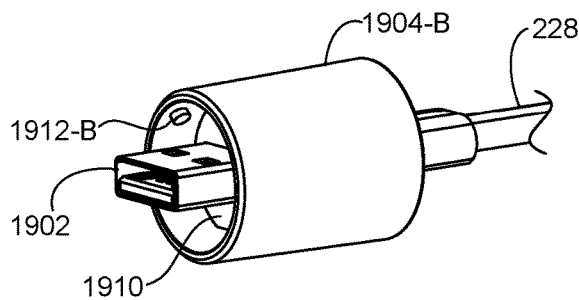
Figure 20F          Figure 20G
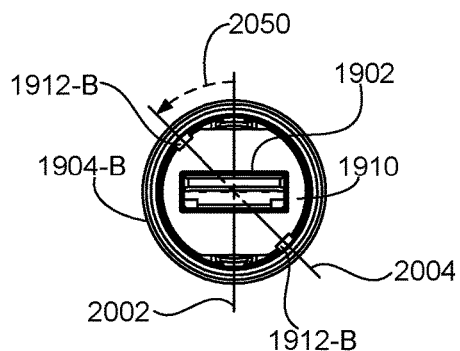 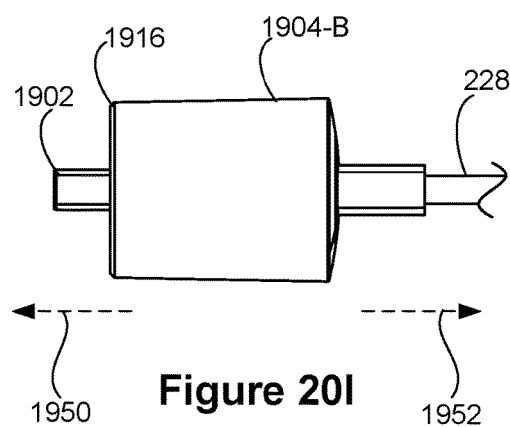
Figure 20H          Figure 20I
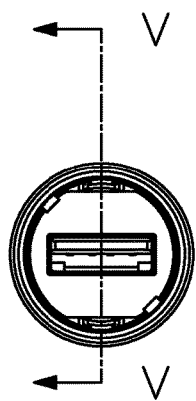 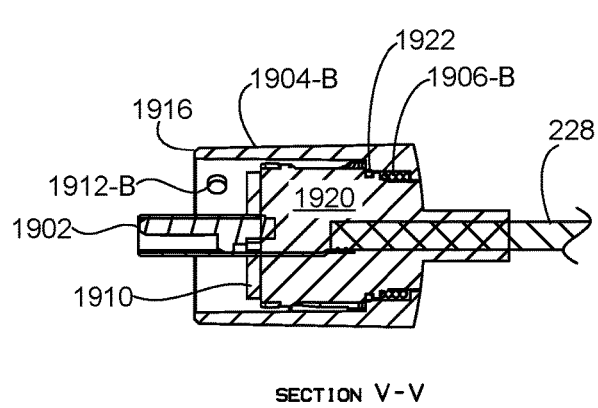
SECTION V-V
Figure 20J

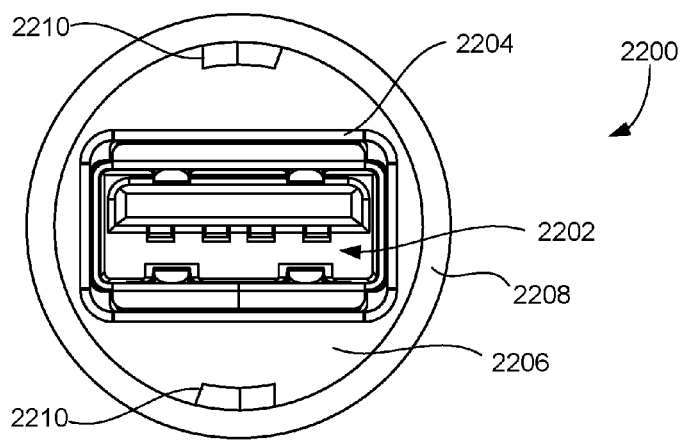
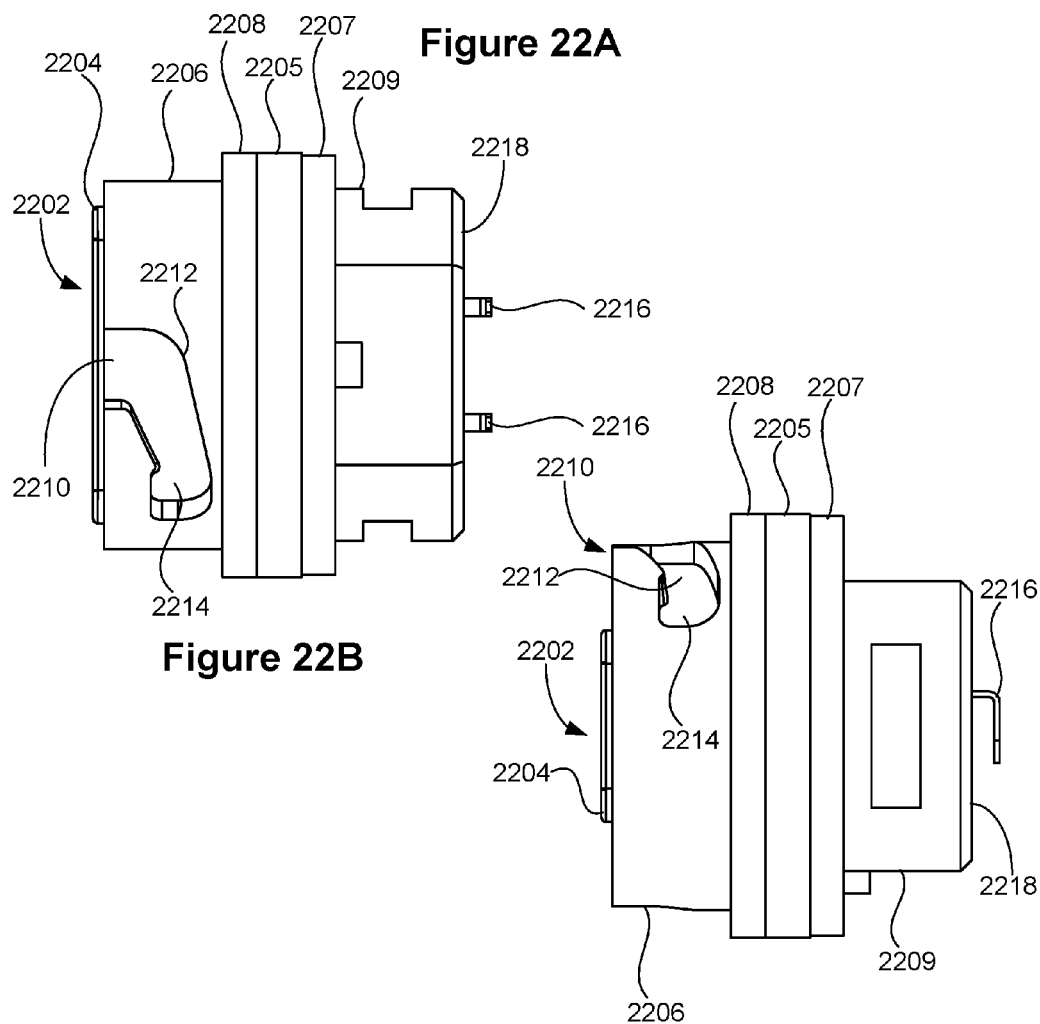
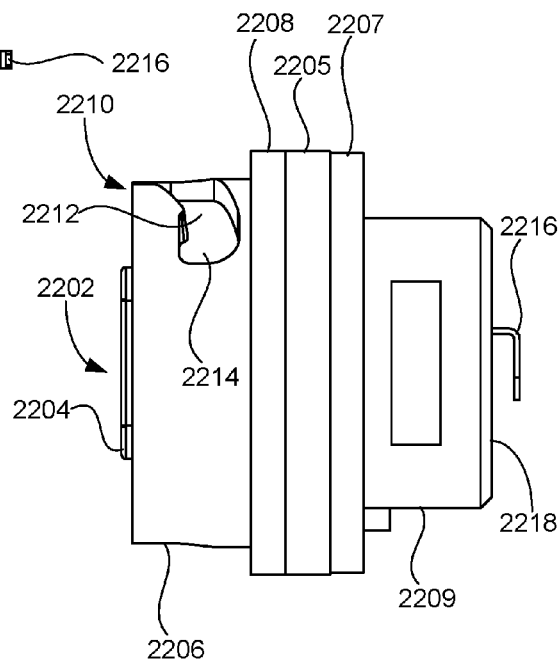

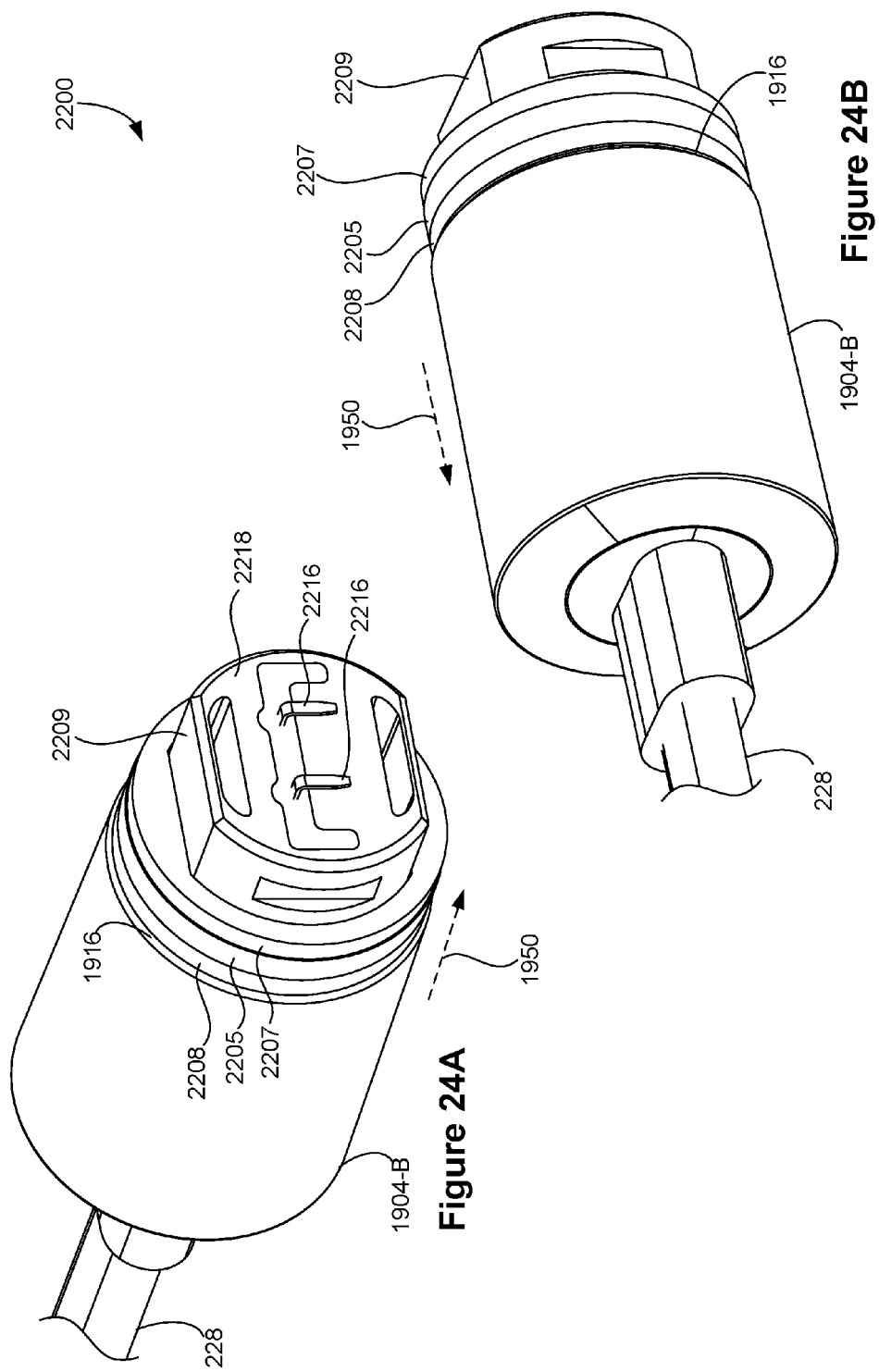

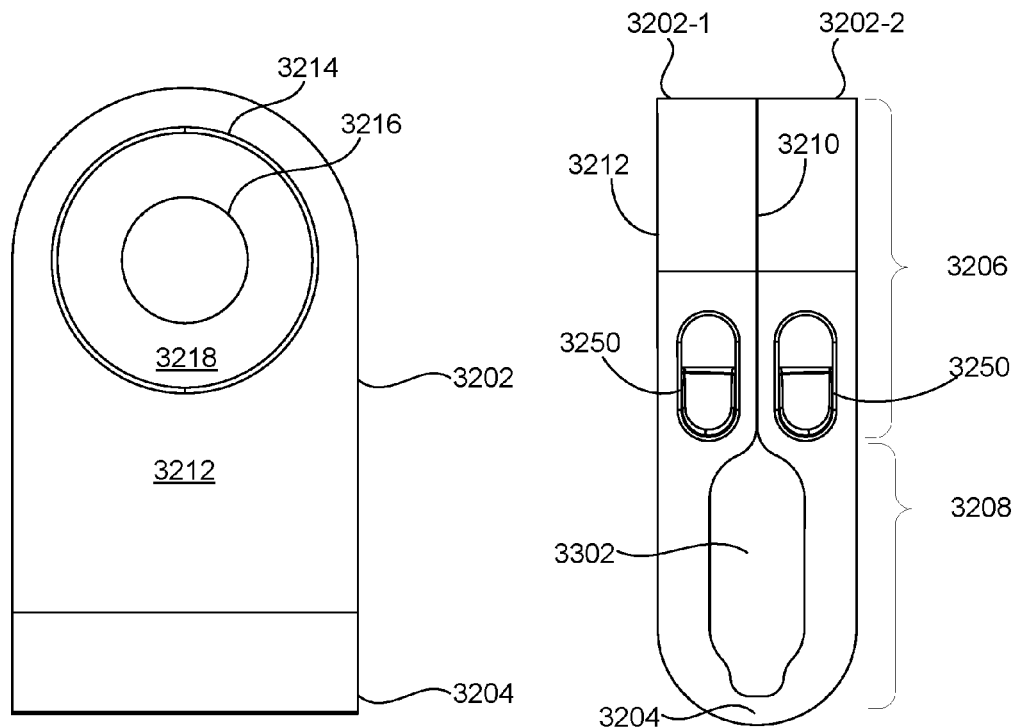
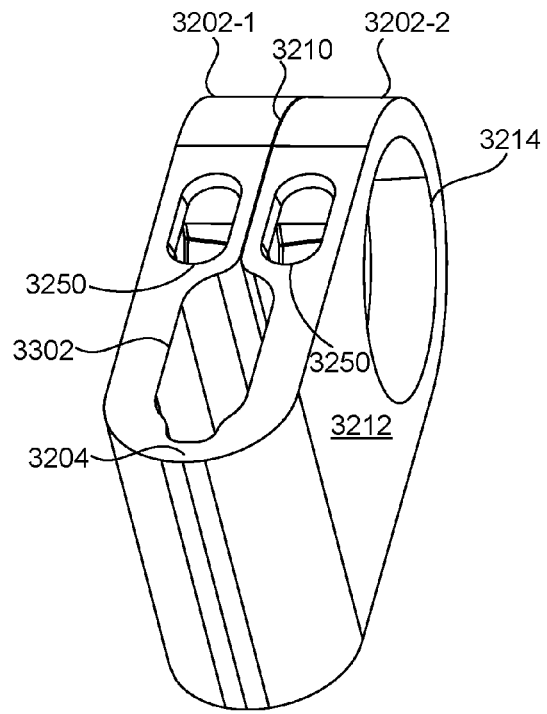
Figure 33B
Figure 33A
Figure 33C

HEAT SINK OF A CAMERA

RELATED APPLICATIONS

This application is a continuation-in-part and claims priority to the following: U.S. Design patent application No. 29/570,401, filed Jul. 7, 2016, entitled "Casing," U.S. Design patent application No. 29/570,406, filed Jul. 7, 2016, entitled "Magnet Mount," U.S. Design patent application No. 29/570,409, filed Jul. 7, 2016, entitled "Casing with Mount," U.S. Design patent application No. 29/570,412, filed Jul. 7, 2016, entitled "AC/DC Adapter," U.S. Design patent application No. 29/570,414, filed Jul. 7, 2016, entitled "Adapter Mount," U.S. Design patent application No. 29/570,417, filed Jul. 7, 2016, entitled "AC/DC Adapter with Mount," U.S. Design patent application No. 29/570,403, filed Jul. 7, 2016, entitled "Slanted Power Plug Head," all of which are hereby incorporated by reference in their entirety.

This application is related to U.S. patent application Ser. No. 15/209,735, filed Jul. 13, 2016, entitled "Magnetic Mount Assembly of a Camera," U.S. patent application Ser. No. 15/209,744, filed Jul. 13, 2016, entitled "Mounting Mechanism for Outdoor Power Converter," U.S. patent application Ser. No. 15/209,746, filed Jul. 13, 2016, entitled "Waterproof Electrical Connector," and U.S. patent application Ser. No. 15/209,749, filed Jul. 13, 2016, entitled "Clip for Securing Outdoor Cable," all of which are hereby incorporated by reference in their entirety.

TECHNICAL FIELD

This relates generally to an outdoor electronic system, including but not limited to methods and systems for mechanically supporting an electronic device and protecting the electronic device from severe weather conditions in an outdoor environment.

BACKGROUND

A smart home environment is created at a venue by integrating a plurality of smart devices, including intelligent, multi-sensing, network-connected devices, seamlessly with each other in a local area network and/or with a central server or a cloud-computing system to provide a variety of useful smart home functions. Sometimes, one or more of the smart devices is located in an outdoor environment (e.g., in a porch or a backyard of a house). For example, one or more network-connected cameras are often installed on an outer wall of a house, and configured to provide video monitoring and security in the outdoor environment. These smart devices (e.g., the network-connected outdoor cameras) are normally placed on surfaces or mounted on walls at different outdoor locations of the smart home environment, and exposed to severe weather conditions (e.g., a rainfall, a snowstorm and direct sun exposure). Each outdoor smart device must be configured to attach firmly to different types of rough surfaces/walls in various possible outdoor environments, function reliably under various severe weather conditions that could happen, and last for a long duration in the possible outdoor environments. As such, there is a need to mechanically mount a smart device to an outdoor surface in a compact and robust manner, while incorporating into the smart device some resistance mechanisms against potential severe weather conditions.

SUMMARY

Accordingly, there is a need for both an electronic device that incorporates some resistance mechanisms against severe weather conditions and a compact and robust supporting assembly that can support the electronic device in an outdoor environment. The electronic device is configured to attach to a mounting surface via a magnet mount that provides an adjustable union with the electronic device, thereby permitting adjustment of an angle of orientation of the electronic device with respect to the magnet mount. Both the electronic device and its supporting assembly (e.g., the magnet mount) could be covered with material that is substantially resistant to ultraviolet radiation caused by sun exposure. The electronic device could also include waterproof features (e.g., waterproof housing, microphone, speaker, power adapter and connectors) to deter the impact of a rainfall or a snowstorm. The electronic device is optionally a smart sensor device or a camera that is disposed in a smart home environment.

In accordance with one aspect of this application, a physical assembly includes a magnet mount for physically receiving a physical module that further includes a housing having a rear surface of a first shape. The magnet mount further includes a first surface, a second surface and a magnetic material. The first surface is configured to attach to a mounting surface directly or indirectly. In an example, the assembly further includes a magnetic mounting structure configured to be attached and fixed onto the mounting surface, and the first surface of the magnet mount is configured to attach to the mounting surface indirectly via the magnetic mounting structure. The second surface opposes the first surface and has a second shape that is substantially complementary to the first shape of the rear surface of the housing of the physical module. The second surface is configured to engage the rear surface of the housing of the physical module. The magnetic material is disposed between the first and second surfaces and is configured to magnetically couple to a magnetic material of the physical module. When the physical module is magnetically coupled to the magnet mount, an adjustable union between the magnet mount and the physical module is formed that permits adjustment of an angle of orientation of the physical module with respect to the magnet mount. The angle of orientation is limited by a stopping structure of the physical module. In some implementations, the first shape of the rear surface of the housing of the physical module is substantially convex, and the second shape of the second surface of the magnet mount is substantially concave.

In accordance with another aspect of this application, a waterproof electronic device includes a housing, a first transducer, a first hydrophobic membrane and a first sound transmission channel. The housing includes a first opening, and is sealed against water intrusion apart from the first opening. The first transducer is disposed inside the housing, and has a sound input region offset from the first opening. The first hydrophobic membrane is affixed to the first interior surface of the housing and covers the first opening thereon. The first hydrophobic membrane is configured to allow transmission of sound waves and block water intrusion from the first opening. The first sound transmission channel that couples the sound input region of the first transducer to the first opening of the housing. The first sound transmission channel is configured to allow sound waves transmitted through the first opening and the first hydrophobic membrane to be coupled to the sound input region of the first transducer without exposing the sound input region to damaging pressures due to environmental impacts on the waterproof electronic device. In some implementations, the first transducer is one of a microphone and a speaker.

In accordance with another aspect of the application, a camera includes a housing, a lens assembly and a plurality of electronic components. The lens assembly is arranged at a front portion of the housing and configured for focusing light received from outside of the camera. The plurality of electronic components is arranged at the front portion of the housing, and further includes an image sensor coupled to receive light through the lens assembly, a memory for storing information, a processor for processing information from the image sensor, and a wireless communication module for wirelessly communicating with an electronic device. The camera further includes a heat dissipation element arranged at a rear portion of the housing and located between the plurality of electronic components and a rear surface of the housing. The heat dissipation element is configured to transfer heat from the plurality of electronic components to the rear portion of the housing. In some implementations, the heat dissipation element includes a plate and a heat sink. The heat sink is made of thermally conductive material and coupled to the plurality of electronic components to absorb the heat generated by the plurality of electronic components. The heat sink is also mechanically and thermally coupled to the plate to further transfer at least part of the generated heat to the plate. The plate is coupled between the heat sink and an interior surface of the rear portion of the housing, and configured to at least partially dissipate heat generated by the plurality of electronic components, such that the heat is directed away from the front portion of the camera where sensitive optical or electrical components are located.

In accordance with another aspect of the application, a mounting plate for attaching an electronic device to a mounting surface includes an opening in a center of the mounting plate, the opening configured to receive a mounting fastener for securing the mounting plate to the mounting surface; and a first polygonal fastener structure configured to mate with a complementary second polygonal fastener structure of the electronic device. When the first and second fastener structures are mechanically mated to each other, the electronic device is fixed to the mounting plate; and when the mounting fastener is secured to the mounting surface through the opening of the mounting plate, the mounting plate is rotatable with respect to the mounting surface such that when the electronic device is fixed onto the mounting plate and the mounting plate is secured to the mounting surface by the mounting fastener, the electronic device and the mounting plate have an unlimited range of rotation with respect to the mounting surface and substantially consistent resistance through the unlimited range of rotation.

In accordance with another aspect of the application, a waterproof power adapter includes a waterproof housing enclosing an AC to DC converter having an AC power supply input and a DC power supply output; a fixed, waterproof AC power connection for coupling an external power supply to the AC power supply input; a female connector, a sealing structure, and a locking mechanism. A portion of the female connector is coupled within the housing to the DC power supply output. An exposed portion of the female connector is configured to couple a DC power supply voltage provided at the DC power supply output to a complementary and separate male connector, the exposed portion being exposed to environmental conditions when not coupled to the male connector. The sealing structure is configured to engage with a cover of the male connector in a sealed position to provide a waterproof environment around an electrical connection formed when the female connector is coupled to the male connector. The locking mechanism is configured to releasably tighten and lock the cover of the male connector in the sealed position when the female and the male connectors are coupled to one another.

In accordance with another aspect of the application, a system for securing an electronic device to a surface includes a plurality of clips. Each clip includes a first finger and a second finger made from a single piece of flexible material. Each of the first and second fingers includes a peripheral portion and an inner portion contiguous with the peripheral portion, the inner portions of the first and second fingers being connected at a flexion point. The first and second fingers are configured to be held in an open position when not under tension and in a closed position wherein they touch each other at their peripheral portions when under sufficient tension, where the peripheral portion of each of the first and second fingers includes a respective through hole, and when the first and second fingers of the clip are held in the closed position, the inner portions of the first and second fingers form an opening to accommodate a contour of a cable of predetermined thickness and cross-sectional profile, and the through holes of the first and second fingers are aligned and configured to receive a fixing fastener configured to fix the clip onto the surface. Each clip is configured to wrap around the cable and couple to the surface on either side of the cable, the cable extending from the electronic device. The plurality of clips are arranged along the length of the cable.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 7F-7H illustrate an angle of orientation of a camera module with respect to a magnet mount in accordance with some implementations.

FIGS. 10A and 10B are two perspective views of a mounting assembly including a magnet mount and a mounting structure presented in an exploded manner in accordance with some implementations.

FIGS. 11A and 11B are another two perspective views of a mounting assembly including a magnet mount and a mounting structure presented in an exploded manner in accordance with some implementations.

FIGS. 13A-13D are four perspective views of a heat sink that is mounted on a backside of a board in accordance with some implementations, and FIGS. 13E-13H are a top view and three side views of a heat sink that is mounted on a backside of a board in accordance with some implementations.

FIGS. 14C-14F illustrate a process of assembling a microphone onto a front enclosure structure of a camera module in accordance with some implementations.

FIGS. 20F-20M illustrate further multiple views of the male connector of a waterproof electrical connector, showing the cover of the male connector in a closed state, in accordance with some implementations.

FIGS. 22A-22C and 23A-23B illustrates multiple views of a female connector of the waterproof electrical connector, in accordance with some implementations.

FIGS. 24A-24B illustrate multiple perspective views of the male and female components of the waterproof electrical connector connected together and with the cover in the locked state, in accordance with some implementations.

FIGS. 33A-33C illustrate multiple views of the cable clip in the closed position, in accordance with some implementations.

Like reference numerals refer to corresponding parts throughout the several views of the drawings.

DESCRIPTION OF IMPLEMENTATIONS

In accordance with various implementations of the present invention, a supporting assembly is applied to support an electronic device at different locations in a smart home environment (particularly in an outdoor environment). The electronic device includes, but is not limited to, a surveillance camera, a microphone, a speaker, a thermostat, a hazard detector, or other types of smart devices. The supporting assembly includes a magnet mount fixed with respect to a mounting surface for physically receiving the electronic device, and an optional mounting structure for supporting the magnet mount and the electronic device mounted thereon. The magnet mount of the supporting assembly is configured to provide an adjustable angle of orientation to the electronic device, such that the electronic device mounted thereon can be oriented differently with respect to the magnet mount and the mounting surface. The electronic device further includes an extended cable for connecting to a power adapter that is electrically coupled to a mains power system via a wall plug. The extended cable could be fixed onto the mounting surface via one or more cable clips, while the power adapter is fixed onto a mounting plate mounted on the mounting surface. In some implementations, one or more of the electronic device, the power adapter, the extended cable, the cable clips, the magnet mount and the mounting plate are coated with matte material that enhances contact between any two adjacent components and protects surfaces of the respective components from decoloring caused by ultraviolet light incident thereon. In some implementations, the electronic device is installed and applied in an outdoor environment. The electronic device and the power adapter are configured to adopt waterproof features (e.g., waterproof Universal Serial Bus (USB) connectors, waterproof microphone and speaker) to deter water permeation into electronic components to cause irreversible damages to the electronic components. As such, the electronic device is supported by a compact and robust supporting assembly in a smart home environment (particularly in an outdoor environment), and is configured to operate reliably under severe weather conditions.

Figure 1:
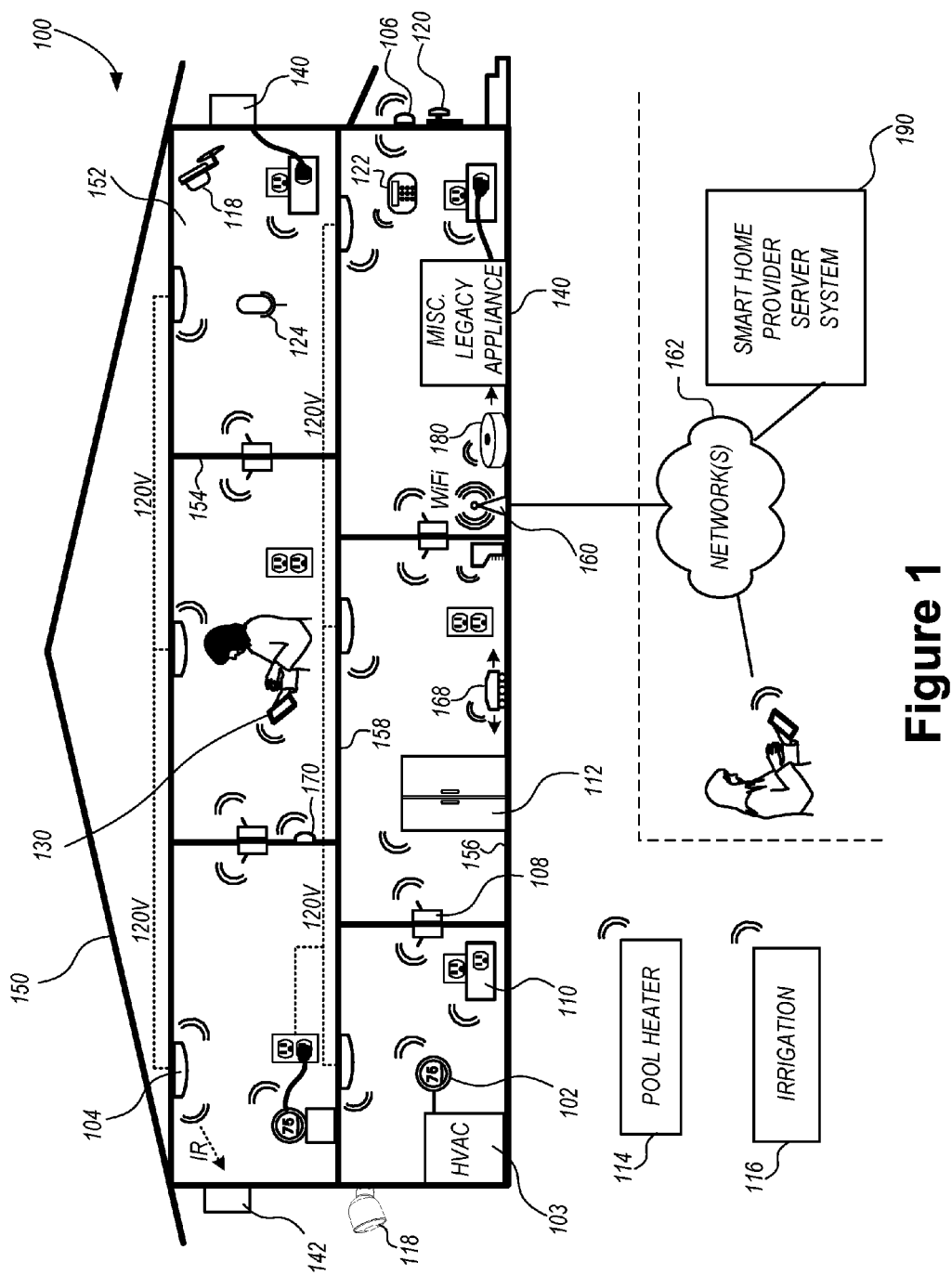
FIG. 1 is an example smart home environment in accordance with some implementations.

FIG. 1 is an example smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, one or more devices in the smart home environment 100 need not be physically within the structure 150. For example, a device controlling a pool heater 114 or irrigation system 116 may be located outside of the structure 150. The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network and/or with a central server or a cloud-computing system (e.g., a smart home provider server system 190) to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), one or more intelligent, multi-sensing, network-connected alarm systems 122 (hereinafter referred to as "smart alarm systems 122"), one or more intelligent, multi-sensing, network-connected wall switches 108 (hereinafter referred to as "smart wall switches 108"), and one or more intelligent, multi-sensing, network-connected wall plug interfaces 110 (hereinafter referred to as "smart wall plugs 110"). In some implementations, the smart home environment 100 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108. The smart home environment 100 may also include communication with devices outside of the physical home but within a proximate geographical range of the home. For example, the smart home environment 100 may include a pool heater monitor 114 and/or an irrigation monitor 116.

In some implementations, the smart home environment 100 includes one or more network-connected cameras 118 that are configured to provide video monitoring and security in the smart home environment 100. Referring to FIG. 1, cameras 118 are optionally mounted on an interior or exterior wall 154 of the structure 150. In some implementations, cameras 118 also capture video when other conditions or hazards are detected, in order to provide visual monitoring of the smart home environment 100 when those conditions or hazards occur. The cameras 118 may be used to determine occupancy of the structure 150 and/or particular rooms 152 in or near the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). For example, cameras 118 may additionally include one or more sensors (e.g., IR sensors, motion detectors), input devices (e.g., microphone for capturing audio), and output devices (e.g., speaker for outputting audio).

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104. The smart home environment 100 may include one or more sound and/or vibration sensors (e.g., microphone 124) for detecting sounds and/or vibrations. These sensors may stand alone or be integrated with any of the devices described above. Optionally, the sound sensors detect sound above a decibel threshold. Optionally, the vibration sensors detect vibration above a threshold directed at a particular area (e.g., vibration on a particular window when a force is applied to break the window).

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 130 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 130. In some examples, some or all of the occupants (e.g., individuals who live in the home) may register their device 130 with the smart home environment 100. Such registration may be made at a central server (e.g., a smart home provider server system 190) to authenticate the occupant and/or the device as being associated with the home and to give permission to the occupant to use the device to control the smart devices in the home. An occupant may use their registered device 130 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 130, the smart home environment 100 may make inferences about which individuals live in the home and are therefore occupants and which devices 130 are associated with those individuals. As such, the smart home environment may "learn" who is an occupant and permit the devices 130 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 402.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 190 (also called a central server system and/or a cloud-computing system herein). The smart home provider server system 190 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 190 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart devices to match capabilities of the highly capable smart devices of the same type, integrates functionality of multiple different device types—even across different communication protocols, and is configured to streamline adding of new devices and commissioning of the hub device.

It is to be appreciated that the term, "smart home environments," may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

Figure 2:
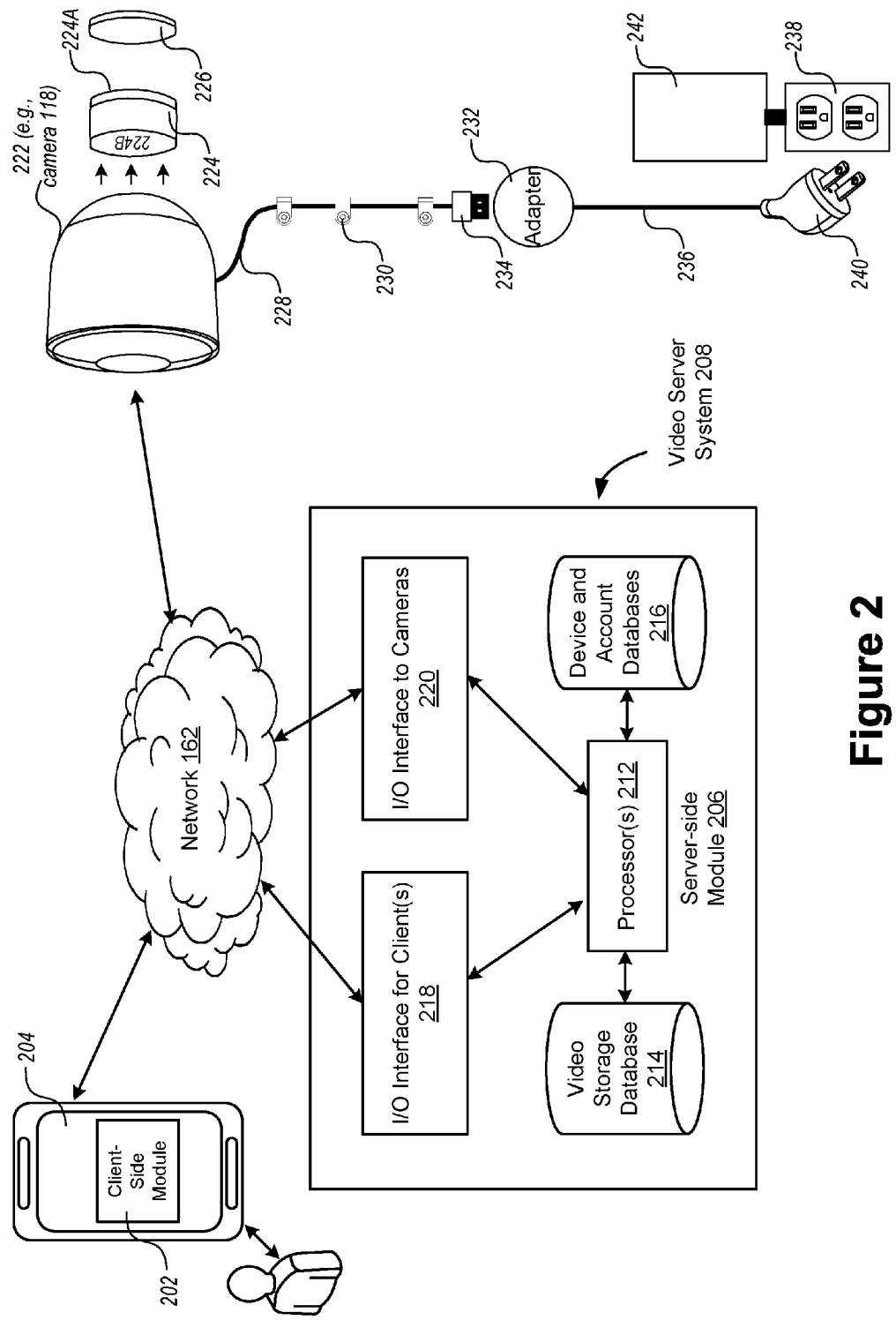
FIG. 2 is a representative operating environment in which a video server system provides data processing for monitoring and facilitating review of video streams captured by video cameras in accordance with some implementations.

FIG. 2 illustrates a representative operating environment 200 in which a video server system 208 provides data processing for monitoring and facilitating review of video streams (including motion events and alert events) captured by video cameras 118 in accordance with some implementations. As shown in FIG. 2, the video server system 208 receives video data from video sources 210 (including cameras 118) located at various physical locations (e.g., inside homes, backyards, restaurants, stores, streets, parking lots, and/or the smart home environments 100 of FIG. 1). Each video source 210 may be bound to one or more user (e.g., reviewer) accounts, and the video server system 208 provides video monitoring data for the video sources 210 to client devices 204 associated with the reviewer accounts. For example, the portable electronic device 130 is an example of the client device 204.

In some implementations, the smart home provider server system 190 or a component thereof serves as the video server system 208, i.e., the video server system 208 is a part or component of the smart home provider server system 190. In some implementations, the video server system 208 includes a dedicated video processing server that provides video processing services to video sources 210 and client devices 204 independent of other services provided by the video server system 208.

In some implementations, each of the video sources 210 includes one or more video cameras 118 that capture video and send the captured video to the video server system 208 substantially in real-time. In some implementations, each of the video sources 210 optionally includes a controller device (not shown) that serves as an intermediary between the one or more cameras 118 and the video server system 208. The controller device receives the video data from the one or more cameras 118, optionally performs some preliminary processing on the video data, and sends the video data to the video server system 208 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the video server system 208.

In some implementations, a camera 118 of a video source 222 captures video at a first resolution (e.g., 720P and/or 1080P) and/or a first frame rate (24 frames per second), and sends the captured video to the video server system 208 at both the first resolution (e.g., the original capture resolution(s), the high-quality resolution(s) such as 1080P and/or 720P) and the first frame rate, and at a second, different resolution (e.g., 180P) and/or a second frame rate (e.g., 5 frames per second or 10 frames per second). For example, the camera 118 captures a video 223-1 at 720P and/or 1080P resolution (the camera 118 may capture a video at 1080P and create a downscaled 720P version, or capture at both 720P and 1080P). The video source 222 creates a second (or third), rescaled (and optionally at a different frame rate than the version 223-1) version 225-1 of the captured video at 180P resolution, and transmits both the original captured version 223-1 (i.e., 1080P and/or 720P) and the rescaled version 225-1 (i.e., the 180P version) to the video server system 208 for storage. In some implementations, the rescaled version has a lower resolution, and optionally a lower frame rate, than the original captured video. The video server system 208 transmits the original captured version or the rescaled version to a client 204, depending on the context. For example, the video server system 208 transmits the rescaled version when transmitting multiple videos to the same client device 204 for concurrent monitoring by the user, and transmits the original captured version in other contexts. In some implementations, the video server system 208 downscales the original captured version to a lower resolution, and transmits the downscaled version.

In some other implementations, a camera 118 of a video source 222 captures video at a first resolution (e.g., 720P and/or 1080P) and/or a first frame rate, and sends the captured video to the video server system 208 at the first resolution (e.g., the original capture resolution(s); the high-quality resolution(s) such as 1080P and/or 720P) and first frame rate for storage. When the video server system 208 transmits the video to a client device 204, the video server system 208 may downscale the video to a second, lower resolution (e.g., 180P) and/or second, lower frame rate for the transmission, depending on the context. For example, the video server system 208 transmits the downscaled version when transmitting multiple videos to the same client device 204 for concurrent monitoring by the user, and transmits the original captured version in other contexts.

In some implementations, the camera 118 operates in two modes, a Day mode in which there is enough ambient light to capture color video of a scene, and a Night mode in which the camera captures video of a scene using onboard LED illumination when there is not enough ambient light (e.g., as described in the cross-referenced U.S. patent application Ser. No. 14/723,276, filed on May 27, 2015, entitled, "Multi-mode LED Illumination System."). As described herein, in some implementations, the camera 118 includes a program module that decides when to switch from Night mode to Day mode using one or more of: illuminant detection (detecting the type of ambient light based on R/G and B/G component ratios of the ambient light), lux detection (detecting the ambient light level), and tiling (performing illuminant detection and/or lux detection for sub-regions of an image sensor array so as to detect localized/point light source that only impact a portion of the image sensor array).

Referring to FIG. 2, in accordance with some implementations, each of the client devices 204 includes a client-side module 202. The client-side module 202 communicates with a server-side module 206 executed on the video server system 208 through the one or more networks 162. The client-side module 202 provides client-side functionalities for the event monitoring and review processing and communications with the server-side module 206. The server-side module 206 provides server-side functionalities for event monitoring and review processing for any number of client-side modules 202 each residing on a respective client device 204. The server-side module 206 also provides server-side functionalities for video processing and camera control for any number of the video sources 210, including any number of control devices and the cameras 118.

In some implementations, the server-side module 206 includes one or more processors 212, a video storage database 214, device and account databases 216, an I/O interface to one or more client devices 218, and an I/O interface to one or more video sources 220. The I/O interface to one or more clients 218 facilitates the client-facing input and output processing for the server-side module 206. In some implementations, the I/O interface to clients 218 or a transcoding proxy computer (not shown) rescales (e.g., downscales) and/or changes the frame rate of video for transmission to a client 204. The databases 216 store a plurality of profiles for reviewer accounts registered with the video processing server, where a respective user profile includes account credentials for a respective reviewer account, and one or more video sources linked to the respective reviewer account. The I/O interface to one or more video sources 220 facilitates communications with one or more video sources 210 (e.g., groups of one or more cameras 118 and associated controller devices). The video storage database 214 stores raw video data received from the video sources 210, as well as various types of metadata, such as motion events, event categories, event category models, event filters, and event masks, for use in data processing for event monitoring and review for each reviewer account.

In some implementations, the server-side module 206 receives information regarding alert events detected by other smart devices 204 (e.g., hazards, sound, vibration, motion). In accordance with the alert event information, the server-side module 206 instructs one or more video sources 210 in the smart home environment 100 where the alert event is detected to capture video and/or associate with the alert event video, received from the video sources 210 in the same smart home environment 100, that is contemporaneous or proximate in time with the alert event.

Examples of a representative client device 204 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices. For example, client devices 204-1, 204-2, and 204-m are a smart phone, a tablet computer, and a laptop computer, respectively.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the video server system 208 is implemented on one or more standalone data processing apparatuses or a distributed network of computers. In some implementations, the video server system 208 also employs various virtual devices and/or services of third party service providers (e.g., third-party cloud service providers) to provide the underlying computing resources and/or infrastructure resources of the video server system 208. In some implementations, the video server system 208 includes, but is not limited to, a handheld computer, a tablet computer, a laptop computer, a desktop computer, or a combination of any two or more of these data processing devices or other data processing devices.

The server-client environment 200 shown in FIG. 2 includes both a client-side portion (e.g., the client-side module 202) and a server-side portion (e.g., the server-side module 206). The division of functionalities between the client and server portions of operating environment 200 can vary in different implementations. Similarly, the division of functionalities between the video source 222 and the video server system 208 can vary in different implementations. For example, in some implementations, client-side module 202 is a thin-client that provides only user-facing input and output processing functions, and delegates all other data processing functionalities to a backend server (e.g., the video server system 208). Similarly, in some implementations, a respective one of the video sources 210 is a simple video capturing device that continuously captures and streams video data to the video server system 208 with no or limited local preliminary processing on the video data. Although many aspects of the present technology are described from the perspective of the video server system 208, the corresponding actions performed by the client device 204 and/or the video sources 210 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the video server system 208, the client device 204, and the video sources 210 cooperatively.

The electronic devices, the client devices or the server system communicate with each other using the one or more communication networks 162. In an example smart home environment, two or more devices (e.g., the network interface device 160, the hub device 180, and the client devices 204-m) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 210-n exchange data with the hub device 180. Alternatively, in some situations, some of the electronic devices of the video sources 210-n communicate with the network interface device 160 directly via the same sub-network 162A that couples devices 160, 180 and 204-m. In some implementations (e.g., in the network 162C), both the client device 204-m and the electronic devices of the video sources 210-n communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 210-n. As explained above, the network interface device 160 and the hub device 180 optionally communicate with each other via a sub-network 162A. In some implementations, the hub device 180 is omitted, and the functionality of the hub device 180 is performed by the video server system 208, video server system 252, or smart home provider server system 190.

In some implementations, the video server system 208 is, or includes, a dedicated video processing server configured to provide data processing for monitoring and facilitating review of alert events (e.g., motion events) in video streams captured by video cameras 118. In this situation, the video server system 208 receives video data from video sources 210 (including cameras 118) located at various physical locations (e.g., inside homes, restaurants, stores, streets, parking lots, and/or the smart home environments 100 of FIG. 1). Each video source 222 may be bound to one or more user (e.g., reviewer) accounts, and the video server system 252 provides video monitoring data for the video source 222 to client devices 204 associated with the reviewer accounts. For example, the portable electronic device 130 is an example of the client device 204.

In accordance with various implementations of this application, a camera 118 includes a housing 222, and a magnetic plate (not shown in FIG. 2) coupled to a rear surface of housing 222. The magnetic plate is formed from magnetic material, and has predetermined dimensions. A magnet mount 224 is applied for physically receiving camera 118, and includes a first surface 224A, a second surface 224B and a magnetic material (not shown in FIG. 2) disposed between the first and second surfaces 224A and 224B. First surface 224A is configured to attach to a mounting surface directly or indirectly. Second surface 224B is opposing first surface 224A, and has a second shape that is substantially complementary to a first shape of the rear surface of housing 222 of camera 118, such that the second surface 224B could be configured to engage the rear surface of housing 222 of camera 118. The magnet disposed between the first and second surfaces 224 A and 224B is configured to magnetically couple to the magnetic plate of camera 118, such that when camera 118 is magnetically coupled to magnet mount 224, an adjustable union between magnet mount 224 and camera 118 is formed permitting adjustment of an angle of orientation of camera 118 with respect to magnet mount 224. In some implementations, a supporting assembly of camera 118 includes a magnetic mounting structure 226 in addition to magnet mount 224. Mounting structure 226 is configured to be attached and fixed onto the mounting surface, and first surface 224A of magnet mount 224 is configured to attach to the mounting surface indirectly via mounting structure 226.

Camera 118 further includes a cable 228 that extends from a side surface of camera 118 and is configured to be fixed onto the mounting surface with one or more cable clips 230. Optionally, cable clips 230 are arranged at substantially equal or different distance intervals along the length of cable 228. Attachment of cable 228 to the mounting surface prevents camera 118 from falling when camera 118 is detached from the magnet mount 224. In addition, attachment of cable 228 to the mounting surface could frustrate theft attempts, because a thief has to detach both camera 118 and the one or more cable clips 230 to remove camera 118.

In some implementations, an open end of cable 228 is electrically coupled to a DC power supply output of a power adapter 232 that encloses an AC to DC converter and has an AC power supply input and the DC power supply output. More specifically, the open end of cable 228 includes a male connector 234 configured to mate with a female connector of power adapter 232. The female connector (not shown in FIG. 2) includes a sealing structure and a locking mechanism configured to engage with and lock a cover of male connector 234, thereby providing a waterproof environment around an electrical connection formed when the male and female connectors are electrically and mechanically coupled to each other. It is understood that in some implementations, the open end of cable 228 could also be electrically coupled to a data port (not limited to power adapter 232) and configured to receive or send data to the data port.

Power adapter 232 further includes a cable 236 extended from a position located on power adapter 232 and opposing that of the female connector. Cable 236 is configured to connect to a wall plug 238 leading to a mains power system, and provide the AC power supply input to power adapter 232. An open end of cable 236 further includes a power plug head 240 that matches wall plug 238. In some implementations, a body of power plug head 240 is slanted, i.e., the plastic body of power plug head 240 is molded to create an obtuse angle between cable 236 (when straightened) and metal pins of power plug head 240. When plugged onto wall plug 238 and enclosed in a plug cover 242, power plug head 240 fits into a space between plug cover 242 and wall plug 238 in a substantially conformal manner. In some implementations, plug cover 242 and wall plug 238 are mechanically locked to each other to deter any attempt to tamper the connection between power plug head 240 and wall plug 238 and/or protect the connection from severe weather conditions.

Figure 3:
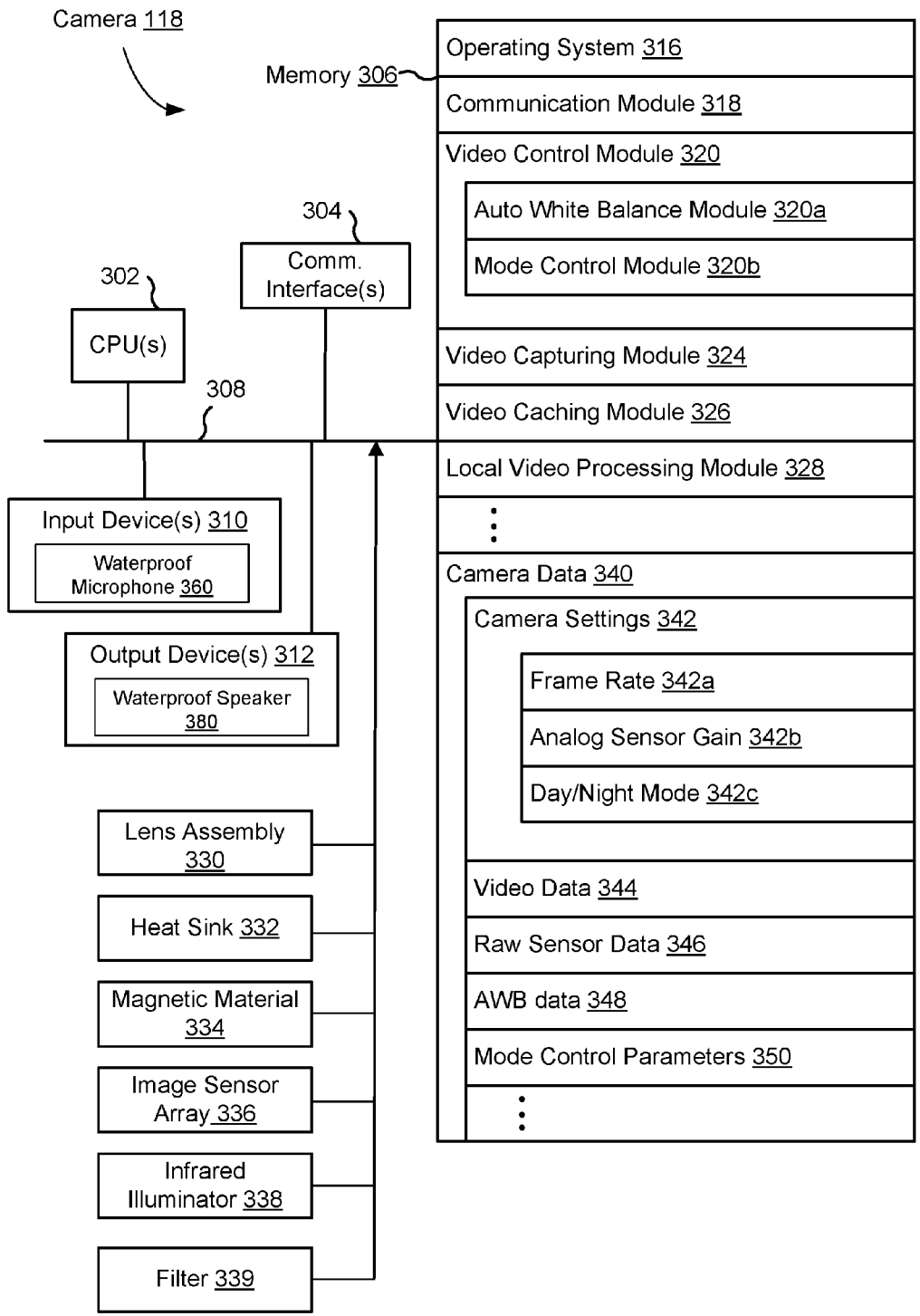
FIG. 3 is a block diagram illustrating a representative camera in accordance with some implementations.

FIG. 3 is a block diagram illustrating a representative camera 118 in accordance with some implementations. In some implementations, the camera 118 includes one or more processing units or controllers (e.g., CPUs, ASICs, FPGAs, microprocessors, and the like) 302, one or more communication interfaces 304, memory 306, one or more communication buses 308 for interconnecting these components (sometimes called a chipset). In some implementations, the camera 118 includes one or more input devices 310 such as one or more buttons for receiving input and one or more waterproof microphones 360. In some implementations, the camera 118 includes one or more output devices 312, such as one or more indicator lights, a sound card, a waterproof speaker 380, and a small display for displaying textual information and error codes, playing audio, etc.

In some implementations, the camera 118 includes one or more of a lens assembly 330, a heat sink 332, a plate 334 (e.g., a magnetic plate), an image sensor array 336, infrared illuminators 338 (e.g., infrared light emitting diodes (IR LEDs)) and filter 339. In some implementations, the lens assembly 330 could further include a set of parallel lenses and a ring lens that is disposed surrounding the set of parallel lenses in a concentric manner. The set of parallel lens is configured to focus incident visible light on the image sensor array 334, which captures respective color components (e.g., R, G and B components) of the incident light focused on respective sensor array locations. The ring lens is disposed in front of infrared illuminator 338 to diffuse infrared light generated therefrom to create uniform illumination in a field of view of camera 118. In some implementations, when the camera is in Day mode, filter 339 is enabled for blocking a substantial portion of the IR components of the incident light. Alternatively, when the camera is in Night mode, filter 339 is disabled, allowing the image sensor array 334 to receive incident IR light from a scene illuminated by the camera's onboard IR illuminators 338 or external IR illuminators.

In some implementations, while the lens assembly 330 and electronic components (e.g., processor 302) are disposed in a front portion of camera 118, plate 334 is attached to an interior surface of a rear portion of camera 118 that is opposite the front portion of camera 118. The heat sink 332 is made of thermally conductive material, and coupled to electronic components of camera 118 (e.g., processor 302) to absorb the heat generated by the electronic components. Heat sink 332 is mechanically and thermally coupled to plate 334 to further transfer at least part of the generated heat to plate 334, thereby directing the heat away from the front portion of camera 118 where sensitive optical or electrical components are located. In some implementations, plate 334 includes a magnetic plate that is also configured to be attracted to a magnet mount (e.g., magnet mount 224) for mounting camera 118 onto a mounting surface while at least partially dissipating heat generated by the electronic components of camera 118.

Communication interfaces 304 include, for example, hardware capable of data communications using any of a variety of custom or standard wireless protocols (e.g., IEEE 402.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

Operating system 316 including procedures for handling various basic system services and for performing hardware dependent tasks;

Network communication module 318 for connecting the camera 118 to other computing devices (e.g., hub device server system 208, video server system 252, the client device 130, network routing devices, one or more controller devices, and networked storage devices) connected to the one or more networks 162 via the one or more communication interfaces 304 (wired or wireless);

Video control module 320 for modifying the operation mode (e.g., zoom level, resolution, frame rate, recording and playback volume, lighting adjustment (e.g., performed by auto white balance (AWB) program module 320*a*), AE and IR modes, etc.) of the camera 118, enabling/disabling the audio and/or video recording functions of the camera 118, changing the pan and tilt angles of the camera 118, resetting the camera 118, enabling/disabling filter 339, and/or the like; the video control module 320 includes a mode control program module 320*b* that determines when to switch from Night mode to Day mode and vice-versa in accordance with some implementations; the mode control module 320*b* also generates a control signal to enable or disable filter 339 in accordance with a determination to transition to Day mode or Night mode, respectively;

Video capturing module 324 for capturing and generating a video stream and sending the video stream to the video server system 208 as a continuous feed or in short bursts, and optionally generating a rescaled version of the video stream and sending the video stream at the original captured resolution and the rescaled resolution;

Video caching module 326 for storing some or all captured video data locally at one or more local storage devices (e.g., memory, flash drives, internal hard disks, portable disks, etc.);

Local video processing module 328 for performing preliminary processing of the captured video data locally at the camera 118, including for example, compressing and encrypting the captured video data for network transmission, preliminary motion event detection, preliminary false positive suppression for motion event detection, preliminary motion vector generation, etc.; and Camera data 340 storing data, including but not limited to:
  Camera settings 342, including network settings, camera operation settings (such as frame rate 342*a*, analog sensor gain 342*b*, and Day/Night mode setting 342*c*), camera storage settings, etc.;
  Video data 344, including video segments and motion vectors for detected motion event candidates to be sent to the hub device server system 208 or video server system 252;
  Raw sensor data 346 (e.g., R, G and B components) captured from sensor pixel locations in the sensor array 334 and saved as a raw image frame; in some implementations, the sensor is a "Bayer" sensor, where R, G and B pixels are captured from alternate sensor pixel locations in such a way that two times more G component values are captured than R or B component values; other implementations employ different types of sensors to provide the Raw sensor data 3460, including sensors with other arrangements of R, G and B color filters (e.g., a sensor producing an equal number of R, G and B components), and sensors that employ different color filters (e.g., a sensor with cyan (C), yellow (Y) and magenta (M) color filters, which produces C, Y and M components);
  Auto white balance (AWB) data 348, including data derived from the raw sensor data 3460 used to identify and compensate for the color temperature of the ambient light condition (e.g., sunlight vs. incandescent light vs. fluorescent light, etc.); in some implementations, the AWB data 348 includes R/G and B/G ratios for respective pixel locations derived from the corresponding raw Bayer sensor data 346; in some implementations, these ratios are used directly to determine whether to switch from Night mode to Day mode; and
  Mode control parameters 350 used to determine switching of a camera mode, including All_lights lookup table (LUT) used to determine whether to switch from Night mode to Day mode, and Sunlight lookup table (LUT) used to determine whether to switch from the Night mode to Day mode.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some implementations, the camera 118 captures surveillance video using a digital imaging system. Digital images (frames) are captured as a sequence at a particular frame rate 342*a*, compressed, and then sent to the "cloud" (e.g., the video server system 208) for storage and retrieval. The camera 118 operates in one of two modes (e.g., indicated by the Day/Night mode value 342*c*) depending on the ambient lighting conditions. Day mode is used when there is sufficient ambient light to adequately illuminate the scene. Night mode is used when there is not enough light to adequately illuminate the scene. In some implementations, when operating in Day mode, the camera 118 uses the ambient lighting sources to illuminate the scene and capture surveillance video. In some implementations, the minimum lux level at which the camera captures 118 video in Day mode is between 0.1 to 1 lux depending on the color temperature of the dominant illuminant. Once the minimum lux level is reached, the camera automatically switches to Night mode. Switching to Night mode includes disabling filter 339 and enabling a set of IR LEDs 338 to provide illumination for the scene. Night mode is maintained until the camera 118 detects an external illuminant.

Figure 4:
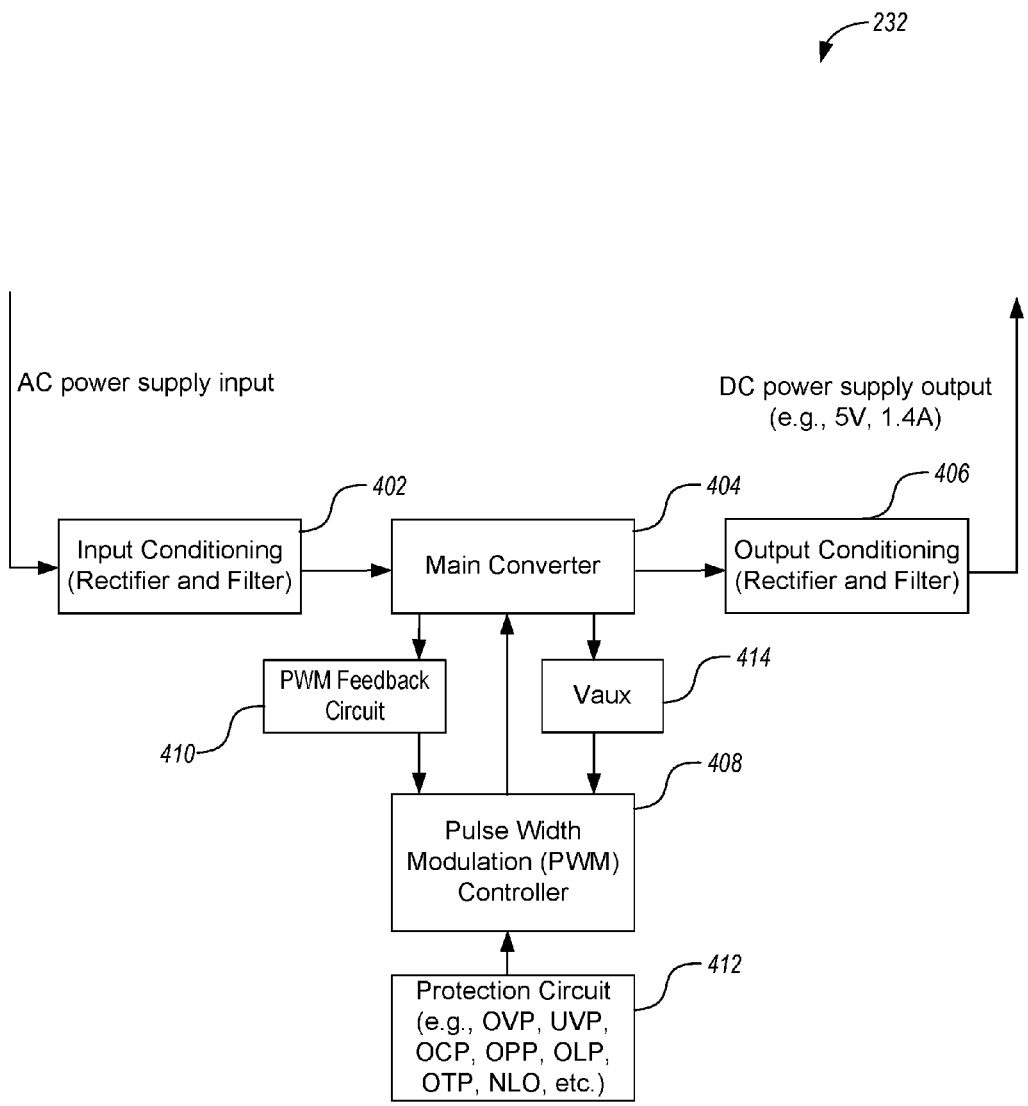
FIG. 4 is a block diagram of a representative power adapter configured to convert an alternating current (AC) power supply input to a direct current (DC) power supply output in accordance with some implementations in accordance with some implementations.

FIG. 4 is a block diagram of a representative power adapter 232 configured to convert an alternating current (AC) power supply input to a direct current (DC) power supply output in accordance with some implementations. An input of the power adapter 232 is electrically coupled to a mains power system via a wall plug, and configured to receive the AC power supply input therefrom. The AC power supply input typically includes a 110V or 220V AC signal at a frequency of 50 Hz or 60 Hz. An output of the power adapter 232 is electrically coupled to the camera 118, and configured to generate and provide to the camera 118 the DC power supply output. In an example, the DC power supply output includes an electrical signal of 5V, and could drive the camera 118 with a current up to 1.4 A. In some implementations, the power adapter 232 is mounted onto a mounting plate fixed on the mounting surface, and coated with matte material that enhances its contact with the mounting plate and protects its surfaces from decoloring caused by ultraviolet light incident thereon. In some implementations, the camera 118 and the corresponding power adapter 232 could be installed and applied in an outdoor environment, and the power adapter 232 is therefore configured to adopt waterproof features (e.g., waterproof USB connectors) for the purposes of deterring water permeation that could cause irreversible damages to power supply conversion electronics contained in the power adapter 232.

The power adapter 232 includes input conditioning circuit 402, a main converter 404, output conditioning circuit 406, a pulse width modulation (PWM) controller 408, and PWM feedback circuit 410. The input conditioning circuit 402 includes an input rectifier (e.g., a half-wave or full-wave rectification bridge) and an output filter (e.g., a capacitor) that are configured to rectify and smooth the AC power supply input. The output conditioning circuit 406 includes an output rectifier (e.g., a rectification diode) and an output filter (e.g., a capacitor) that are configured to rectify and smooth the DC power supply output before it is outputted to the camera 118. In some implementations, the output rectifier includes a rectification transistor (e.g., a metal-oxide-semiconductor field-effect-transistor (MOSFET) and a bipolar junction transistor (BJT)) and a rectification driver configured to control the rectification transistor. The rectification transistor has an equivalent resistance that is less than that of a conventional rectification diode, which effectively improves overall operational efficiency of the power adapter 232. In some implementations, the power adapter 232 is configured to meet the requirements of Level VI Efficiency Standards for External Power Supplies that have been enforced in the United Stated.

The main converter 404 is coupled between the input and output conditioning circuit 402 and 406. In some implementations, the main converter 404 includes a transformer having a primary side winding and a secondary side winding. The primary side winding is configured to receive the rectified and smoothed AC power supply input, and the secondary side winding is configured to provide an output which is then rectified and smoothed by the output conditioning circuit 406 for generating the DC power supply output.

In some implementations, the power adapter 232 is implemented as a switch mode power supply (SMPS). The main converter 404 is coupled to the PWM controller 408 that further includes a switching transistor coupled to the main converter 404 (e.g., connected in series with the primary side winding of the main converter 404). The PWM controller 408 is configured to control switching operation of the switching transistor and supply a prescribed operating frequency and duty cycle for the power adapter 232 for converting the AC power supply input to the DC power supply output. More specifically, the PWM controller 408 is coupled to the PWM feedback circuit 410 to receive output feedback from the output of the main converter 404 or the DC power supply output, and configured to control the prescribed operating frequency (i.e., an operational period) and/or the duty cycle of the power adapter 232. For example, when the DC power supply output is measured by the PWM feedback circuit 410 to be lower than a target DC power supply voltage, the PWM controller 408 increases the operating frequency and/or duty cycle to increase the magnitude of the DC power supply output. Alternatively, when the DC power supply output is measured by the PWM feedback circuit 410 to be greater than the target DC power supply voltage, the PWM controller 408 reduces the operating frequency and/or duty cycle to increase the magnitude of the DC power supply output. As such, the PWM controller 408 stabilizes the DC power supply output at the target DC power supply output by adjusting its operating frequency and/or duty cycle, and the power adapter 232 is therefore configured to operate at the prescribed operating frequency and/or duty cycle when the DC power supply output is stabilized.

In some implementations, the power adapter 232 further includes protection circuit 412 that is configured to offer protections against one or more of over voltage (OVP), under voltage (UVP), over current (OCP), over power (OPP), over load (OLP), over temperature (OTP), and no-load operation (NLO). The protection circuit 412 is coupled to the PWM controller 408, and configured to monitor the DC power supply output and control the PWM controller 408. For example, in some implementations, the power adapter 232 is configured to provide a target DC power supply output of 5V, and the protection circuit 412 shuts down the power adapter 232 if the DC power supply outputs have a voltage below (UVP) a first predetermined voltage level (e.g., 6.3V) or above (OVP) a second predetermined voltage level (e.g., 3.5V). In some situations, when you first turn on the power adapter 232, the DC power supply output is below the target DC power supply output for a fraction of second. The UVP is disabled, and a power good signal is outputted to indicate to the camera 118 that the DC power supply output is increasing to reach the target DC power supply level. Similarly, in some implementations, the protection circuit 412 shuts down a rail of the power adapter 232, if the rail of the power adapter 232 pulls a current that is above (OCP) a predetermined current level or above (CPP) a predetermined power consumption level. In some implementations, the protection circuit 412 includes a temperature sensor, and shuts down the power adapter 232 if a temperature inside the power adapter 232 is measured above (OTP) a predetermined temperature level. In some implementations, the protection circuit 412 shuts down the power adapter 232, if no load (i.e., the camera 118) is coupled at the DC power supply output or if the load coupled to the DC power supply output exceeds a predetermined load level.

In some implementations, the power adapter 232 further includes an auxiliary voltage (Vaux) supply 414. The Vaux supply 414 is coupled to receive output feedback from the output of the main converter 404 or the DC power supply output. The Vaux supply 414 is configured to enable a low power mode based on the output of the main converter 404 or the DC power supply output, and function as a power rail of the power adapter 232 at the enabled low power mode. A current demand from the Vaux supply 414 could be limited to a predetermined current level (e.g., 100 µA) at the low power mode. The PWM controller 408 is coupled to the Vaux supply 414, and configured to adjust its operating frequency and/or duty cycle according to the Vaux supply 414 at the low power mode, thereby controlling the current demand of the power adapter 232 from the Vaux supply 414.

The output of the power adapter 232 is electrically coupled to the camera 118 via the extended cable 228 that has cable resistance and could cause a loss in the DC power supply voltage received at the camera 118. In an example, the extended cable 228 is 3 meters long. The PWM controller 408 is configured to compensate the loss caused by the extended cable 228 by adjusting the operating frequency and/or the corresponding duty cycle for switching the main converter 404. In some implementations, performance of the power adapter 232 is optimized to load an extended cable having a fixed cable length (e.g., 3 meters). The PWM feedback circuit 410 monitors the output of the main converter 404 or the output conditioning circuit 406, and controls the PWM controller 408 to switch the main converter 404 according to an adjusted operating frequency and/or duty cycle, thereby compensating the loss of the DC power supply output that has been monitored at the output of the main converter 404 or the output conditioning circuit 406.

Camera Assembly

Figure 5A:
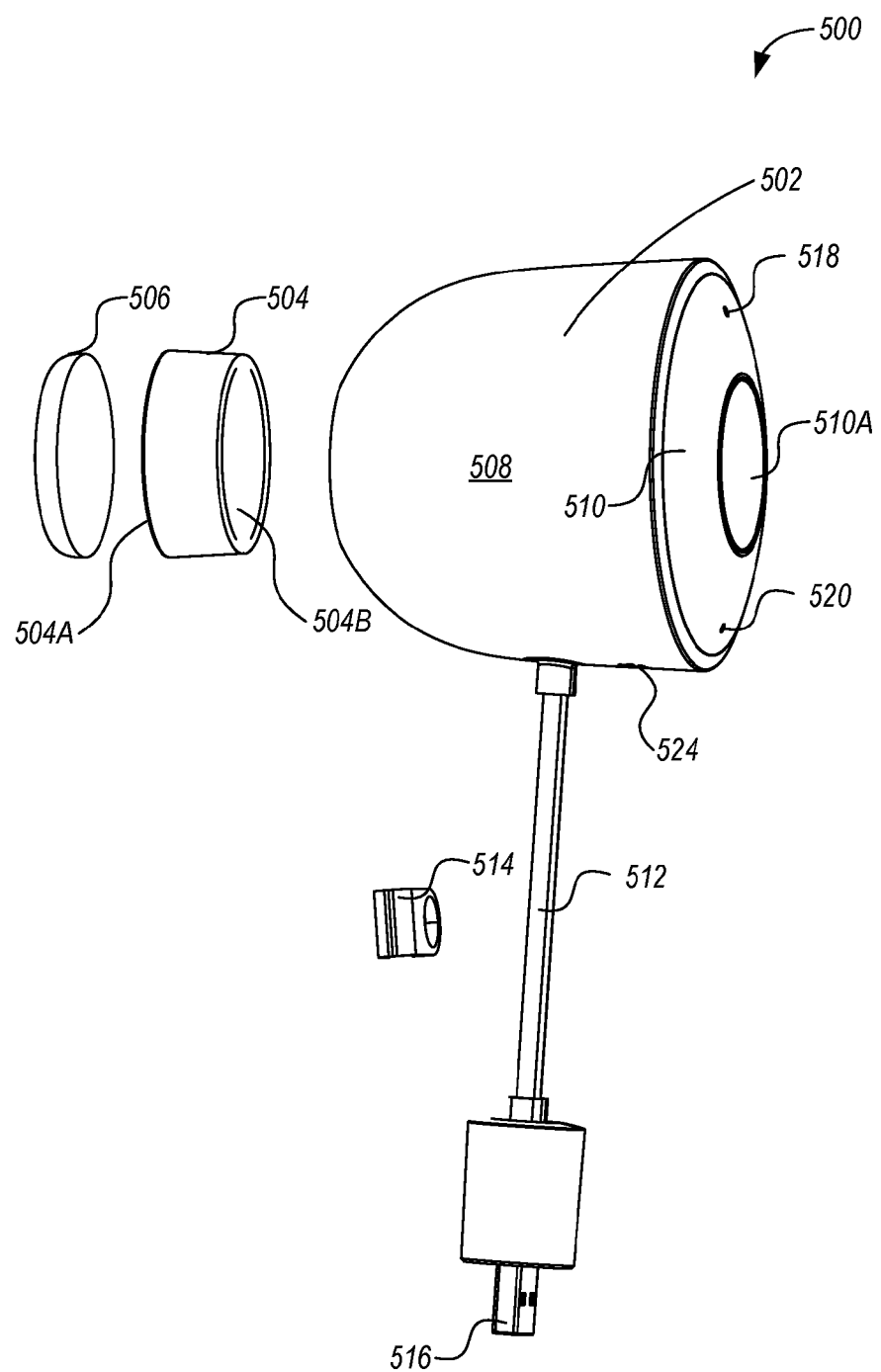
FIG. 5A is a perspective view of a camera assembly shown in an exploded manner in accordance with some implementations.

FIG. 5A is a perspective view of a camera assembly 500 shown in an exploded manner in accordance with some implementations. The camera assembly 500 further includes a camera module 502 that is configured to be mounted to a mounting surface using at least one of a magnet mount 504 and a mounting structure 506. The camera module 502 includes a housing 508. Optionally, the housing 508 is made of non-magnetic material. Optionally, the body of the housing 508 is made of a single piece of material, includes a substantially smooth body surface and has a bullet head shape. An open end of the housing 502 is sealed by a front cover 510, and the front cover 510 includes a transparent portion 510A configured to permit ambient light incident on a lens of the camera module 502. The camera module 502 further includes one or more of a lens assembly, image sensors, microphone and speaker, a plurality of electronic components, memory and a heat sink, and these optical, electronic and thermal components are fully contained and sealed within the housing 502.

The magnet mount 504 is configured to receive the camera module 502, and includes a first surface 504A, a second surface 504B and a magnetic material (not shown in FIG. 5A) disposed between the first and second surfaces. The first surface 504A is configured to attach to a mounting surface directly or indirectly. For example, when the mounting surface (a surface of a refrigerator) is made of magnetic material that could be magnetized or be attracted to a magnet, the first surface 504A could attach directly to the mounting surface. Alternatively, in some implementations, a magnetic mounting structure 506 is configured to be attached and fixed onto the mounting surface, and the first surface 504A of the magnet mount 504 is configured to attach to the magnetic mounting structure 506 and further to the mounting surface.

The second surface 504B of the magnet mount 504 opposes the first surface 504A, and has a second shape that is substantially complementary to a first shape of a rear surface of the housing 508 of the camera module 502. The second surface 504B of the magnet mount 504 is configured to engage the rear surface of the housing 508 of the camera module 502. Specifically, in some implementations, the first shape of the rear surface of the housing 508 is substantially convex, and the second shape of the second surface 504B is substantially concave.

The magnet disposed between the first and second surfaces provide the magnetic force to allow the magnet mount 504 to attach to a magnetic mounting surface or a magnetic mounting structure 506, and to allow the housing 508 of the camera module 502 to attach to the magnet mount 504. In some implementations, a magnetic plate is attached to an interior surface of the housing 508 opposing the rear surface of the housing 508, and magnetically attracted to the magnet of the magnet mount 504 when the rear surface of the housing 508 is disposed in proximity to the magnet mount 504. In addition, when the camera module 502 is magnetically coupled to the magnet mount 504, an adjustable union between the magnet mount 504 and the camera module 502 is formed permitting adjustment of an angle of orientation of the camera module 502 with respect to the magnet mount 504. The angle of orientation is limited by a stopping structure of the camera module 502 (e.g., the magnetic plate itself when the magnetic plate has predetermined geometry and dimensions for controlling the angle of orientation). Alternatively, in some implementations, the stopping structure of the camera module 502 includes one or more physical stops disposed on the rear surface of the housing 508 of the camera module 502. When the magnet mount 504 hits the one or more physical stops, the camera module 502 reaches the limit of the angle of orientation.

In some implementations, the camera module 502 includes a cable 512 that extends from a side surface (or a bottom surface) of the camera module 502. Optionally, a first end of the cable 512 is fixed and entirely sealed on the side surface of the camera module 502 to protect the interior of the camera module 502 from water intrusion. The cable 512 is configured to be fixed onto the mounting surface with one or more cable clips 514. Attachment of the cable 512 to the mounting surface prevents the camera module 502 from falling and/or deters theft attempts when the camera module 502 is detached from the magnet mount 504. The cable 512 further includes a second end opposing the first end, and the second end of the cable 512 is connected to a first connector 516 configured to mate with a second connector of an electronic hub (e.g., a power adapter 232 shown in FIG. 2 or a data port). The second connector of the electronic hub is complementary to the first connector 516 of the cable 512 and configured to provide at least one a power supply and a data exchange path to the camera module 502 coupled to the cable 512. In a specific example, the first connector 516 of the cable 512 includes a male USB connector, and the second connector of the electronic hub includes a female USB connector configured to, when mated with the female USB connector of the cable 512, provides a power supply to the camera module 502.

Figure 5B:
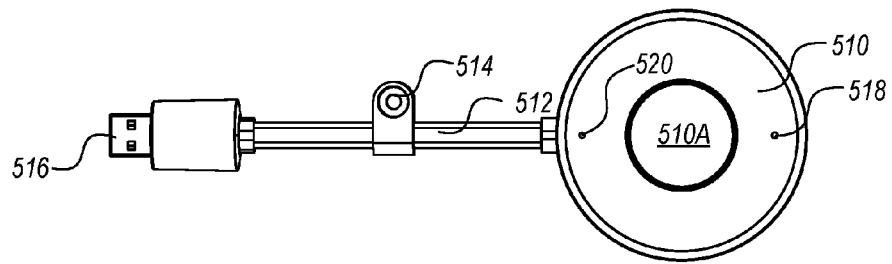
FIGS. 5B-5E illustrate a front view, a rear view, and two distinct side views of a camera assembly that has been mounted onto a mounting surface via a magnet mount, a mounting structure and a cable clip in accordance with some implementations.
Figure 5C:
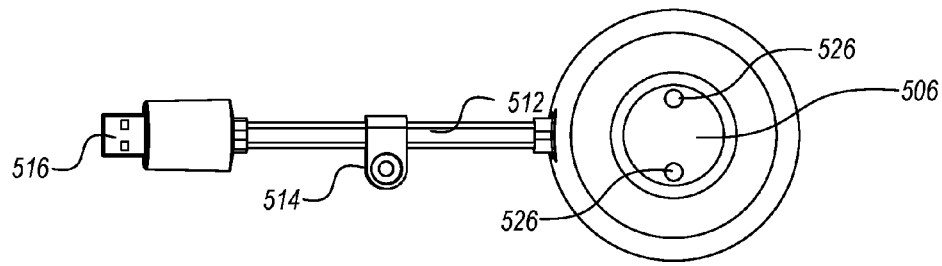
Figure 5D:
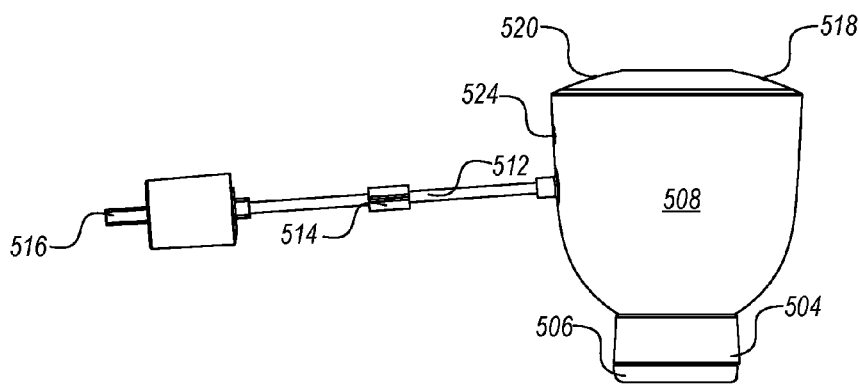
Figure 5E:
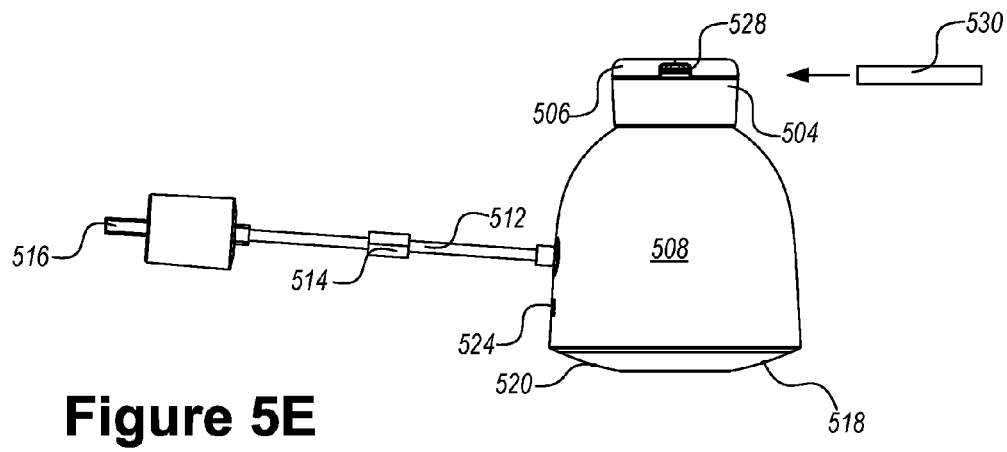
Figure 5F:
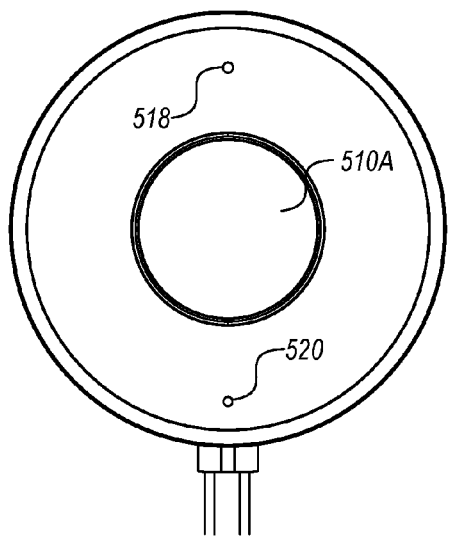
FIGS. 5F-5H illustrate a front view, a top view, and a bottom view of a standalone camera module in accordance with some implementations.
Figure 5G:
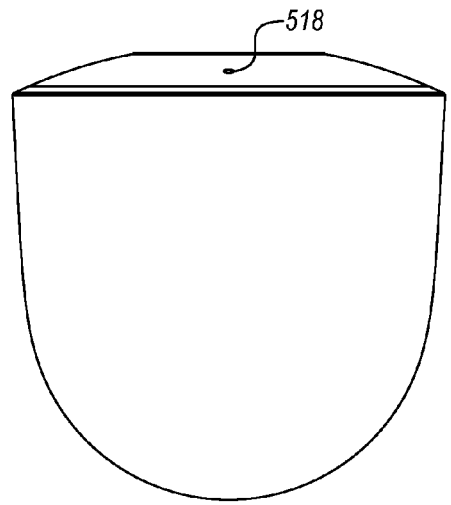
Figure 5H:
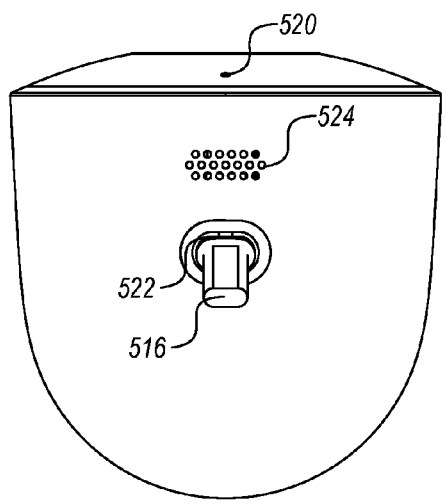

FIGS. 5B-5E illustrate a front view, a rear view, and two distinct side views of a camera assembly 500 that has been mounted onto a mounting surface via a magnet mount 504, a mounting structure 506 and a cable clip 514 in accordance with some implementations. FIGS. 5F-5H illustrate a front view, a top view, and a bottom view of a standalone camera module 502 in accordance with some implementations. Referring to FIGS. 5B, 5D and 5F, the front cover 510 includes the transparent portion 510A for receiving incident ambient light, an indicator window 518 for indicating a state of operation of the camera module 502, and a first opening 520 for accessing a sound transmission channel leading to a microphone of the camera module 502. Referring to FIG. 5H, a bottom side of the housing 508 includes one or more second openings 524 for accessing a sound transmission channel leading to a speaker of the camera module 502, and a third opening 522 from which the cable 512 is extended out of the housing 508. In some implementations, the front cover 510 has a slightly convex shape. When the camera module 502 is mounted onto a mounting surface, it is so oriented such that the first opening 520 associated with the microphone is located on a lower portion of the front cover 510, and is oriented slightly downward. Also, the camera module 510 is also oriented such that the one or more second openings 524 associated with the speaker is located on the bottom side of the housing and faces the ground. Orientations of the first opening 520 and the second openings 524 are configured to reduce or eliminate rain, snow or dust that could hit the microphone and the speaker when the camera module 502 is disposed in an outdoor environment.

Referring to FIG. 5C, the mounting structure 506 that is applied to support the magnet mount 504 further includes one or more fastener structures 526 (e.g., openings) configured to receive one or more fasteners. When the one or more fasteners are integrated with the one or more fastener structures 526, the mounting structure 506 is securely fixed onto the mounting surface. For example, the one or more fastener structure 526 includes two holes on the mounting structure 506, and configured to receive nails or screws that can fix the mounting structure 506 onto the mounting surface when the nails or screws are driven into the holes.

Referring to FIG. 5D, in some implementations, when the camera module 502 and the magnet mount 504 are mounted onto the mounting surface via the mounting structure 506, the magnet mount 504 magnetically attaches onto the mounting structure 506 with first attraction force, and the camera module 502 magnetically couples to the magnet mount with second attraction force that is substantially smaller from the first attraction force. Further, in some implementations, the first and second attraction forces enable secure attachment of the camera module 502 onto the mounting surface, and the secure attachment satisfies one or more Underwriters Laboratories (UL) standards that set forth at least safety requirements for mounting the camera module 502 onto a mounting surface. In some implementations, the magnet of the magnet mount 504 includes two magnetic parts that are respectively disposed in proximity to the first and second surfaces 504A and 504B and enable the first and second attraction forces. Each of the two magnetic parts could include a plurality of magnetic domains that have a respective size configured to enable the attraction force associated with the respective magnetic part. Alternatively, the locations of the two magnetic parts may be adjusted to enable the first and second attraction forces as needed (e.g., a first magnetic part and a magnetic mounting structure 506 have a substantially smaller distance than another distance between a second magnetic part and the magnetic plate of the camera module 502).

Under some circumstances, attraction force between the magnetic mounting structure 506 and the magnet mount 504 is substantially large for the purposes of providing highly secure attachment of the camera module 502 to the mounting surface. Referring to FIG. 5E, in some implementations, the mounting structure 506 further includes a notch 528 disposed on an edge of the mounting structure 506, such that a user could use a tool (e.g., a screwdriver having a blade) to detach the magnet mount 504 from the mounting structure 506. In some implementations, a detachable non-magnetic material 530 is disposed between the first surface 504A of the magnet mount 504 and the mounting structure 506. The detachable non-magnetic material 530 is configured to increase a distance between the first surface 504A of the magnet mount 504 and the mounting structure 506, and reduce an attraction force between the magnet mount 504 and the mounting structure 506, thereby facilitating detachment of the magnet mount 504 and the mounting structure 506.

When the housing 508 of the camera module 502, the magnet mount 504, the mounting structure 508, the cable 512 and the cable clip 514 are exposed to an outdoor environment, their surfaces could deteriorate under severe weather conditions and comprise their ability to be secured onto the mounting surface or to each other. Thus, in some implementations, one or more of the housing 508 of the camera module, the magnet mount 504, the mounting structure 508, the cable 512 and the cable clip 514 are coated with a matte material. For example, the matte material could enhance contact between the second surface 504B of the magnet mount 504 and the rear surface of the housing 508 of the camera module 502, thereby maintaining stability of the camera module 502 when it is mounted on the mounting surface via the magnet mount 504. In addition, the matte material coating is also configured to protect the exposed surface of the one or more of the housing 508, the magnet mount 504, the mounting structure 508, the cable 512 and the cable clip 514 from ultraviolet light incident thereon, and to avoid a change of color of the exposed surface. In a specific example, the matte material coating is used to protect the rear surface of the housing 508 of the camera module 502 from ultraviolet light incident thereon, and avoid a change of color of the rear surface of the housing 502.

It is understood that the camera module 502 is merely an example of a physical module that could be magnetically mounted onto a mounting surface. The physical module includes one or more of smart thermostats 102, smart hazard detectors 104, smart doorbells 106, smart wall switches 108, smart wall plugs 110, smart appliances 112, pool heater monitors 114, irrigation monitors 116, cameras 118, smart door locks 120, smart alarm systems 122 and other types of smart devices that could be configured to be mounted with a magnet mount 504. As such, an adjustable union between the magnet mount 504 and the physical module could be formed, permitting adjustment of an angle of orientation of the physical module with respect to the magnet mount 504.

Camera Module

Figure 6:
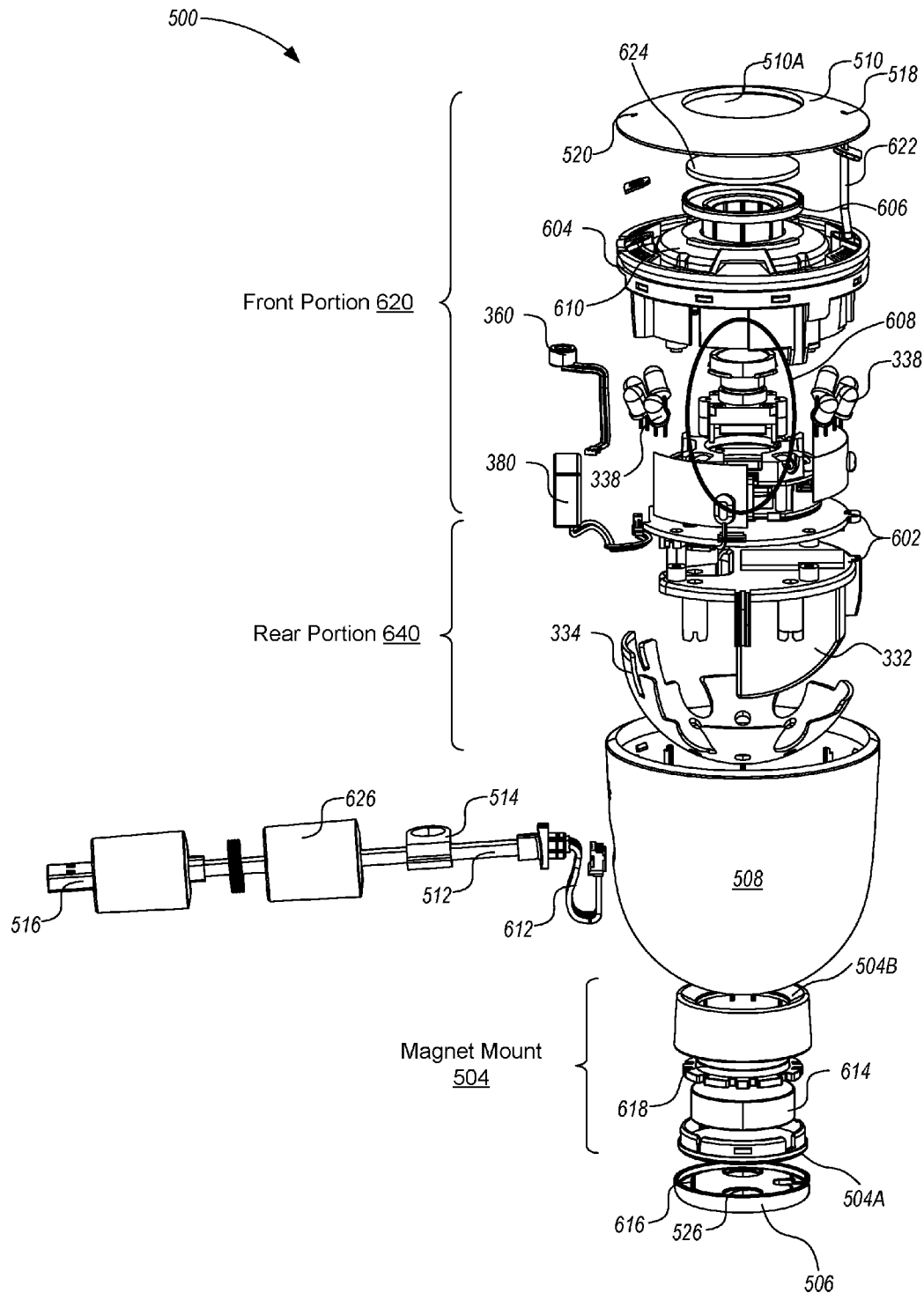
FIG. 6 is an exploded view of a camera assembly in accordance with some implementations.

FIG. 6 is an exploded view of a camera assembly 500 in accordance with some implementations. The camera assembly 500 further includes a camera module 502, a magnet mount 504 and a mounting structure 506. The camera module 502 includes a housing 508. Optionally, the housing 508 is made of non-magnetic material. Optionally, the body of the housing 508 is made of a single piece of material. The body of the housing 508 includes a substantially smooth body surface and has a bullet head shape. An open end of the housing 502 is sealed by a front cover 510, forming a waterproof enclosure configured to contain and protect different components of the camera module 502 under severe weather conditions. The front cover 510 includes a transparent portion 510A (also called a lens cover) configured to permit ambient light incident on a lens of the camera module 502. Optionally, the transparent portion 510A is made of glass, and configured to adhere to the front cover 510 using an adhesive.

The camera module 502 further includes one or more of a lens assembly 330, a heat sink 332, and a magnetic material 334 (e.g., a magnetic plate), image sensors 336, one or more infrared illuminators 338, a microphone 360, a speaker 380, and a PCB assembly 602 including a plurality of electronic components. Optionally, the plurality of electronic components includes one or more processors, memory, power management circuit, microphone and speaker circuit, illuminator drivers and one or more indicator lights. These thermal, optical and electronic components are fully contained and sealed within the housing 508 when the front cover 510 is sealed onto the housing 502.

To some extent, the PCB assembly 602 separates space within the housing 508 to a front portion 620 and a rear portion 640. The front portion 620 of the camera module 500 includes a front enclosure structure 604 configured to facilitate enclosing the housing 508 with the front cover 510, assembling a transparent portion 510A onto the front cover 510, supporting a microphone 360 and an indicator light, and/or enabling a compact concentric lens arrangement for the lens assembly 330. In some implementations, both the housing 508 and the front cover 510 are glued to a front rim of the front enclosure structure 604, thereby enabling a fully sealed camera body for the camera module 502. Further, in some implementations, a microphone 360 is mounted on the front enclosure structure 604 to access the first opening 520 on the front cover 510. A light pipe 622 could also be routed through a peripheral region of the front enclosure structure 604, such that light from an indicator light mounted on the PCB assembly 602 can be guided to reach the indicator window 518 on the front cover 510. Further, in some implementations, the front enclosure structure 604 could include an opening structure around its central axis, and the opening structure is configured to receive a cover glass frame 606 on which a transparent cover glass 624 is mounted. When the transparent cover glass 624 is attached to the front cover 510, the transparent portion 510A is formed in a central area of the front cover 510 to expose pass ambient light incident thereon.

The lens assembly 330 is disposed inside the front portion of the camera module 500 and in proximity to the front cover 510. More specifically, in some implementations, the lens assembly 330 includes a set of parallel lenses 608 and a ring lens 610. The ring lens 610 is mounted on the front enclosure structure 504, while the set of parallel lenses 608 is disposed substantially within the central opening structure of the front enclosure structure 604, and the ring lens 610 is configured to surround the set of parallel lenses 608 in a concentric manner. The set of parallel lenses 608 is configured to focus incident light on the image sensors 336, which are mounted on the PCB assembly 602 and aligned with the parallel lens 608. The parallel lenses 608 are configured to capture respective color components (e.g., R, G and B components) of the incident light focused on respective sensor array locations. The ring lens 610 is disposed in front of infrared illuminator 338 to diffuse infrared light generated therefrom to create substantially uniform illumination in a field of view.

In some implementations, when the camera 502 is in Day mode, a filter is enabled to join the set of parallel lenses 608 for blocking a substantial portion of the IR components of the incident light. Alternatively, when the camera 502 is in Night mode, the filter is disabled from the set of parallel lenses 608, allowing the image sensors 336 to receive incident IR light from a scene illuminated by the camera's onboard IR illuminators 338 or external IR illuminators. Referring to FIG. 6, in a specific example, the IR illuminators 338 includes eight infrared LEDs disposed between the PCB assembly 602 and the front enclosure structure 604. Each illuminator 338 is slightly tilted away from a central axis of the camera module 502, and forms a tilting angle with respect to the central axis of the camera module 502, thereby enabling substantially uniform illumination over the field of view of the camera module 502.

The rear portion 640 of the camera module 502 includes at least the heat sink 332 and the magnetic material 334. The magnetic material 334 is magnetically attractable to a magnet, i.e., responsive to a magnetic field. The magnetic plate could be an electromagnet that does not retain their magnetism when removed from a magnetic field, or a permanent magnet that strongly resists demagnetization once magnetized. Example magnetic material includes iron, low-carbon steels, iron-silicon alloys, iron-aluminum-silicon alloys, nickel-iron alloys, iron-cobalt alloys, ferrites, amorphous alloys, ceramic magnet, the Alnicos, and the cobalt-samarium, iron-neodymium, iron-chromium-cobalt, and elongated single-domain (ESD) types of magnet. In some implementations, the magnetic material 334 includes a magnetic plate. The magnetic plate 334 is coupled to an interior surface of the rear portion 640 of the housing 508 and has predetermined dimensions. The magnetic material 334 is concealed within the housing 508. Unlike the magnetic material 334, the housing 508 is not made of magnetic material. Optionally, the magnetic material 334 has a symmetric shape.

The heat sink 332 is disposed between the PCB assembly 602 and the magnetic material 334. The heat sink 332 is made of thermally conductive material, coupled to electronic components of camera 118 (e.g., processor 302) mounted on the PCB assembly 602, and configured to absorb the heat generated by the electronic components. The heat sink 332 is mechanically and thermally coupled to the magnetic material 334 to further transfer at least part of the generated heat to the magnetic material 334, thereby directing the heat away from the front portion of camera 118 where sensitive optical or electrical components are located. Thus, in some implementations, the magnetic material 334 is configured to be attracted to a magnet mount (e.g., magnet mount 224) for mounting camera 118 onto a mounting surface while at least partially dissipating heat generated by the electronic components of camera 118.

Further, in some implementations, a cable 512 is configured to be extended from a side surface (or a bottom surface) of the camera module 502. A first end of the cable 512 is fixed and entirely sealed on the side surface of the camera module 502 to protect the interior of the camera module 502 from water permeation. In some implementations, the first end of the cable 512 is electrically coupled to an electronic component (e.g., a power management circuit) integrated on the PCB assembly 602. The cable 512 further includes a second end opposing the first end, and the second end of the cable 512 is connected to a first connector 516 configured to mate with a second connector of an electronic hub (e.g., a power adapter 232 shown in FIG. 2) for receiving a power supply from and/or exchanging data with the electronic hub. In a specific example, the first connector 516 of the cable 512 includes a male USB connector. When the camera module 502 is applied in an outdoor environment, the first connector 516, at least when mated with the second connector, is protected from water permeation. The first and second connectors are configured to incorporate a locking mechanism and sealing structures (e.g., a connector cover 626) that enable secure electrical and mechanical connections between the first and second connectors. More details on waterproof electronic connectors are explained below with reference to FIGS. 19-25.

Referring to FIG. 6, a magnet mount 504 is configured to receive the camera module 502, and includes a first surface 504A, a second surface 504B and a magnetic material 614 (e.g., a magnet) disposed between the first and second surfaces. The second surface 504B of the magnet mount 504 opposes the first surface 504A, and have a second shape that is substantially complementary to a first shape of a rear surface of the housing 508 of the camera module 502. The second surface 504B of the magnet mount 504 is configured to engage the rear surface of the housing 508 of the camera module 502. Specifically, in some implementations, the first shape of the rear surface of the housing 508 is substantially convex, and the second shape of the second surface 504B is substantially concave.

The first surface 504A is configured to attach to a mounting surface directly or indirectly. For example, when the mounting surface (a surface of a refrigerator) is made of magnetic material, the first surface 504A could attach directly to the mounting surface. Alternatively, in some implementations, a magnetic mounting structure 506 is configured to be attached and fixed onto the mounting surface, and the first surface 504A of the magnet mount is configured to attach to the mounting surface indirectly via the magnetic mounting structure 506. In some implementations, the first surface 504A of the magnet mount 504 includes a first stopper structure (not shown in FIG. 6), and the mounting structure 506 includes a second stopper structure 616 (e.g., a notch or a flat edge of a protrusion) on a front surface that receives the first surface 504A of the magnet mount 504. The first stopper structure is configured to mate with the second stopper structure 616, thereby preventing the magnet mount 504 from rotating with respect to the mounting structure 506. In a specific example, the first stopper structure is an recess on the first surface 504A and includes a flat edge, and the second stopper structure is a protrusion on the front surface of the mounting structure 506 and includes another flat edge that matches that of the recess on the first surface 504A of the magnet mount 504. The flat edges on the magnet mount 504 and the mounting structure 506 are configured to block the magnet mount 504 from rotating with respect to the mounting structure 506.

In some implementations, the magnet mount 504 further includes a friction pad 618. Optionally, the friction pad is mounted on a holding plate having a larger diameter than that of the friction pad 618. The second surface 504B of the magnet mount 504 includes a cutout opening that matches the dimension of the friction pad. When the holding plate is disposed adjacent to the second surface 504B, the friction pad 618 protrudes above the second surface 504B. As such, the friction pad 618 is embedded on the second surface 504B. The friction pad 618 has a shape substantially similar to that of the second surface 504B, and protrudes above the second surface by a predefined height (e.g., no greater than 5 mm). Further, in some implementations, the friction pad 618 is made of rubber or silicone that introduces friction between the second surface 504B of the magnet mount 504 and the rear surface of the camera module 502, thereby maintaining stability of the camera module 502 when it is mounted on the mounting surface via the magnet mount 504 and the mounting structure 506.

Magnet Mount and/or Mounting Structure for Supporting Camera Module

Figure 7A:
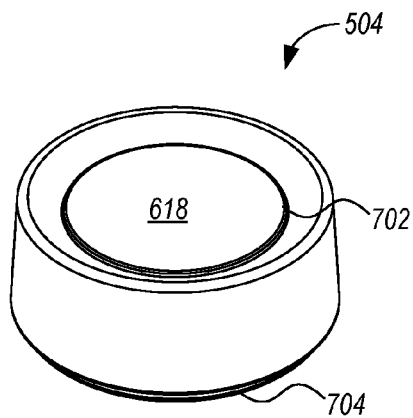
FIGS. 7A and 7B are two perspective views of a magnet mount viewed from a first surface and a second surface of the magnet mount in accordance with some implementations, respectively.
Figure 7B:
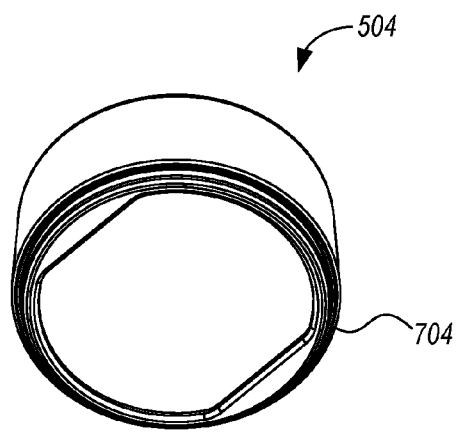
Figure 7C:
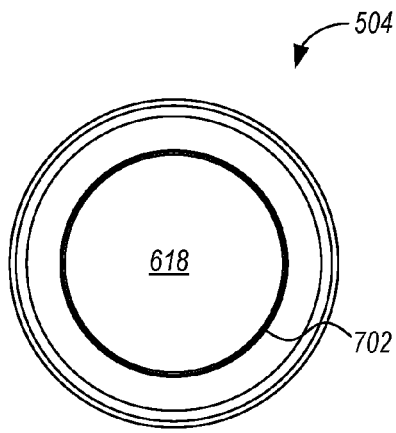
FIGS. 7C-7E illustrate a top view, a rear view, and a side view of a magnet mount in accordance with some implementations. The first surface is substantially flat.
Figure 7D:
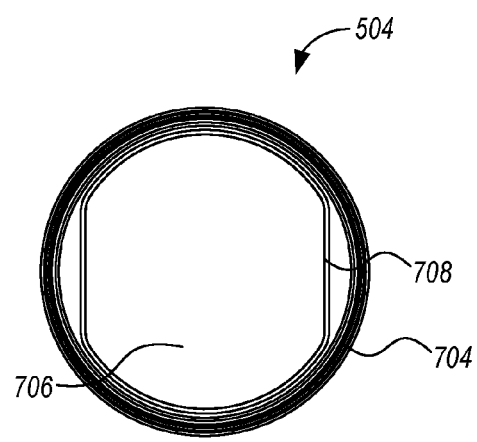
Figure 7E:
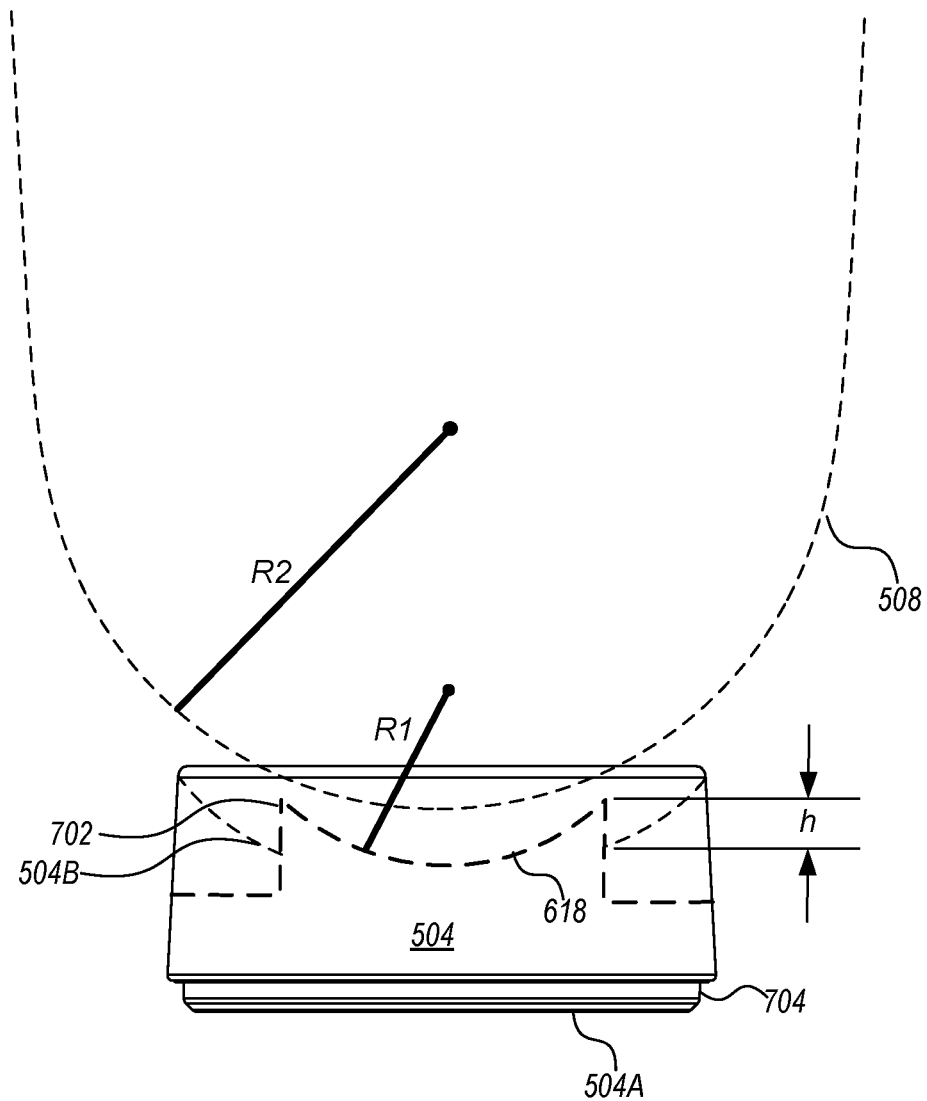

FIGS. 7A and 7B are two perspective views of a magnet mount 504 viewed from a first surface 504A and a second surface 504B of the magnet mount 504 in accordance with some implementations, respectively, and FIGS. 7C-7E illustrate a top view, a rear view, and a side view of a magnet mount 504 in accordance with some implementations. The first surface 504A is substantially flat. The first surface 504A is configured to attach to a mounting surface directly, or attach to a front surface of a mounting structure that could be fixed onto the mounting surface. The second surface 504B opposes the first surface, and has a second shape that is substantially complementary to a first shape of the rear surface of the housing 508 of the camera module 502. The second surface 504B of the magnet mount 504 is configured to engage the rear surface of the housing 508 of the camera module 502. In some implementations, the second shape 504B is substantially concave.

In some implementations, the first surface 504A has a rim 704 complementary to another rim of a mounting structure 506, and is covered with a friction pad 706 to enhance attachment of the first surface 504A to the front surface of the mounting structure 506. The friction pad 706 is made of polymeric material (e.g., rubber and silicone). Further, in some implementations, the first surface 504A of the magnet mount 504 includes a first stopper structure 708 (e.g., a recess or a protrusion) configured to mate with a second stopper structure 616 on the front surface of the mounting structure 506, thereby preventing the magnet mount 504 from rotating with respect to the mounting structure 508. When the camera module 502 is mounted onto the mounting surface via both the magnet mount 504 and the mounting structure 506, the magnet mount 504 cannot be rotated with respect to the mounting structure 506 and the mounting surface, while the camera module 502 can be rotated within the second surface 506 of the magnet mount 504.

Referring to FIG. 7E, in some implementations, the magnet mount 504 includes a friction pad 618 that is embedded on the second surface 504B. The friction pad 618 protrudes above the second surface 504B of the magnet mount 504 by a predefined height (h), and has a third shape that is substantially consistent with the second shape of the second surface 504B of the magnet mount 504. The friction pad 618 is configured to come into contact with the rear surface of the housing 508 of the camera module 502 at least via a peripheral edge 702 of the friction pad 618 (i.e., in some implementations, the magnet mount 504 and the camera module 502 are configured to physically couple to one another via a circular peripheral edge). The friction pad 618 has a radius of curvature (R1) that is smaller than that (R2) of the rear surface of the housing 508 of the camera module 502.

FIGS. 7F-7H illustrate an angle of orientation of a camera module 502 with respect to a magnet mount 504 in accordance with some implementations. When the camera module 502 is magnetically coupled to the magnet mount 504, an adjustable union between the magnet mount 504 and the camera module 502 is formed that permits adjustment of an angle of orientation of the camera module with respect to the magnet mount 504, where the angle of orientation is limited by a stopping structure of the camera module 502. Stated another way, in accordance with the adjustable union, the camera module 502 can be freely oriented towards different directions and have an unlimited number of degrees of freedom of rotation. In some implementations, each of the unlimited number of degrees of freedom of rotation is limited within a respective range of rotation. For example, referring to FIGS. 7G and 7H, the camera module 502 has a first limit to the angle of orientation (A1) for a first direction of a first degree of freedom of rotation, and a second limit to the angle of orientation (A2) for a second direction of the first degree of freedom of rotation that is reverse to the first direction. Optionally, the first limit (A1) is equal to the second limit (A2) when the stopping structure of the camera module 502 is symmetric with respect to a central axis 750 of the camera module 502 in the first degree of freedom. Optionally, the first limit (A1) is distinct from the second limit (A2) when the stopping structure of the camera module 502 is asymmetric with respect to the central axis 750 of the camera module 502 in the first degree of freedom.

In some implementations, the stopping structure of the camera module 502 includes one or more physical stops 710 disposed on the rear surface of the housing of the camera module 502. The magnet mount 504 hits the one or more physical stops 710 when the camera module 502 is rotated to reach the limit of the angle of orientation. Alternatively, in some implementations, to define the limit to the angle of orientation of the camera module 502, the magnetic material 334 attached to an interior surface of the housing 502 is configured to have predetermined geometry and dimensions or couple to magnets having an opposite polarity to that of the magnet material 614 of the magnet mount 504. More details on the magnetic material 334 and the magnets having the opposite polarity are explained below with reference to FIGS. 12A-12D.

Further, in some implementations, in accordance with a second degree of freedom of rotation (e.g., FIG. 7A), the camera module 502 has an unlimited range of rotation with respect to the central axis 750 of the camera module 502.

Figure 8A:
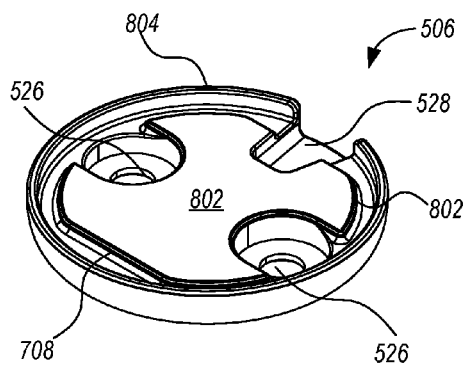
FIGS. 8A and 8B are two perspective views of a mounting structure viewed from a front side and a backside of the mounting structure in accordance with some implementations, respectively.
Figure 8B:
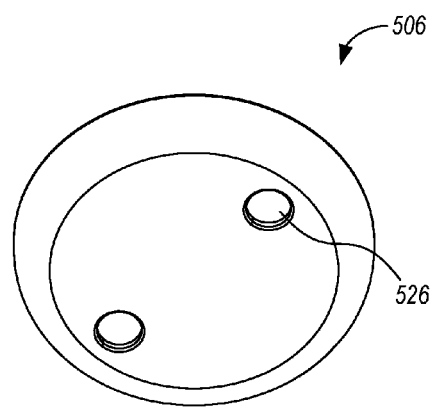
Figure 8C:
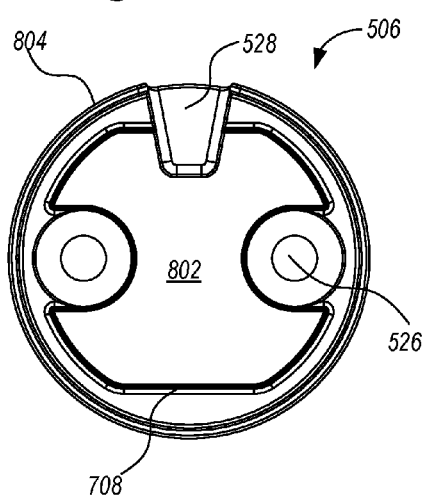
FIGS. 8C-8F illustrate a top view, a rear view, and two side views of a magnet mount in accordance with some implementations.
Figure 8D:
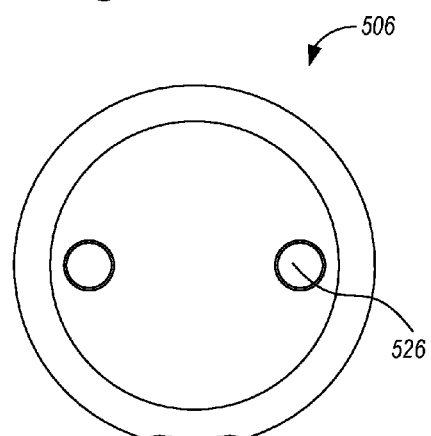
Figure 8E:
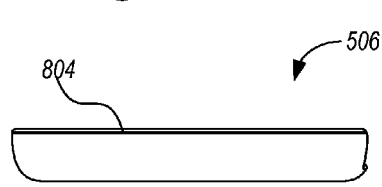
Figure 8F:
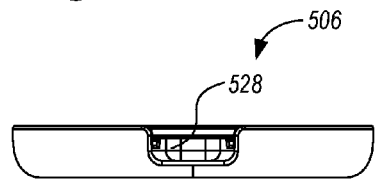

FIGS. 8A and 8B are two perspective views of a mounting structure 506 viewed from a front side and a backside of the mounting structure 506 in accordance with some implementations, respectively, and FIGS. 8C-8F illustrate a top view, a rear view, and two side views of a magnet mount 504 in accordance with some implementations. In some implementations, the mounting structure 506 includes a magnetic part made of magnetic material, and the magnetic part is magnetically attractable to a magnet, i.e., responsive to a magnetic field. The magnetic part could be an electromagnet that does not retain their magnetism when removed from a magnetic field, or a permanent magnet that strongly resists demagnetization once magnetized. Example magnetic material of the magnetic part includes iron, low-carbon steels, iron-silicon alloys, iron-aluminum-silicon alloys, nickel-iron alloys, iron-cobalt alloys, ferrites, amorphous alloys, ceramic magnet, the Alnicos, and the cobalt-samarium, iron-neodymium, iron-chromium-cobalt, and elongated single-domain (ESD) types of magnet.

The mounting structure 506 includes one or more fastener structures 526 (e.g., openings) configured to receive one or more fasteners. When the one or more fasteners are integrated with the one or more fastener structures 526, the mounting structure 506 is securely fixed onto the mounting surface. In a specific example, the one or more fastener structure 526 includes two holes on the mounting structure 506, and configured to receive nails or screws that can fix the mounting structure 506 onto the mounting surface when the nails or screws are driven into the holes. It is noted that the holes need to be recessed into the mounting structure 526 such that when the nails or screws are driven into the holes, their heads are lower than the front surface 802 of the mounting structure 506 without blocking contact between the front surface 802 of the mounting structure 506 and the second surface 504B of the magnet mount 504.

In some implementations, the mounting structure 506 includes a rim 804 complementary to the rim 704 on the first surface 504A of the magnet mount 504. In some implementations, the front surface 802 is optionally made of polymeric material (e.g., rubber and silicone) so as to enhance attachment of the first surface 504A of the magnet mount 504 to the front surface 802 of the mounting structure 506. Further, in some implementations, the front surface 802 of the mounting structure 506 includes a second stopper structure 806 (e.g., a recess or a protrusion) configured to mate with a first stopper structure 706 on the front surface 504A of the magnet mount 504, thereby preventing the magnet mount 504 from rotating with respect to the mounting structure 508.

Under some circumstances, attraction force between the mounting structure 506 and the magnet mount 504 is substantially large for the purposes of providing highly secure attachment of the camera module 502 to the mounting surface. In some implementations, the mounting structure 506 further includes a notch 528 disposed on the rim 804 of the mounting structure 506, such that a user could use a tool (e.g., a screwdriver having a blade) to detach the magnet mount 504 from the mounting structure 506.

Figure 9A:
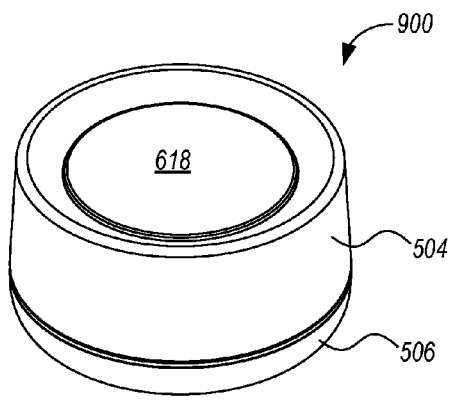
FIGS. 9A and 9B are two perspective views of a mounting assembly including a magnet mount that is attached to a mounting structure in accordance with some implementations.
Figure 9B:
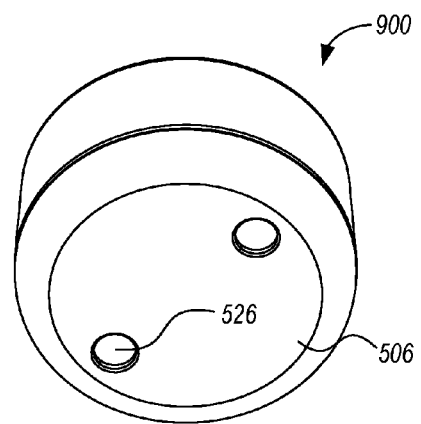
Figure 9C:
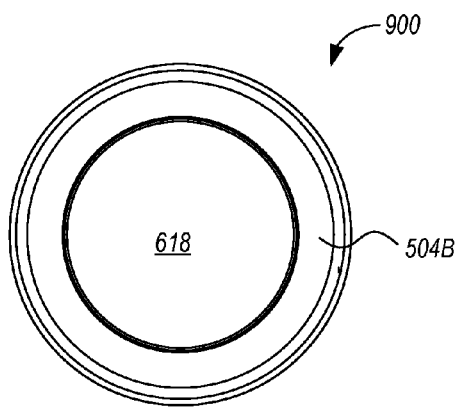
FIGS. 9C-9F illustrate a top view, a rear view, and two side views of the mounting assembly in accordance with some implementations.
Figure 9D:
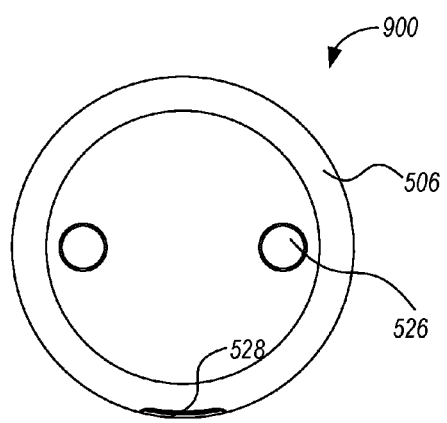
Figure 9E:
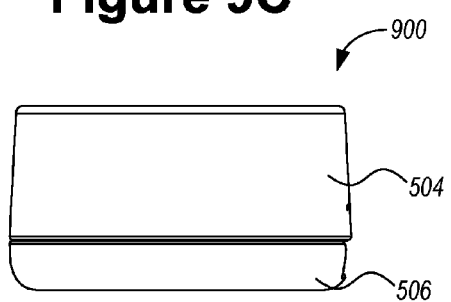
Figure 9F:
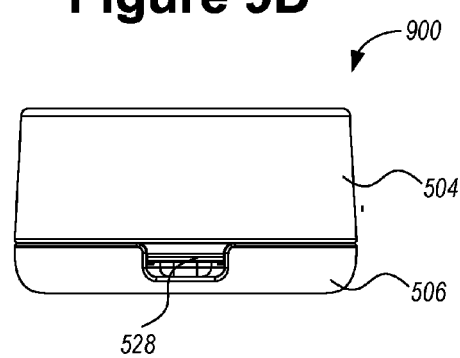
Figure 12A:
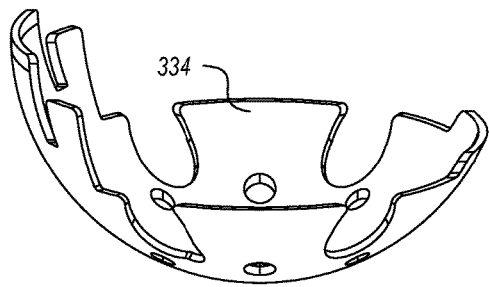
FIGS. 12A-12D are a perspective view, a front view, a side view and a rear view of a magnetic plate that adheres to an interior surface of a rear portion of a camera module in accordance with some implementations.
Figure 12B:
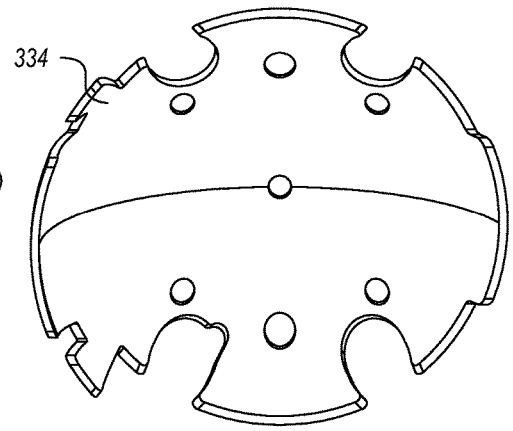
Figure 12C:
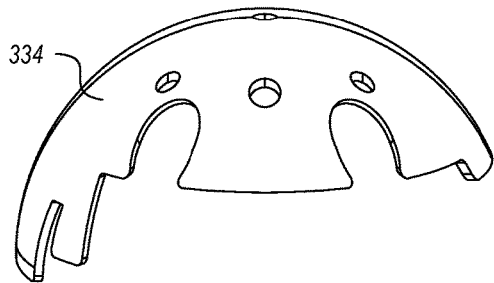
Figure 12D:
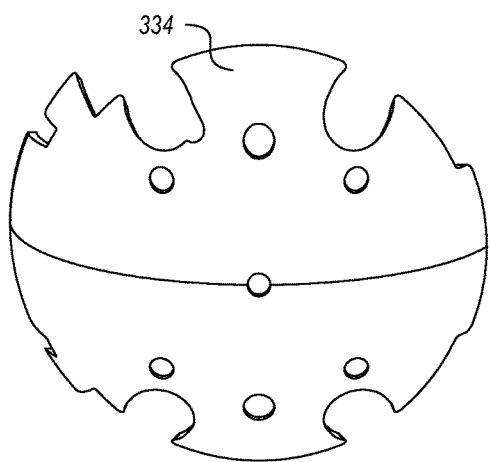

FIGS. 9A and 9B are two perspective views of a mounting assembly 900 including a magnet mount 504 that is attached to a mounting structure 506 in accordance with some implementations, and FIGS. 9C-9F illustrate a top view, a rear view, and two side views of the mounting assembly 900 in accordance with some implementations. The magnet mount 504 is magnetically coupled to the mounting structure 506. The rim 704 of the magnet mount is complementary to the rim 804 of the mounting structure 506, providing a compact form factor and secure attachment to the mounting assembly 900. In some implementations, the notch 528 is disposed on the rim 804 of the mounting structure 506 and at an interface between the magnet mount 504 and the mounting structure 508, and a user could use a tool (e.g., a screwdriver having a blade) to detach the magnet mount 504 from the mounting structure 506.

FIGS. 10A and 10B are two perspective views of a mounting assembly 900 including a magnet mount 504 and a mounting structure 506 presented in an exploded manner in accordance with some implementations. When the magnet mount 504 is magnetically coupled to the mounting structure 506, the first surface 504A of the magnet mount, the front surface 802 of the mounting structure 506 and mechanical features on these surfaces are entirely sealed within the mounting assembly 900, except that the notch 528 disposed on the rim 804 of the mounting structure 504. In some implementations, the notch 528 is used as an alignment mark (e.g., the notch 528 could be oriented towards a floor), when the mounting structure 506 is fixed onto a mounting surface.

FIGS. 11A and 11B are another two perspective views of a mounting assembly 900 including a magnet mount 504 and a mounting structure 506 presented in an exploded manner in accordance with some implementations. The magnet mount 504 includes a housing body 1102 and a base 1104 that provide the second surface 504B and the first surface 504B when they are assembled into the magnet mount 504, respectively. In some implementations, the magnet mount 504 is used in an outdoor environment, and the housing body 1102 and the base 1104 are sealed against water permeation.

In some implementations, the friction pad 618 of the magnet mount 504 is supported by a holding plate 1106 having a larger diameter than that of the friction pad 618. The second surface 504B of the housing body 1102 includes a cutout opening 1108 that matches the dimension of the friction pad 618. When the holding plate 1106 is disposed within the housing body 1102 and adjacent to the second surface 504B, the friction pad 618 protrudes above the second surface 504B, and is thereby embedded on the second surface 504B of the magnet mount 504. The friction pad 618 has a shape substantially similar to that of the second surface 504B, and protrudes above the second surface by a predefined height (e.g., no greater than 5 mm). Further, in some implementations, the friction pad 618 is made of rubber that introduces friction between the second surface 504B of the magnet mount 504 and the rear surface of the camera module 502, and configured to maintain stability of the camera module 502 when the camera module 502 is mounted on the mounting surface via the magnet mount 504 and the mounting structure 506. In some implementations, the friction pad 618 is made of a polymeric material that is resistant to weather, and examples of the friction pad include rubber and silicone.

In some implementations, the shape of the second surface 504B of the magnet mount 504 is substantially concave, and the friction pad 618 also has a substantially concave shape but protrudes above the second surface by the predefined height. Further, in some implementations, the friction pad 618, when embedded onto the second surface 504B, is configured to come into contact with the rear surface of the housing 508 of the camera module 502 at least via a peripheral edge 702 of the substantially concave friction pad 618. Specifically, the friction pad 618 could have a substantially concave inner surface having a first radius of curvature (R1), and the rear surface of the housing 508 of the camera module 502 has a second radius of curvature (R2) that is substantially larger than the first radius of curvature.

The magnet mount 504 further includes a magnetic material 614 disposed between the holding pate 1106 and the base 1104. When the camera module 502 is magnetically coupled to the magnet mount 504, an adjustable union between the magnet mount and the camera module 502 is formed permitting adjustment of an angle of orientation of the camera module 502 with respect to the magnet mount 504. In some implementations, the magnetic material 614 at least partially includes a high-performance permanent magnet (e.g., Neodymium Magnets N52), such that the magnetic material 614 could provide substantially strong adhesion force with a relatively small size of magnet. In some implementations, the magnetic material 614 includes a single piece of magnet that magnetically attracts the camera module 502 and the mounting structure 506 from its two opposing sides. The magnet 502 could be positioned to have a smaller distance to the mounting structure 506 than to the rear surface of the camera module 502, rendering larger attraction force with the mounting structure 506 than with the camera module 502.

In some implementations, the magnetic material 614 of the magnet mount 504 includes two magnetic parts that are respectively disposed in proximity to the first and second surfaces 504A and 504B, and enable the first and second attraction forces. Each of the two magnetic parts could include a plurality of magnetic domains that have a respective size configured to enable the attraction force associated with the respective magnetic part. Alternatively, the locations of the two magnetic parts may be adjusted to enable the first and second attraction forces as needed. For example, a first magnetic part and a magnetic mounting structure 506 have a substantially smaller distance than another distance between a second magnetic part and the magnetic plate of the camera module 502, such that the magnetic material 614 could have substantially larger first attraction force with the mounting structure 506 than the second attraction force with the camera module 502.

Magnetic Plate for Holding Camera Module

FIGS. 12A-12D are a perspective view, a front view, a side view and a rear view of a magnetic material 334 that adheres to an interior surface of a rear portion of a camera module 502 in accordance with some implementations. The interior surface of the camera module 502 to which the magnetic material 334 adheres opposes the rear surface of the camera module 502. The magnetic material 334 is concealed within the camera module 502. In some implementations, the magnetic material 334 of the camera module 502 has an area that is substantially greater than that of a cross section of the magnetic material 614 included in the magnet mount 504. In some implementations, the magnetic material 334 has a symmetric shape.

The magnetic material 334 is magnetically attractable to a magnet, i.e., responsive to a magnetic field. The magnetic plate could be an electromagnet that does not retain their magnetism when removed from a magnetic field, or a permanent magnet that strongly resists demagnetization once magnetized. Example magnetic material includes iron, low-carbon steels, iron-silicon alloys, iron-aluminum-silicon alloys, nickel-iron alloys, iron-cobalt alloys, ferrites, amorphous alloys, ceramic magnet, the Alnicos, and the cobalt-samarium, iron-neodymium, iron-chromium-cobalt, and elongated single-domain (ESD) types of magnet.

In some implementations, the magnetic material 614 of the magnet mount 504 includes a first magnetic part that is disposed in proximity to the second surface 504B of the magnet mount 504 and configured to attract the magnetic material 334 of the camera module 502. When the camera module 502 is magnetically coupled to the magnet mount 504, an adjustable union between the magnet mount and the camera module 502 is formed permitting adjustment of an angle of orientation of the camera module 502 with respect to the magnet mount 504. The angle of orientation of the camera module 502 is limited by a stopping structure of the camera module 502. Optionally, the stopping structure of the camera module 502 includes the magnetic material 334 that has predetermined geometry and dimensions, and the angle of orientation of the camera module 502 is limited by the physical geometry and dimensions of the magnetic material 334 of the camera module 502. For example, when the camera module 502 is rotated to an edge position at which only part of the magnetic material 334 of the camera module 502 overlaps the magnetic material 614 of the magnet mount 504, attraction force of the magnetic material 614 of the magnet mount 504 tends to pull the camera module 502 back such that the magnetic material 334 of the camera module 502 could overlap with the magnetic material 614 of the magnet mount 504 with a larger area and enable larger attraction force.

Alternatively, in some implementations, the stopping structure of the camera module 502 further includes one or more magnetic parts disposed on the interior surface of the camera module 502 and adjacent to the magnetic material 334 (i.e., disposed next to the magnetic material 334). The one or more magnetic parts of the camera module 502 and the magnetic material 614 of the magnet mount 504 are configured to repel each other, thereby limiting the angle of orientation of the camera module 502. In a specific example, the one or more magnetic parts includes a magnet ring attached to the interior surface of the rear portion of the housing 508 and surrounding the magnetic material 334.

In some implementations, the magnetic material 334 includes a plate, and the plate is configured to spread and dissipate heat generated by electronic components in the camera module 502. Therefore, the plate 334 is magnetically attractable and thermally conductive, such that it could be configured to be attracted to a magnet mount for mounting the camera onto a mounting surface while at least partially dissipating heat generated by the plurality of electronic components disposed on the PCB assembly 602. On the other hand, in some implementations, a plate, when used only for heat spreading and dissipation, is made of thermally conductive material that is not necessarily magnetically attractable.

Heat Transfer and Dissipation

FIGS. 13A-13D are four perspective views of a heat sink 330 that is mounted on a backside of a board 1302 in accordance with some implementations, and FIGS. 13E-13H are a top view and three side views of a heat sink 330 that is mounted on a backside of a board 1302 in accordance with some implementations. The board 1302 includes a printed circuit board that is part of the PCB assembly 602.

As explained above with reference to FIGS. 6 and 12A-12D, a camera module 502 includes a housing 508, a lens assembly 330 and a plurality of electronic components. The lens assembly is arranged at a front portion of the housing and configured for focusing light received from outside of the camera. The plurality of electronic components is arranged at the front portion 620 of the housing 508, and further includes an image sensor coupled to receive light through the lens assembly 330, a memory 306 for storing information, a processor 302 for processing information from the image sensor, and a wireless communication module 304 for wirelessly communicating with an electronic device. The camera further includes a heat dissipation element arranged at a rear portion 640 of the housing 508, and located between the plurality of electronic components and a rear surface of the housing 508. The heat dissipation element is configured to transfer heat from the plurality of electronic components to the rear portion of the housing. In some implementations, the heat dissipation element includes a plate (e.g., the magnetic plate 334) and a heat sink 332. The heat sink 332 is made of thermally conductive material and coupled to the plurality of electronic components to absorb the heat generated by the plurality of electronic components. The heat sink 332 is also mechanically and thermally coupled to the plate to further transfer at least part of the generated heat to the plate. The plate is coupled between the heat sink 332 and the rear surface of the rear portion 640 of the housing 508, and configured to at least partially dissipate heat generated by the plurality of electronic components, such that the heat is directed away from the front portion 620 of the camera where sensitive optical or electrical components are located.

More specifically, the housing 508 of the camera module 502 contains the lens assembly and the plurality of electronic components in its front portion 620, and the plate (e.g., the magnetic plate 334) is attached to an interior surface of the rear portion 640 of the housing 508 that is opposite the front portion 620 of the housing. In some implementations, the heat sink 332 is made of thermally conductive material, and is mounted on the backside of the board 1302, which is part of the PCB assembly 602 of the camera module 502. The heat sink 332 is coupled to the plurality of electronic components to absorb the heat generated by the plurality of electronic components, and mechanically and thermally coupled to the plate (not shown in FIGS. 13A-13H) to further transfer at least part of the generated heat to the plate 332. The plate is configured to at least partially dissipate heat generated by the plurality of electronic components, such that the heat is directed away from the front portion 620 of the camera module 502 where sensitive optical or electrical components are located. In some implementations, the plate and the heat sink 332 are integrated as one component for dissipating the heat generated by the plurality of electronic components.

Stated another way, in some implementations, the heat dissipation element (including the heat sink 332 and the plate) is disposed between the interior surface of the rear portion 640 of the housing 508 and a printed circuit board (PCB) 1302 on which at least a subset of the plurality of electronic components are mounted, thereby facilitating heat transfer from the front portion 620 of the camera module 502 to the rear portion 640 of the camera module 502. A rear portion of the heat sink 332 could have a first shape that conforms to the plate and the interior surface of the rear portion of the housing, and a front portion of the heat sink 332 could have a second shape that conforms to a rear surface of the board 1302. In some implementations, the heat sink 332 is bonded to the plate via a thermoplastic substance that has a substantially high thermal conductivity. Therefore, the heat sink 332 provides a fast path to dissipate the heat generated by the plurality of electronic components located in the front portion 620 of the housing 508 to the plate located in the rear portion 640 of the housing 508.

In some implementations, the plate includes a magnetic plate 334 configured to be attracted to the magnet mount 504 for mounting the camera module 502 onto a mounting surface while at least partially dissipating heat generated by the plurality of electronic components.

In some implementations, the camera module 502 includes an outdoor camera module that is mounted and applied for outdoor surveillance. In some implementations, the thermally conductive material of the heat sink 332 is a non-magnetic material. More specifically, the heat sink 332 could be made of Aluminum and have a substantially low weight. The light weight of the heat sink 332 facilitates the application of the camera module 502 for outdoor surveillance.

In some implementations, the heat sink 332 is made of a solid piece of material. Alternatively, in some implementations, referring to FIG. 13B, the heat sink 332 includes a waffle-like structure to further reduce its weight. In some implementations, the waffle-like structure includes a plurality of hollow pillars 1304. The hollow pillars 1304 are configured to avoid formation of air bubbles during a casting process of the heat sink 332. Given that the air bubbles in the heat sink 332 could compromise its heat transfer capacity, application of the hollow pillars ensures the heat transfer capacity while reducing the weight of the heat sink 332. In some implementations, the plurality of hollow pillars 1304 are parallel, and extend from a front surface to a rear surface of the heat sink 332. A respective cross section of each of the plurality of hollow pillars 1304 could be one of square, round, rectangular, and triangular shapes.

Waterproof Microphone and/or Speaker

Referring to FIGS. 5A-5H and 6, the front cover 510 of the camera module 502 includes a first opening 520, and a bottom side of the housing 508 includes one or more second openings 524. The first and second openings provide access to respective sound transmission paths associated with the microphone 360 and the speaker 380, respectively. In some implementations, when the camera module 502 is configured for use in an environment where it can be exposed to water (e.g., in an outdoor environment); consequently, the microphone 360, the speaker 380, their associated sound transmission paths and their associated openings on the camera module 502 are configured to resist water permeation, such as from a jet or stream of water impinging on one of the first and second openings 520, 524.

In accordance with some implementations of this application, a waterproof electronic device (e.g., the camera module 502 or another smart device described with reference to FIG. 1) includes a housing, a first transducer (e.g., a microphone 360, a speaker 380), a first hydrophobic membrane, and a first sound transmission channel. The waterproof electronic device is configured to allow sound waves to be coupled to the first transducer without exposing the first transducer to damaging pressures due to environmental impacts on the waterproof electronic device. More specifically, in some implementations, the waterproof electronic device includes a camera module 502, and the first transducer includes a microphone 360. More details on a waterproof microphone 360 installed on a cameral module 502 is explained below with reference to FIGS. 14A-14F, 15A and 15B. In some implementations, the waterproof electronic device includes the camera module 502, and the first transducer includes a speaker 380. Alternatively, in some implementations, the camera module 502 includes both a microphone 360 and a speaker 380 that are used as the first transducer and a second transducer, respectively. More details on a waterproof speaker 380 installed on a cameral module 502 is further explained below with reference to FIGS. 16A-16F, 17A and 17B.

Figure 14A:
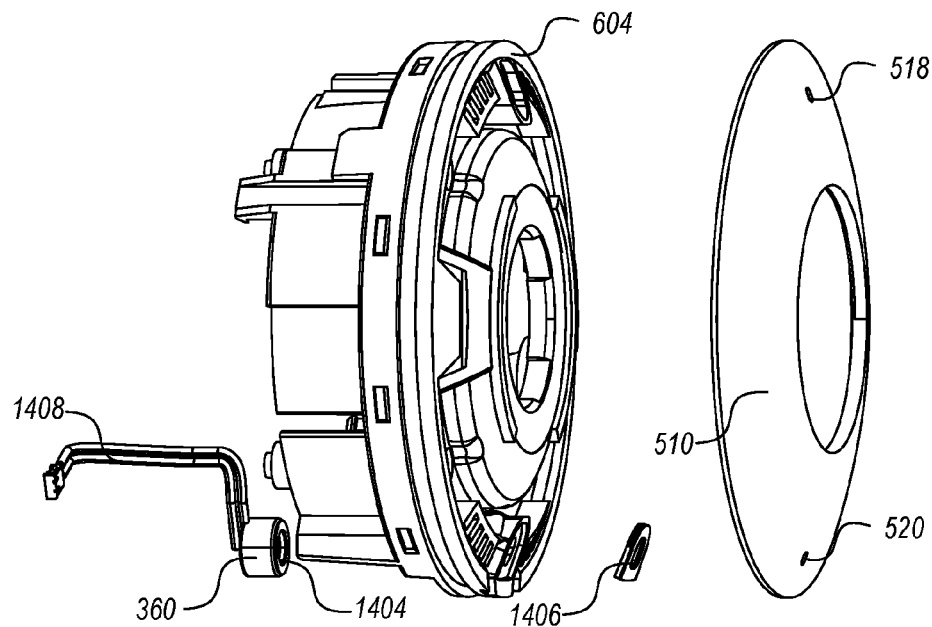
FIGS. 14A and 14B are two perspective views of a microphone mounted on a front enclosure structure of a camera module and presented in an exploded manner in accordance with some implementations.
Figure 14B:
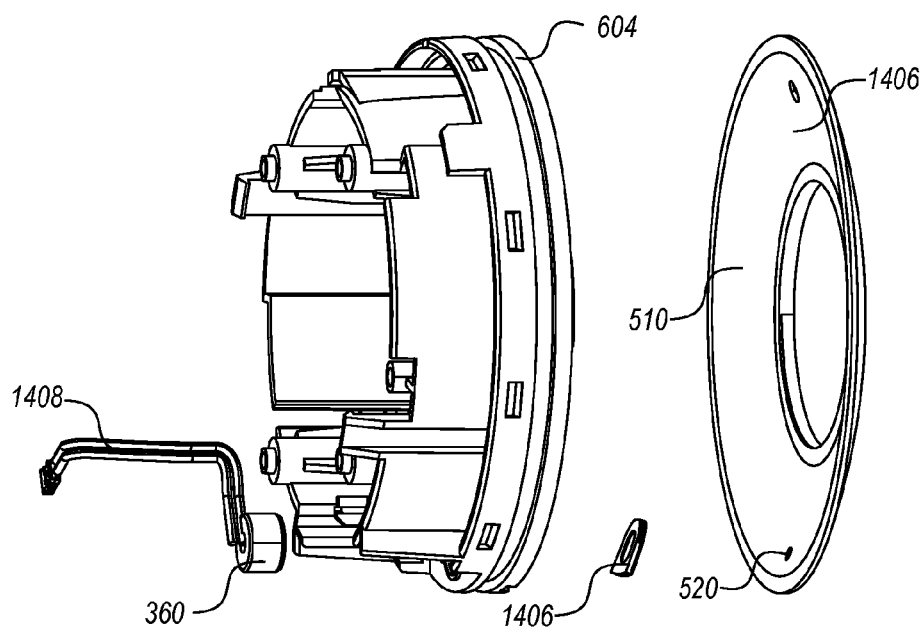
Figure 15A:
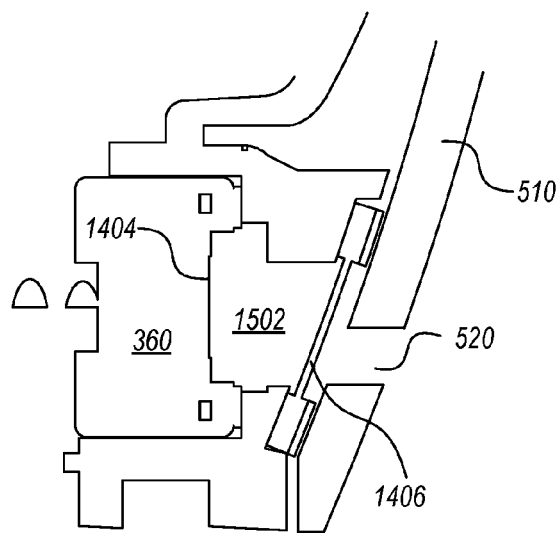
FIGS. 15A and 15B are cross sectional views of two example waterproof microphones that are assembled in a front portion of a camera module in accordance with some implementations.
Figure 15B:
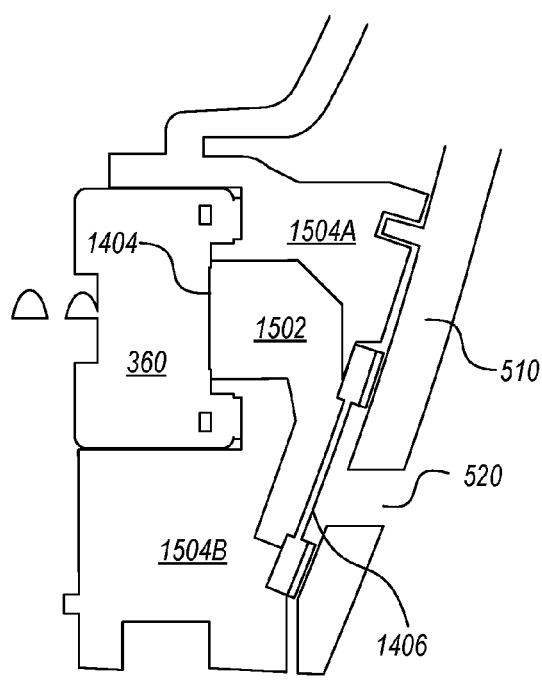

FIGS. 14A and 14B are two perspective views of a microphone 360 mounted on a front enclosure structure 604 of a camera module 502 and presented in an exploded manner in accordance with some implementations. FIGS. 14C-14F illustrate a process of assembling a microphone 360 onto a front enclosure structure 604 of a camera module 502 in accordance with some implementations. FIGS. 15A and 15B are cross sectional views of two example waterproof microphones 380 that are assembled in a front portion 620 of a camera module 502 in accordance with some implementations. The camera module 502 includes a housing 508, a microphone 360, a first hydrophobic membrane 1402, and a first sound transmission channel 1502. The microphone 360 is disposed inside the housing 508, and has a sound input region 1404. A front cover 510 of the camera module 502 includes a first opening 520 and is sealed against water intrusion apart from at least the first opening 520. Optionally, in some implementations, the front cover 510 is regarded as part of the housing of the camera module 502. In some implementations, the camera module 502 is configured to satisfy an Ingress Protection (IP) 55 Standard that sets forth enclosure requirements for protecting the microphone 360 from dust and jets of water. According to the IP 55 standard, the microphone 360 must tolerate two to eight hours of jets of water while limited ingress of water or dust is permitted as far as it will not interfere with operation of the microphone 360.

In some implementations, the microphone 360 is mounted on the front enclosure structure 604 to access the first opening 520 on the front cover 510. Specifically, referring to FIGS. 14C and 14D, the microphone 360 is situated in a recess 1410 of the front enclosure structure 604. One or more wires 1408 of the microphone 360 are extended through a body of the front enclosure structure 604 and connected to the PCB assembly 602 that is disposed adjacent to the front enclosure structure 604. Referring to FIGS. 14E and 14F, the first hydrophobic membrane 1402 is further disposed into the recess of the front enclosure structure 1410, covering the sound input region 1404 of the microphone 360. Optionally, a top surface of the first hydrophobic membrane 1402 lies on the same level of or protrudes beyond a top edge of the recess 1410 of the front enclosure structure 604. When the front enclosure structure 604 is assembled with the front cover 510, the recess 1410 of the front enclosure structure 604 is aligned with the first opening 520 on the front cover 510. The first hydrophobic membrane 1402 is then glued onto the front cover 510 with a waterproof adhesive, and sealed against water intrusion apart from the first opening 520.

Referring to FIGS. 15A and 15B, when the microphone 360 is assembled in the camera module 502, the sound input region 1404 of the microphone 360 optionally faces the first opening 520 or is offset from the first opening 520 on the front cover 510. The first hydrophobic membrane 1402 is affixed to a first interior surface 1406 of the housing 502 (e.g., a rear surface 1406 of the front cover 510) and covers the first opening 520 on the front cover 510. The first hydrophobic membrane 1402 is configured to allow transmission of sound waves and block water intrusion from the first opening 520. The first sound transmission channel 1502 couples the sound input region 1404 of the microphone 360 to the first opening 520, and is configured to allow sound waves transmitted through the first opening 520 and the first hydrophobic membrane 1402 to be coupled to the sound input region 1404 of the microphone 360 without exposing the sound input region 1404 to damaging pressures due to environmental impacts on the camera module 502. In some implementations, the first hydrophobic membrane 1402 includes a hydrophobic mesh.

In some implementations, an interior surface of the first sound transmission channel 1502 is coated with a damping material, and the damping material is hydrophobic and configured to reduce wind noise caused by the sound waves transmitted by the first sound transmission channel 1502. The damping material includes open celled foam that is commonly used for wind suppression. An example damping material is expanded polytetrafluoroethylene (PTFE), and the expanded PTFE is both hydrophobic and has wind suppression characteristics. Other wind suppression methods usually involve controlling the geometry to reduce sharp edges around the opening. Alternatively, in some implementations, the microphone 360 is configured to compensate an intensity loss of the sound waves and noise signals introduced into the sound waves, and the intensity loss and the noise signal associated with the sound waves are at least partially caused by the first hydrophobic diaphragm 1402 and the first sound transmission channel 1502.

In some implementations, the camera module 502 is installed in an outdoor environment and, is oriented such that the first opening 520 associated with the microphone 360 is located on a lower portion of the front cover 510 and is oriented slightly downward. The sound input region 1404 of the microphone 360 is offset from the first opening 520 towards a center of the first interior surface 1406 of the front cover 510 of the housing 520. As such, the sound input region 1404 of the microphone 360 is disposed at a higher level than the first opening 520, thereby deterring water or dust from reaching the microphone 360 even when the first hydrophobic membrane fails to block water or dust impinging on the camera.

Referring to FIG. 15B, in some implementations, the sound waves that are incident on the first hydrophobic diaphragm 1402 are guided to propagate substantially upward within the first sound transmission channel 1502. In some implementations, the first sound transmission channel 1502 is substantially tortuous (i.e., comprises twists and turns), and turns at least twice between the first opening 520 and the sound input region 14004 of the microphone 360. In this situation, the sound waves that are incident on the first hydrophobic diaphragm 1402 are guided to turn at least twice in the first sound transmission channel 1502 to reach the sound input region 1404 of the microphone 360. Further, in a specific example (not shown in FIGS. 15A and 15B), the first sound transmission channel 1502 is created between a pair of structures 1504A and 1504B, and the structures 1504A and 1504B are complementary. Optionally, the structures 1504A and 1504B are identical and disposed in a symmetric manner (e.g., rotated with 180 degrees from each other).

Figure 16A:
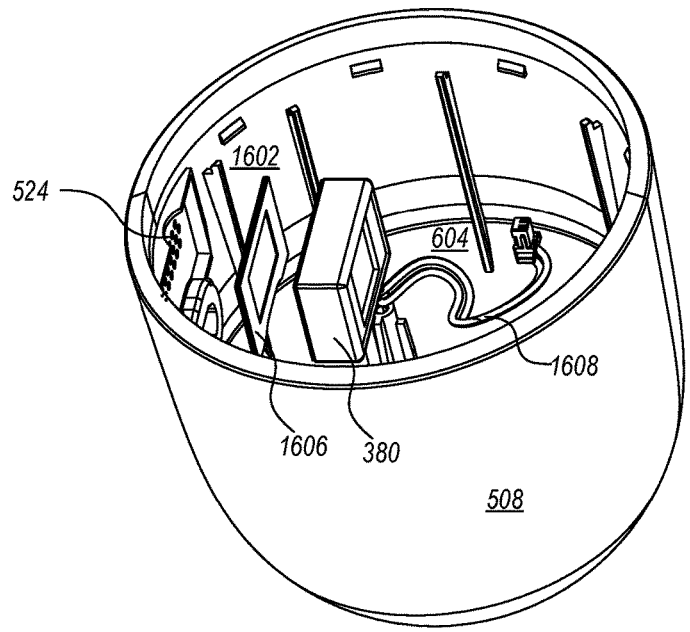
FIGS. 16A-16C illustrate a process of assembling a speaker onto a side surface of a camera module in accordance with some implementations.
Figure 16B:
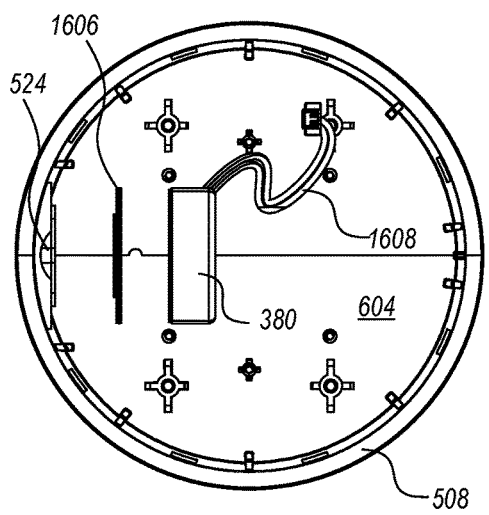
Figure 16C:
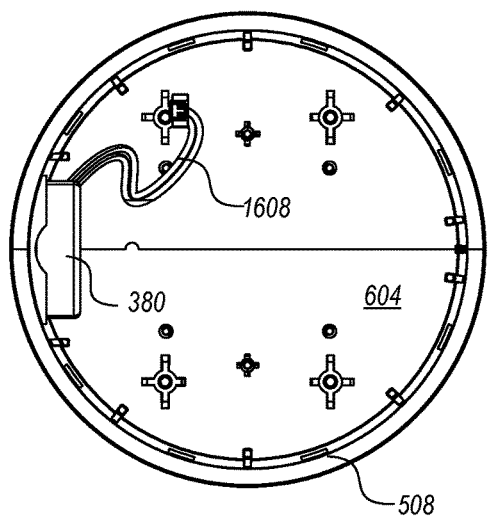
Figure 16D:
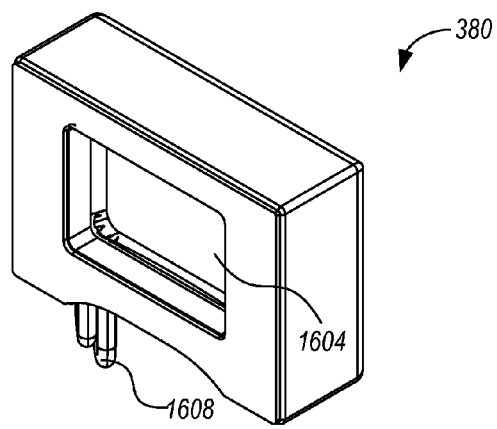
FIGS. 16D-16F are a perspective view, a front view and a side view of a speaker in accordance with some implementations.
Figure 16E:
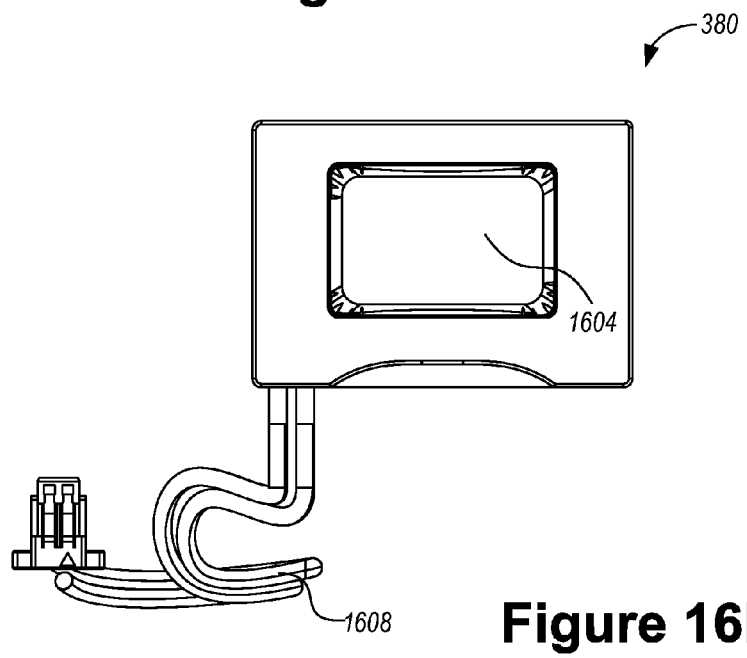
Figure 16F:
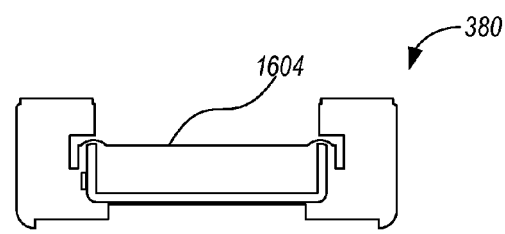
Figure 17A:
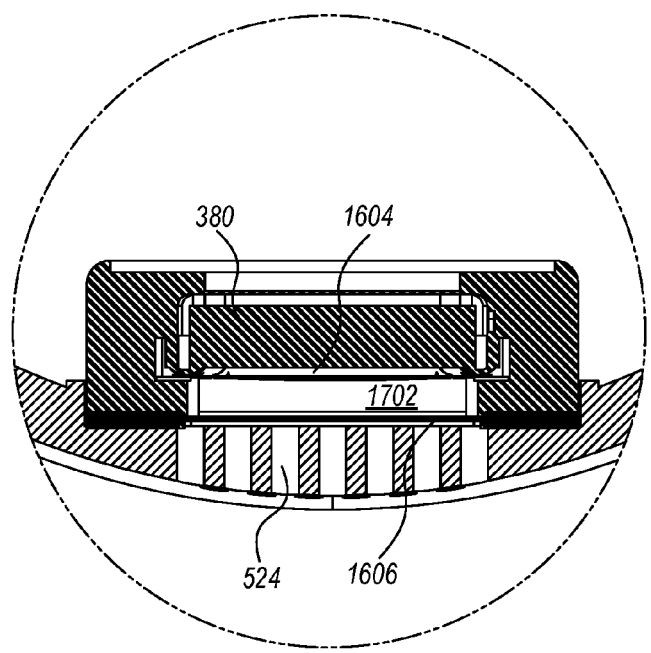
FIGS. 17A and 17B are cross sectional views of two example waterproof speakers that are assembled onto a side surface of a camera module in accordance with some implementations.
Figure 17B:
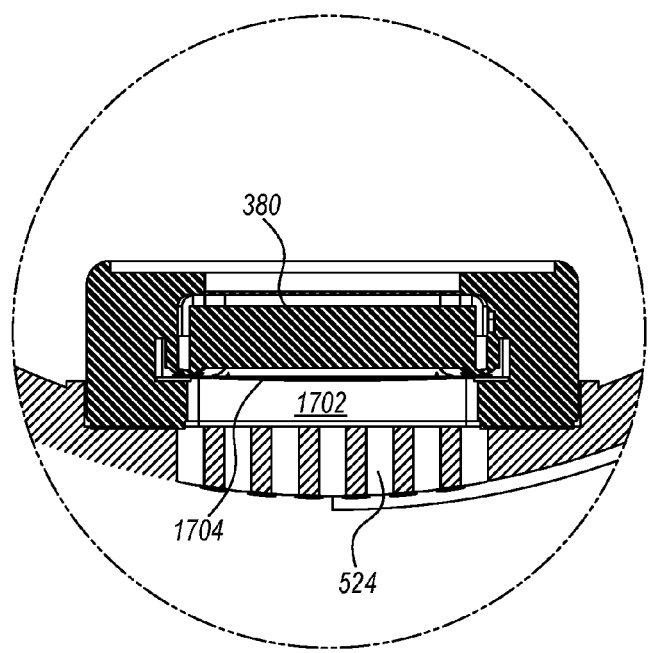

FIGS. 16A-16C illustrate a process of assembling a speaker 380 onto a side surface of a camera module 502 in accordance with some implementations. FIGS. 16D-16F are a perspective view, a front view and a side view of a speaker 380 in accordance with some implementations. FIGS. 17A and 17B are cross sectional views of two example waterproof speakers 380 that are assembled onto a side surface of a camera module 502 in accordance with some implementations. The camera module 502 includes a housing 508, a speaker 380, and a sound transmission channel 1702. The housing 508 of the camera module 502 includes one or more second openings 524 on a second interior surface 1602 (e.g., an interior bottom surface of the housing 508). The housing 508 is sealed against water intrusion apart from at least the second openings 524. The speaker 380 is disposed inside the housing 508, and has a sound output region 1604.

When the speaker 380 is assembled in the camera module 502, the sound output region 1604 of the speaker 380 optionally faces the second openings 524 or is offset from the second openings 524 on the housing 508. Referring to FIGS. 16A, 16B and 17A, in some implementations, a hydrophobic membrane 1606 (which is distinct from or integrated onto the speaker 380) is affixed to the second interior surface 1602 of the housing 502 and covers the second openings 524 on the housing 508. The hydrophobic membrane 1606 is configured to allow transmission of sound waves and block water intrusion from the second openings 524. The sound transmission channel 1702 couples the sound output region 1604 of the speaker 380 to the second openings 524, and is configured to allow sound waves outputted from the sound output region 1604 of the speaker 380 to be transmitted through the hydrophobic membrane 1606 and the second openings 524 without exposing the sound output region 1604 to damaging pressures due to environmental impacts on the camera module 502. One or more wires 1408 of the speaker 380 are connected to the PCB assembly 602 and configured to transmit electrical signals for generating the sound waves in the speaker 380. Further, it is noted that in some implementations, the camera module 502 is installed in an outdoor environment and the second openings 524 are located at an interior bottom surface of the housing 508 such that the sound output region 1604 of the speaker 380 is oriented down towards a ground to reduce water ingress.

Alternatively, referring to FIG. 17B, in some implementations, the speaker 380 is an integrated waterproof speaker, and the sound output region of the speaker 380 is coated with a hydrophobic coating layer 1704. The hydrophobic coating layer 1704 has a similar function to that of the hydrophobic membrane 1606, i.e., allowing transmission of sound waves and blocking water intrusion from the second openings 524. In the absence of the hydrophobic membrane 1606, the speaker 380 is affixed to the second interior surface 1602 of the housing 502 and covers the second openings 524 on the housing 508.

Further, in some implementations, the sound output region 1604 of the speaker 380 is aligned with the second openings 524 of the housing 502, and an interface between peripheral edges of the speaker 380 and the second interior surface of the housing is sealed to block water intrusion.

In some implementations, the speaker 380 is configured to satisfy an Ingress Protection (IP) 55 Standard that sets forth enclosure requirements for protecting the speaker 380 from dust and jets of water. According to the IP 55 standard, the speaker 380 must tolerate two to eight hours of jets of water while limiting ingress of water or dust to no more than levels that will not interfere with operation of the speaker 380.

In some implementations, an interior surface of the sound transmission channel 1702 is coated with a damping material, and the damping material is hydrophobic and configured to reduce wind noise caused by the sound waves transmitted by the sound transmission channel 1702. Alternatively, in some implementations, the speaker 380 is configured to compensate an intensity loss of the sound waves and noise signals that could be introduced into the sound waves, and the intensity loss and the noise signal associated with the sound waves are at least partially caused by the hydrophobic diaphragm or layer and the sound transmission channel 1702.

Reset Pin and Pressure Outlet

Referring to FIGS. 3 and 6, the camera module 502 includes one or more of a lens assembly 330, a heat sink 332, and a magnetic plate 334, image sensors 336, one or more infrared illuminators 338, a microphone 360, a speaker 380, and a PCB assembly 602. The PCB assembly 602 includes a plurality of electronic components, e.g., one or more processors, memory, power management circuit, one or more image processors, microphone and speaker circuit, illuminator drivers and one or more indicator lights. In some implementations, the PCB assembly 602 further includes a reset pin 1802 configured to reset operation of at least a subset of the plurality of electronic components. In some implementations, the reset pin can be pressed to reset a subset of the electronic components, thereby allowing software update and device provisioning during the assembly process of the camera module, before the camera module 502 is shipped out of factory or when the camera module 502 is returned by a customer. Under these circumstances, when the reset pin is pressed, the PCB assembly 602 has been assembled into the camera module 502, i.e., has already been disposed between the front and rear portions 620 and 640 of the camera module 502 and contained within the housing 508 without a direct access to the reset pin, and an access path has to be provided to access the reset pin disposed on the PCB assembly 602 from a front surface of the front portion 620.

Figure 18A:
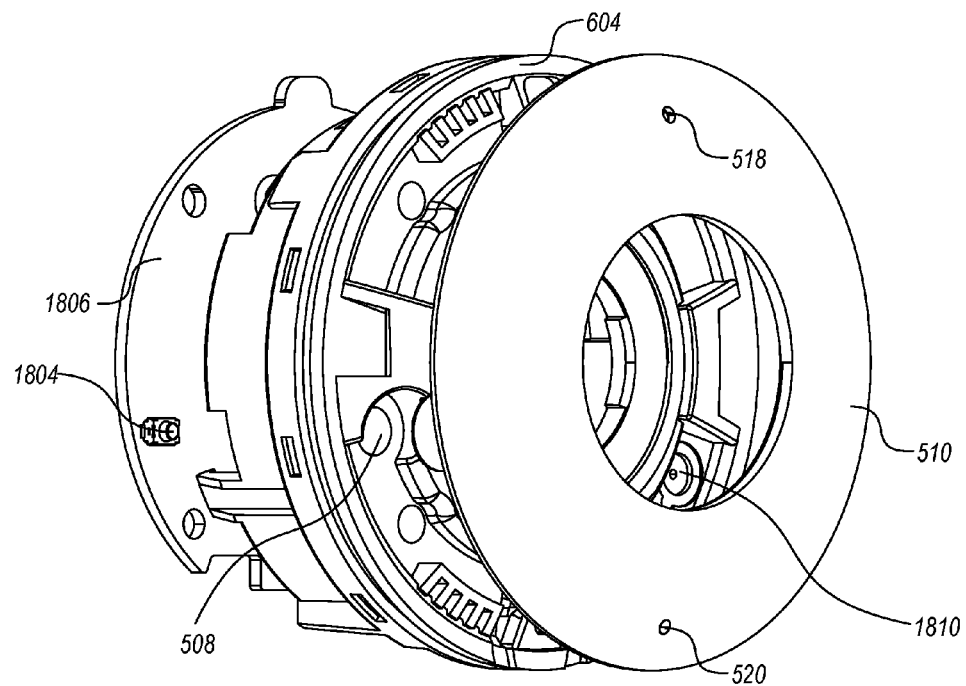
FIGS. 18A and 18B are a perspective view and a side view of a front portion of a camera module including an access path 1804 leading to a reset pin in accordance with some implementations, respectively. The perspective view in FIG. 18A is presented in an exploded manner.
Figure 18B:
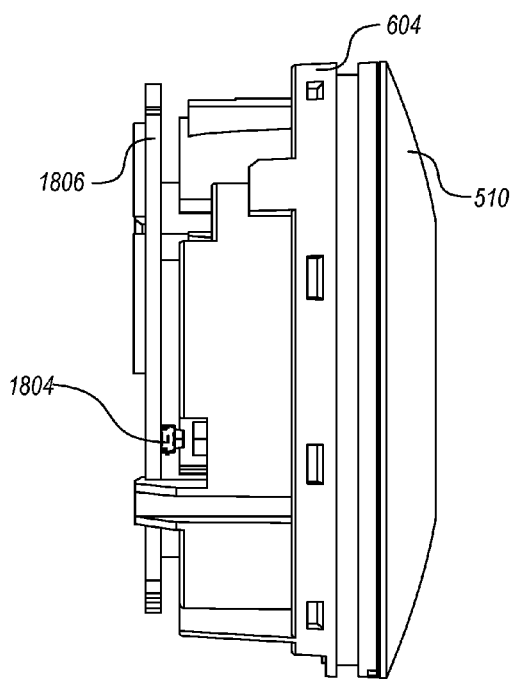
Figure 18C:
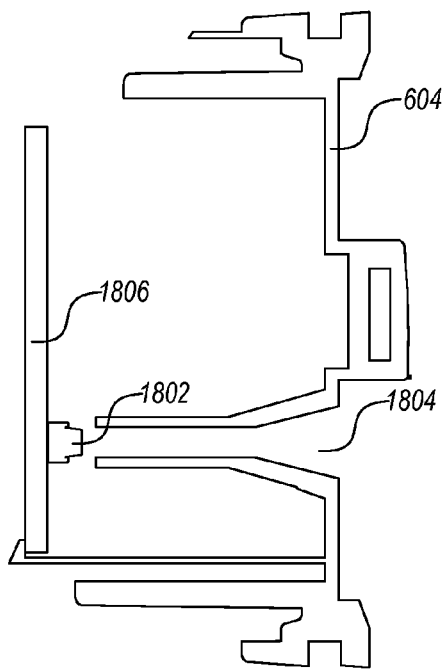
FIGS. 18C and 18D illustrate a process of sealing the access to the reset pin during the course of assembling a camera module 502 in accordance with some implementations.
Figure 18D:
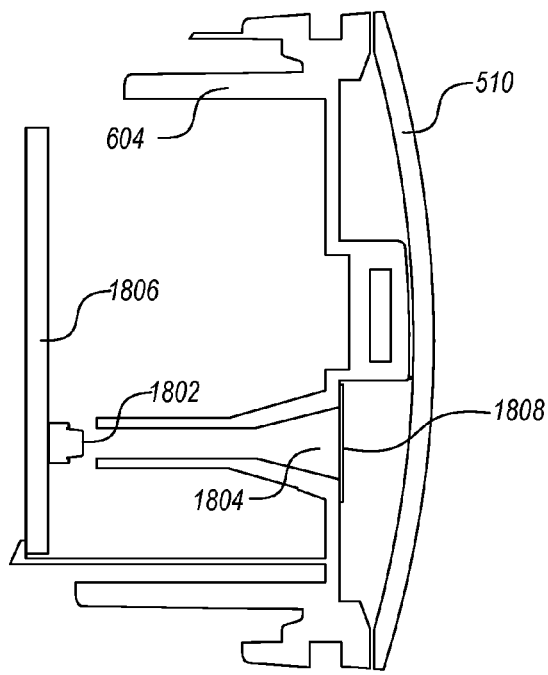

FIGS. 18A and 18B are a perspective view and a side view of a front portion 620 of a camera module 502 including an access path 1804 leading to a reset pin 1802 in accordance with some implementations, respectively. The perspective view in FIG. 18A is presented in an exploded manner. FIGS. 18C and 18D illustrate a process of sealing the access to the reset pin during the course of assembling a camera module 502 in accordance with some implementations. The reset pin 1802 is disposed on a front surface of a printed circuit board 1806 in the PCB assembly 602, and the front surface of the PCB 1806 faces the front enclosure structure 604 when the PCB assembly 602 and the front enclosure structure 604 are enclosed in the housing 508 of the camera module 502. The front enclosure structure 604 includes an open access path 1804 that extends along an entire length of the front enclosure structure 604, allowing a user to use a long needle-like device to access the reset pin 1802 from a front surface of the front enclosure structure 604.

Referring to FIG. 18D, an open end of the access path 1804 is sealed with a first cover membrane 1808. When the front enclosure structure 604 is assembled with the housing 508, the first cover membrane 1808 blocks water or dust, and the interior of the housing 508 is entirely sealed against water or dust intrusion. In some implementations, the first cover membrane 1808 is hermetic (i.e., airtight), and is configured to seal the open end of the access path 1804 against gas exchange across the cover membrane 1808. In some implementations, the first cover membrane 1808 is configured to be permeable to air for the purposes of equalizing internal air pressure of the camera module 502 with external air pressure of the ambient. For example, when the camera module 502 is carried between two locations having air pressure variation, the first cover membrane 1808 enables an air pressure balance between the interior and the exterior of the camera module 502.

In some implementations, the front enclosure structure 604 does not combine the access to the reset pin 1802 and an air pressure balance path in the same access path 1804. Rather, in addition to the access path 1804, the front enclosure structure 604 further includes an alternative air access path 1810 covered by an alternative cover membrane. The alternative air access path 1810 is distinct from the open access path 1804 and configured to equalize the internal air pressure of the camera module 502 with the external air pressure of the ambient. The alternative cover membrane is therefore configured to block water and dust, but not the air. In this situation, the first cover membrane 1808 that is used for covering the access path 1804 can be made of hermetic material, while the alternative cover membrane for covering the alternative air access path 1810 is not made of hermetic material.

Waterproof Electrical Connector

FIGS. 19A-19H illustrate multiple views of the male connector 234 (e.g., connector 516, FIG. 5A et al.) at the open end of the cable 228 (e.g., cable 512, FIG. 5A et al.) extending from the camera 118, in accordance with some implementations. The male connector 234 includes an electrical plug 1902 and a cover (also called a "locking ring") 1904 (e.g., connector cover 626, FIG. 6). FIGS. 19A-19H show the male connector 234 with the cover 1904 in an open state. In some implementations, the electrical plug 1902 is a Universal Serial Bus (USB) plug, and the female connector (further described below) includes a USB receptacle. For convenience, the plug 1902 is described in this specification as a USB plug, and correspondingly the plug receptacle at the female connector is described as a USB receptacle. In other implementations, the male and female plug and connectors are complementary electrical connectors for other connector types that are employed in electrical systems/devices to carry power and/or data signals, including but not limited to ethernet (e.g., RJ45), coaxial, RCA connector, multiple classes of USB (A, C, mini, micro, etc.), HDMI, 3.5 mm audio jack, and barrel plug type.

Figure 19A:
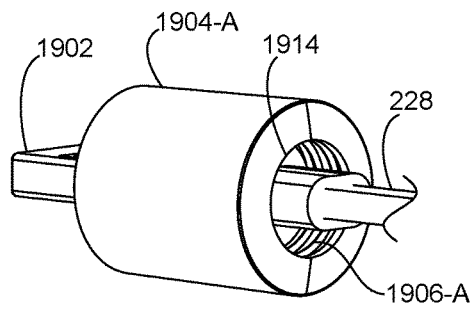
FIGS. 19A-19H illustrate multiple views of a male connector of a waterproof electrical connector, showing a cover of the male connector in an open state, in accordance with some implementations.
Figure 19B:
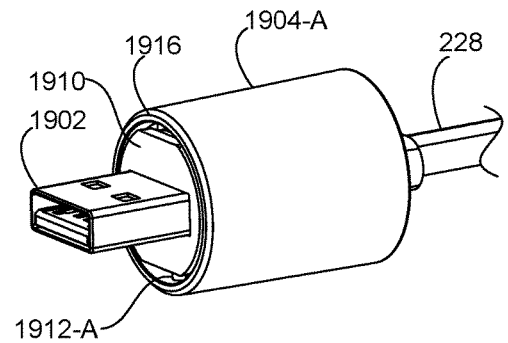
Figure 19C:
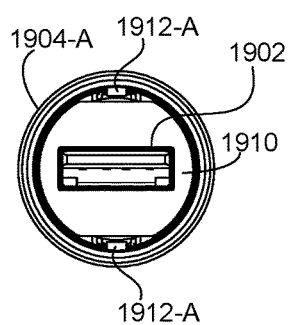
Figure 19D:
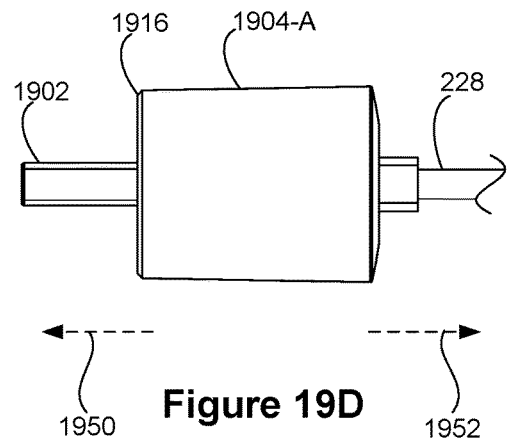
Figure 19E:
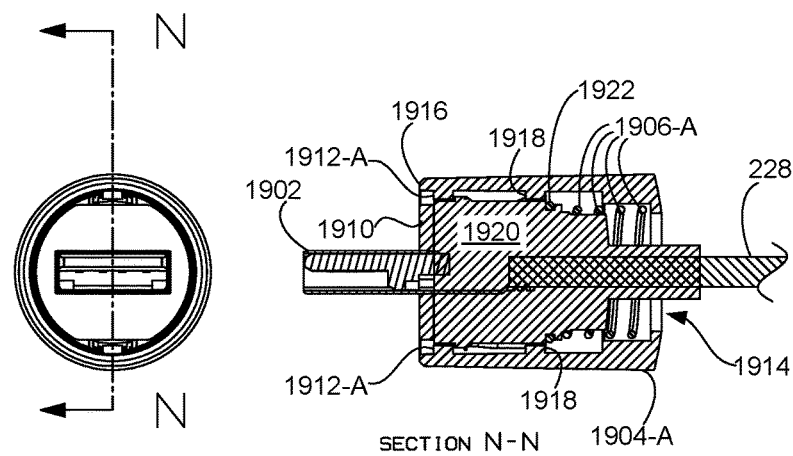
Figure 19F:
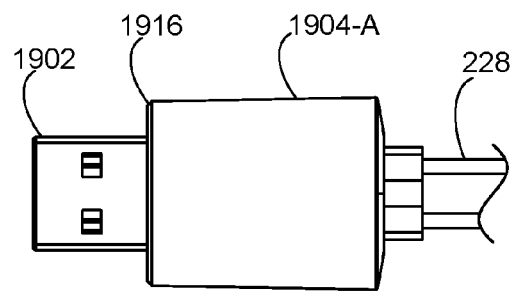
Figure 19G:
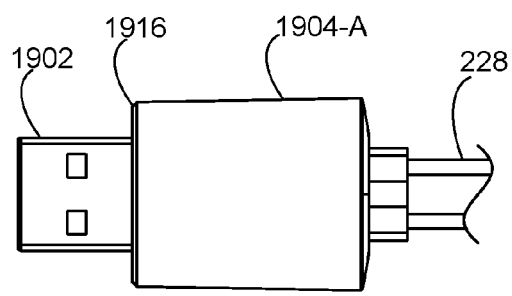
Figure 19H:
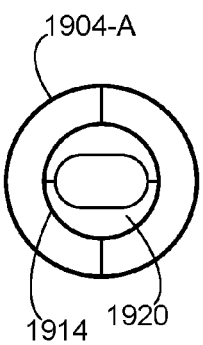

FIG. 19A is a perspective view of the male connector 234 with the open end of the male connector 234 angled away from the viewer, and FIG. 19B is a perspective view of the male connector 234 with the open end of the male connector 234 angled toward the viewer. FIG. 19C is an end view of the male connector 234, viewed from the open end toward the cable 228. FIG. 19D is a side view of the male connector 234. FIG. 19E is a side cross-sectional view of the male connector 234. FIG. 19F is a top view of the male connector 234. FIG. 19G is a bottom view of the male connector 234. FIG. 19H is an end view of the male connector 234 from the opposite of the open end and with the cable 228 omitted.

It should be appreciated that the designations of top, bottom, side(s), front, and rear of components and elements in this specification may be arbitrary and are as used in this specification for convenience and ease of description.

The male connector 234 includes a male connector base or connector body (e.g., an over mold) 1920 covered by the cover 1904. In some implementations, the male connector 234, particularly the cover 1904 and the male connector base 1920, has a substantially cylindrical profile, as shown in FIGS. 19A-19H. The cover 1904 has a substantially hollow interior, and an open end, opposite the cable 228, leading to the interior. The male connector base 1920 resides in the hollow interior of the cover 1904. The USB plug 1902 protrudes from the male connector base 1920, and out through the open end of the cover 1904. Within the male connector base 1920, the USB plug 1902 connects to the cable 228. The cover 1904 includes an opening 1914 opposite the open end of the cover 1904, at the end of the cover 1904 closest to the cable 228. In some implementations, the male connector base 1920 tapers through the opening 1914, and the cable 228 runs into the male connector base 1920 through the tapered portion of the male connector base 1920. In some other implementations, the cable 228 runs through the opening 1914 into the male connector base 1920. In some implementations, the diameter of the opening 1904 is substantially less than the diameter of the cover 1904.

In some implementations, a spring 1906 (e.g., a coil spring) is situated between the male connector base 1920 and a rear end (i.e., the end with the opening 1914) of the cover 1904. When the cover 1904 is pushed or pulled along the male connector 234 toward the open end (i.e., in direction 1950 toward the USB plug 1902), the spring 1906 is compressed between the male connector base 1920 and the rear end of the cover 1904. Thus, release of tension on the spring 1906 tends to push the cover 1904 along the male connector 234 away from the open end (i.e., in direction 1952 towards the cable 228 and away from the USB plug 1902). Other implementations employ alternative mechanisms in place of the spring 1906 to provide tension/forces on and between the male connector base 1920 and the cover 1904 similar to those provided by the spring 1906. For example, the alternate mechanisms can include two permanent magnets with like poles pointed toward each other to generate opposing force, a foam, or compressible rubber.

The cover 1904 includes a set of one or more locking pins or other protrusions 1912 on the interior wall of the cover 1904. The locking pins 1912 work in conjunction with the locking mechanism of the female connector to lock the male connector 234 and the female connector together. In some implementations, the locking mechanism functions in principle similarly to a bayonet mount. The details of the locking mechanism are further described below.

The cover 1904 has a lip 1916 at its open end that is configured to engage with a gasket on the female connector. The male connector base 1920 includes a gasket 1910 that is configured to engage with a pressure rib on the female connector. In some implementations, the gaskets are made of silicone material.

An O-ring 1922 runs around the male connector base 1920. The O-ring 1922 is located at a position along the male connector base 1920 such that the cover 1904 (e.g., an inner ridge of the cover 1904) engages the O-ring when the cover 1904 is in a closed position to create a waterproof seal.

In some implementations, the cover 1904 also includes a set of one or more alignment pins or other protrusions 1918 on the interior wall of the cover 1904. The alignment pins 1918 facilitate the alignment of the locking pins 1912 to a position appropriate for engagement with the locking mechanism on the female connector. In some implementations, on the interior wall of the cover 1904, one locking pin 1912 and one alignment pin 1918 are aligned in a substantially straight line parallel to the central axis of the cover 1904. The locking pin 1912 is positioned on the interior wall of the cover 1904 closer to the open end, and the alignment pin 1918 is positioned on the interior wall of the cover 1904 closer to the opening 1914. In other implementations, alternative alignment mechanisms can be employed to facilitate the alignment of the locking pins 1912 to a position appropriate for engagement with the locking mechanism on the female connector. For example, the alternate mechanisms can include self-aligning magnets, a non-circular cross section when the cover 1904 is in the open state/position such that in the open state there is only one possible alignment (this shape would morph to a circular one in the closed position/state to allow rotation), and inversion of the locations of the locking/alignment pins and the corresponding channels etc. such that the pins are on the connector body 1920 and the channels etc. are in the cover 1904.

It should be appreciated that certain reference labels in FIGS. 19A-19H include a "-A" designation to indicate that the corresponding element is in the position or state as shown while the cover 1904 is in the open state, and that the position or state may be different when the cover 1904 is in the closed/locked state. For example, cover 1904-A indicates that the cover 1904 is in the position as shown while the cover 1904 is in the open state, and spring 1906-A is in the de-compressed state as shown while the cover 1904 is in the open state.

Figure 20A:
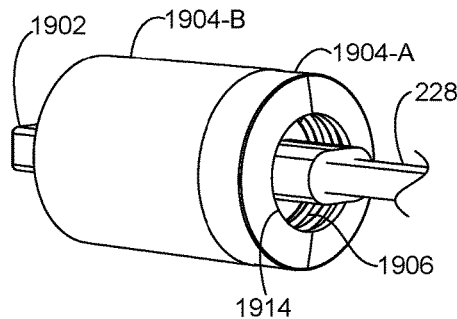
FIGS. 20A-20E illustrate further multiple views of the male connector of a waterproof electrical connector, showing the cover of the male connector in open and closed states, in accordance with some implementations.
Figure 20B:
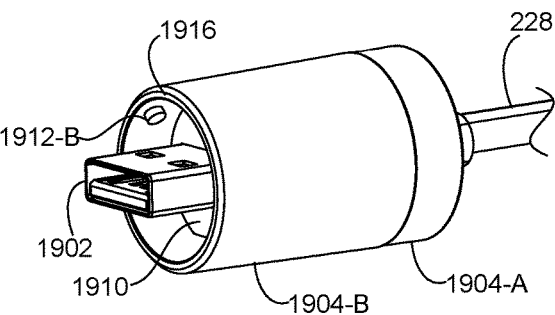
Figure 20C:
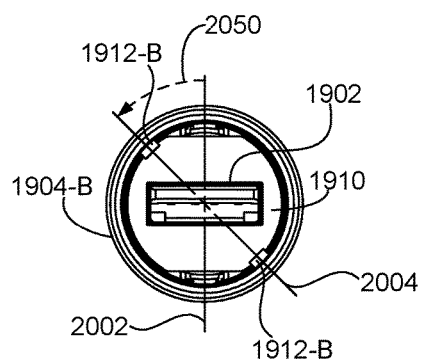
Figure 20D:
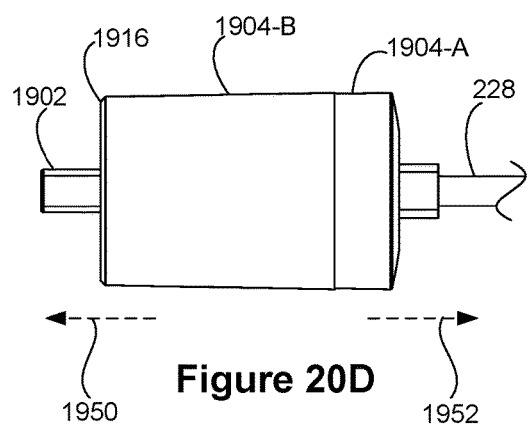
Figure 20E:
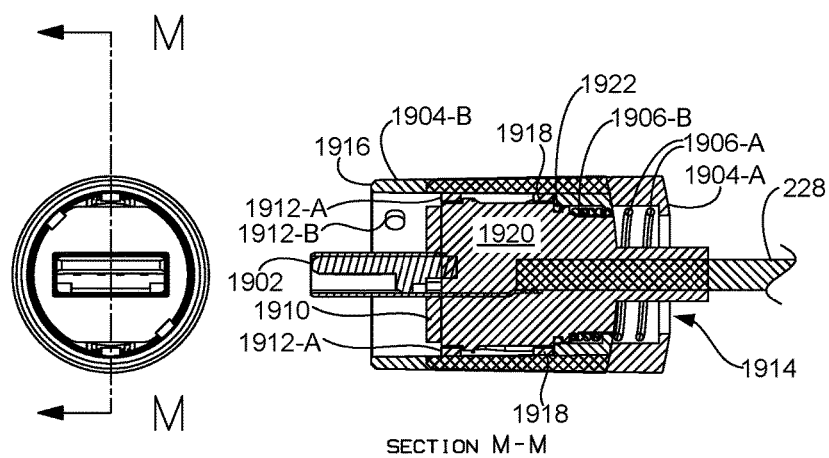

FIGS. 20A-20E illustrate multiple views of the male connector 234 with the cover 1904 transitioning from an open state to a closed state, in accordance with some implementations. FIG. 20A is a perspective view of the male connector 234 with the open end of the male connector 234 angled away from the viewer, and FIG. 20B is a perspective view of the male connector 234 with the open end of the male connector 234 angled toward the viewer. FIG. 20C is an end view of the male connector 234, viewed from the open end toward the cable 228. FIG. 20D is a side view of the male connector 234. FIG. 20E is a side cross-sectional view of the male connector 234.

Figure 20K:
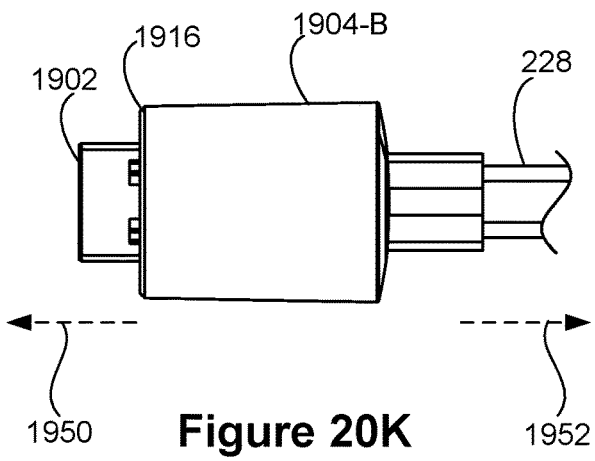
Figure 20L:
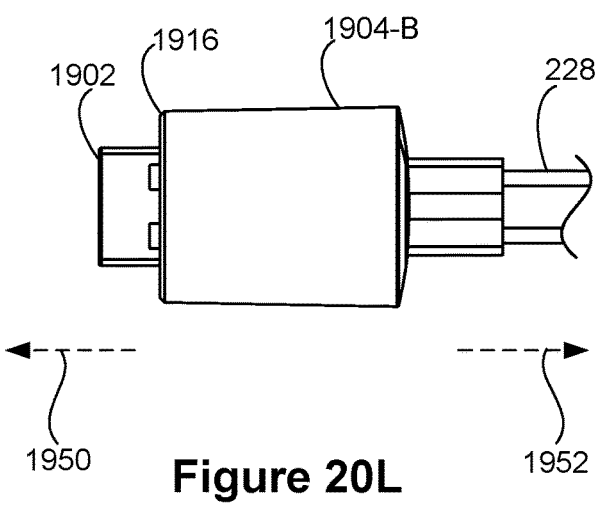
Figure 20M:
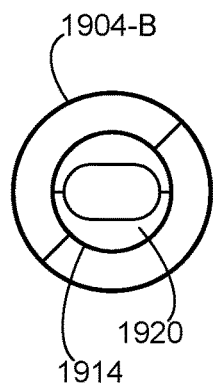

FIGS. 20F-20M illustrate multiple views of the male connector 234 with the cover 1904 in the closed state, in accordance with some implementations. FIG. 20F is a perspective view of the male connector 234 with the open end of the male connector 234 angled away from the viewer, and FIG. 20G is a perspective view of the male connector 234 with the open end of the male connector 234 angled toward the viewer. FIG. 20H is an end view of the male connector 234, viewed from the open end toward the cable 228. FIG. 20I is a side view of the male connector 234. FIG. 20J is a side cross-sectional view of the male connector 234. FIG. 20K is a top view of the male connector 234. FIG. 20L is a bottom view of the male connector 234. FIG. 20M is an end view of the male connector 234 from the opposite of the open end and with the cable 228 omitted.

It should be appreciated that certain reference labels in FIGS. 20A-20E include a "-B" designation to indicate that the corresponding element is in the position or state as shown while the cover 1904 is in the closed state. For example, cover 1904-B indicates that the cover 1904 is in the position as shown while the cover 1904 is in the closed state, and spring 1906-B is in the compressed state as shown while the cover 1904 is in the closed state.

The cover 1904 transitions from the open state to the closed state by being pushed or pulled in direction 1950 toward the USB plug 1902, compressing the spring 1906 to its compressed state 1906-B, and rotating the cover 1904 about its central axis away from angle 2002 in direction 2050 toward angle 2004 (with respect to an end view perspective of the male connector 234; FIG. 20C). The rotating of the cover 1904 moves the locking pins 1912 from position 1912-A along angle 2002 to position 1912-B along angle 2004. When in the closed state, the cover 1904 extends partially over the USB plug 1902. An inner ridge in the cover 1904 engages with the O-ring 1922 to create a waterproof seal around the male connector base 1920. A part of the male connector base 1920 extends into the opening 1914 at the rear end of the cover 1904 and fits into the opening 1914 to close the opening 1914. In FIG. 20E, the alignment pins 1918 at their positions when the cover 1904 is in the closed state is not shown due to them being out of view of the particular cross-section when the cover 1904 is in the closed state. The cover 1904-B (e.g., an inner ridge of the cover 1904-B) engages with the O-ring 1922 to create a seal between the cover 1904 and the connector base 1920.

Figure 21A:
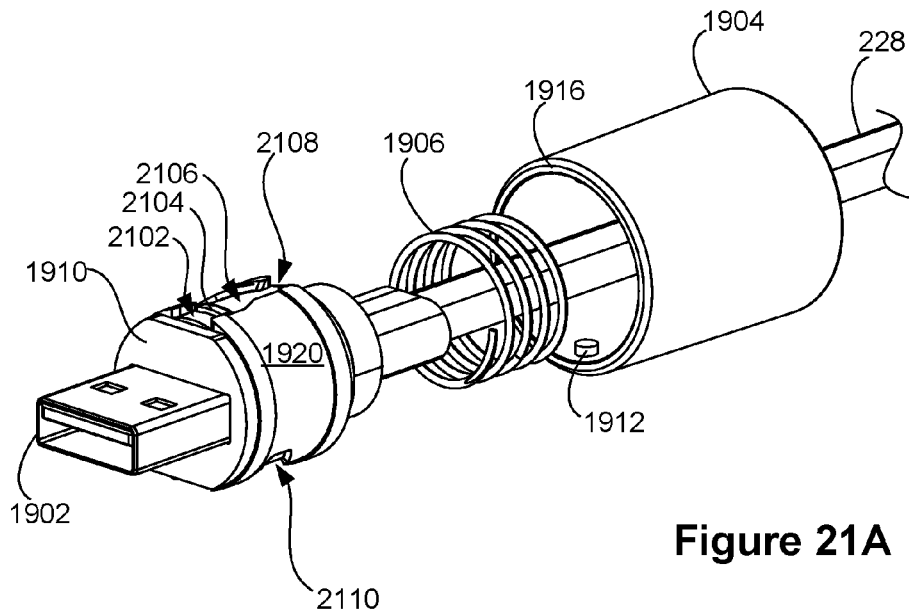
FIGS. 21A-21E illustrate multiple perspective exploded views of the male connector of a waterproof electrical connector, in accordance with some implementations.
Figure 21B:
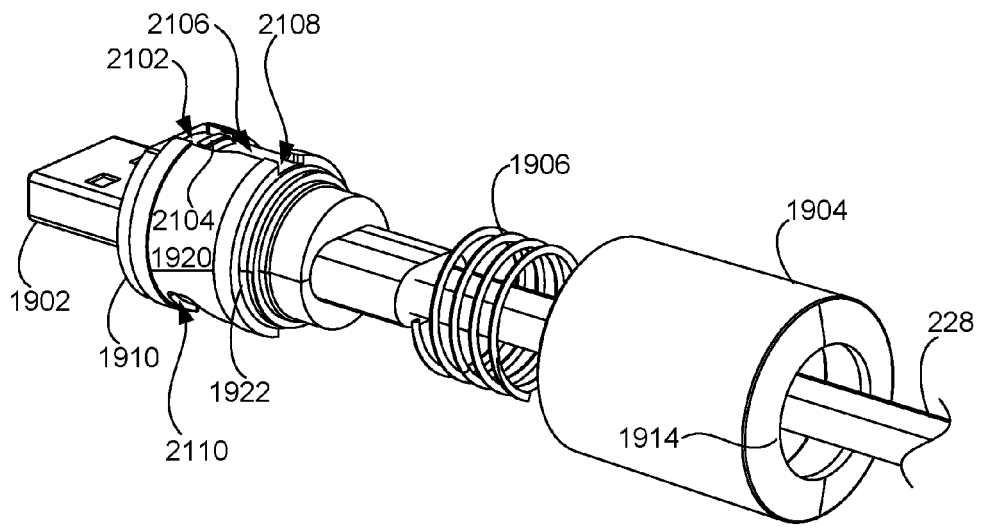
Figure 21C:
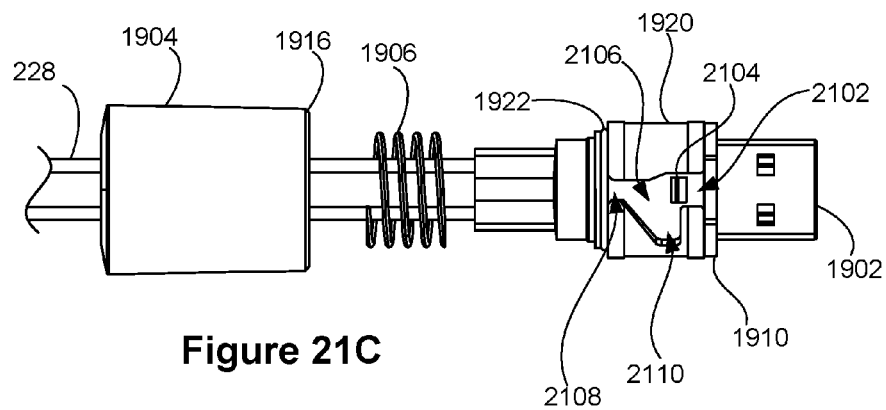
Figure 21D:
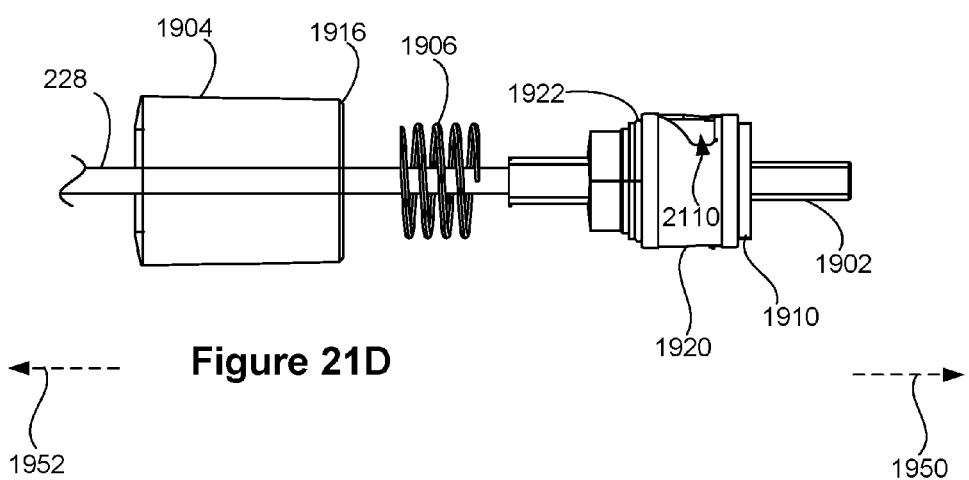
Figure 21E:
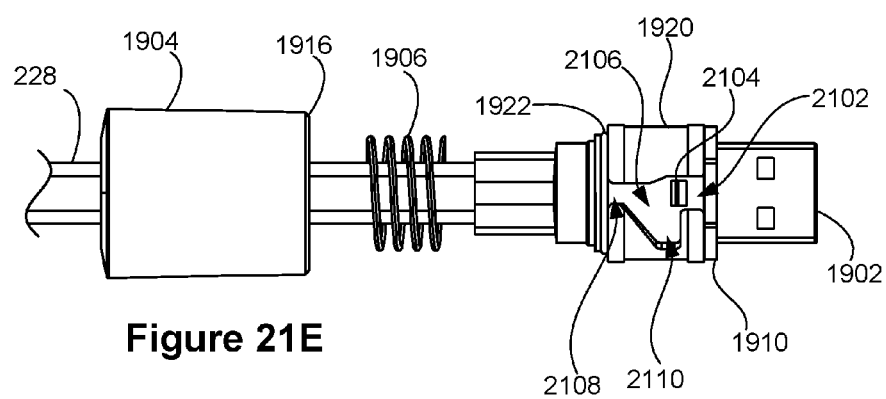

FIGS. 21A-21E illustrate exploded views of the male connector 234, in accordance with some implementations. FIG. 21A is an exploded perspective view of the male connector 234 with the open end of the male connector 234 angled toward the viewer, and FIG. 21B is an exploded perspective view of the male connector 234 with the open end of the male connector 234 angled away from the viewer. FIG. 21C is an exploded top view of the male connector 234. FIG. 21D is an exploded side view of the male connector 234. FIG. 21E is an exploded bottom view of the male connector 234.

As described above with reference to FIGS. 19-20, the male connector 234 includes a male connector base 1920 and a USB plug 1902. A gasket 1910 surrounds the USB plug 1902. The cover 1904 includes the lip 1916, and one or more locking pins 1912 on the interior wall. Spring 1906 is located between the male connector base 1920 and the cover 1904, and wraps around a portion of the male connector base 1920.

As shown in FIGS. 21A-21E, male connector base 1920 also includes one or more sets of pin resting and alignment elements arranged along the outer surface of the male connector base 1920 for accommodating the locking pin(s) 1912 and alignment pin(s) 1918. The set includes a locking pin reservoir 2102 with a backstop 2104, and a channel 2106 with alignment pin reservoirs 2108 and 2110. Each of these sets of elements accommodates one locking pin 1912 and one alignment pin 1918. In some implementations, the cover 1904 includes two sets of locking and alignment pins, each set having one locking pin 1912 and one alignment pin 1918; the sets are positioned along opposite locations on the interior wall of the cover 1904 corresponding to opposite ends of the diameter of the interior wall of the cover 1904. Thus, the male connector base 1920 correspondingly includes two of these sets of pin resting and alignment elements, one at the top of the male connector base 1920 and one at the bottom of the male connector base 1920, opposite of the set at the top, with both sets positioned to accommodate respective sets of pins 1912/1918 on the interior wall of the cover 1904. Because both sets of pins are similar to each other and both sets of pin resting and alignment elements are similar to each other, the description below is directed to one set of pins and one set of pin resting and alignment elements but is applicable to other sets of pins and sets of pin resting and alignment elements on the male connector 234.

As described above, the release of tension on (i.e., de-compression of) the spring 1906 tends to push the cover 1904 in direction 1952 towards the cable 228. When the cover 1902 is in the open state, the locking pin 1912 rests at the locking pin reservoir 2102, backstopped by backstop 2104. The backstop 2104 thus also serves the purpose of also restraining the cover 1904 as a whole from being pushed in direction 1952 completely away from the male connector base 1920 by the de-compressing spring 1906. When the cover 1902 is in the open state, the alignment pin 1918 rests at the alignment pin reservoir 2108.

When the cover 1904 transitions from the open state to the closed state, the locking pin 1912 and the alignment pin 1918 change positions in accordance with the movement of the cover 1904 in direction 1950 and rotation of the cover 1904 in direction 2050. The locking pin 1912 moves from the locking pin reservoir 2102, over the gasket 1910, and into a channel on the female connector, further details of which are described below. The alignment pin 1918 changes position within the channel 2104 and comes to rest in the reservoir 2110.

When the cover 1904 transitions from the closed state to the open state, the locking pin 1912 and the alignment pin 1918 reverse the position changes described above in accordance with the movement of the cover 1904 in direction 1952 and rotation of the cover 1904 in the opposite of direction 2050. The locking pin 1912 moves in the channel on the female connector back to the locking pin reservoir 2102. The alignment pin 1918 changes position within the channel 2104 and comes to rest in the reservoir 2108. The channel 2110, which in some implementations has an at least partially angled boundary (e.g., angled in a way that gives the channel 2110 a triangular profile (e.g., as shown in FIGS. 21C and 21E)), directs the alignment pin 1918 to reservoir 2108 when the cover 1904 is pushed by the decompressing spring 1906 back to its open state position, which has the effect of limiting the rotation of the cover 1904 as a whole such that the locking pin 2102 is directed back to the locking pin reservoir 2102.

Figure 21F:
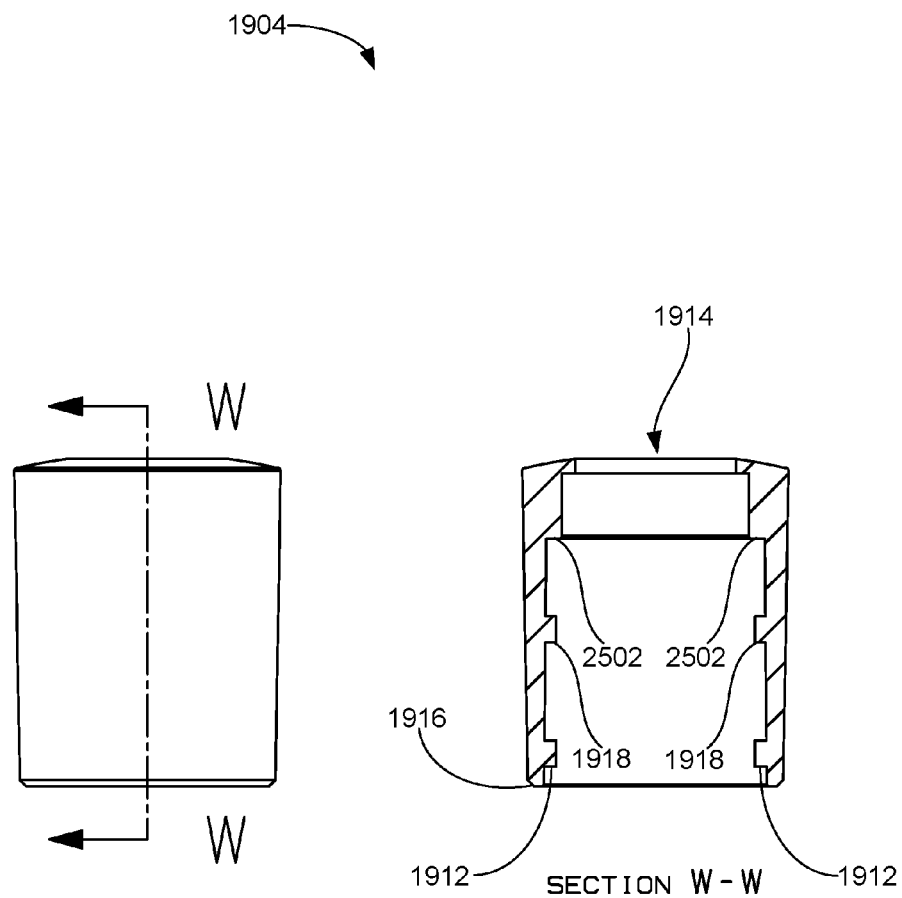
FIG. 21F illustrates a cross-sectional view of a cover of a male connector, in accordance with some implementations.

FIG. 21F is a cross-sectional view of the cover 1904 of the male connector 234, in accordance with some implementations. The cover 1904 includes locking pins 1912 and alignment pins 1918, as well as an opening 1914. The cover 1904 also includes an inner ridge 2502 (FIG. 25) configured to engage with the O-ring 1922 to create a waterproof seal.

Figure 23A:
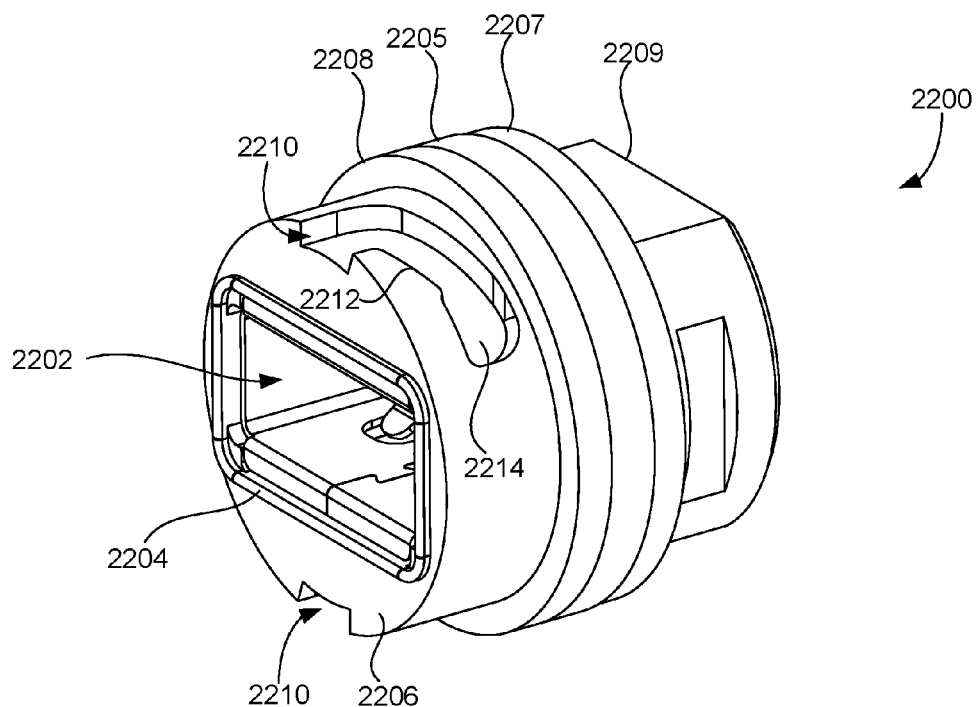
Figure 23B:
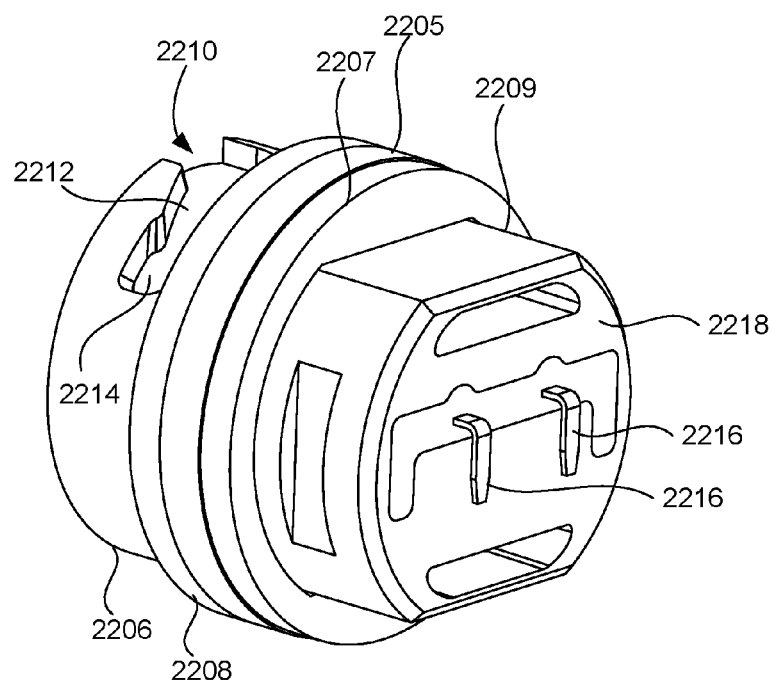

FIGS. 22A-23B illustrate multiple views of a female connector of the waterproof electrical connector, in accordance with some implementations. FIG. 22A is an end view of the female connector. FIG. 22B is a top view of the female connector. FIG. 22C is a side view of the female connector. FIG. 23A is a perspective view of the female connector, with the USB receptacle angled toward the viewer. FIG. 23B is a perspective view of the female connector, with the USB receptacle angled away from the viewer.

The female connector 2200, which is complementary to the male connector 234, includes a USB receptacle 2202 configured to receive a USB plug (e.g., USB plug 1902). The USB receptacle 2202 is enclosed in a female connector base that includes a front portion 2206, a middle portion 2205, and a rear portion 2209. In some implementations, the female connector base is a plastic shell. Surrounding the mouth of the USB receptacle 2202 is a pressure rib 2204 configured to engage a gasket 1910 on the male connector 234. In front of the middle portion 2205, and surrounding the front portion 2206, is a gasket 2208 (e.g., a silicone gasket) configured to engage the lip 1916 of the cover 1904. In some implementations, to the rear of the middle portion 2205, and surrounding the rear portion 2209, is another gasket or some other waterproof sealing material 2207.

The female connector 2200 includes a locking mechanism that includes one or more of a set of elements configured to engage with complementary locking pins (e.g., locking pin(s) 1912 in the cover 104 of the male connector 234. The set of elements includes an opening 2210 for the locking pin to enter, a channel 2212 for guiding the locking pin to a pin reservoir, and a reservoir 2214 for receiving the locking pin.

In some implementations, there is one set of these elements per locking pin in the cover 1904; each locking pin 1912 corresponds to and is complementary to one of these sets. In some implementations, the path of the channel 2212 is angled substantially toward the middle/rear of the female connector 2200 (e.g., as shown in FIG. 22B); the channel 2212 directs the locking pin 1912 toward the rear of the female connector 2200 to provide pressure between male connector 234 and the female connector 2200 (e.g., at the points where the male connector 234 and the female connector 2200 touch).

In the rear of the of the female connector 2200, one or more electrical leads 2216 lead into the female connector base and electrically couple to the USB receptacle 2202. In some implementations, the rear of the rear portion 2209 is lined with a water sealing compound 2218 (e.g., epoxies, silicones, urethanes).

In some implementations, the female connector 2200 is fixed to an electrical device (e.g., adapter 232, an AC/DC power converter or adapter). The female connector 2200 is partially embedded into the housing (e.g., housing 2602, FIG. 26A) of the electrical device, within which the electrical leads 2216 are electrically coupled to a DC power supply output, and the DC power supply output is electrically coupled to an AC power supply input (e.g., the DC power supply output and the AC power supply input are parts of a printed circuit board within the housing 2602 to which the electrical leads 2216 and the cable 236 are electrically coupled). Further details of this fixing are described below. In some implementations, the housing is waterproof.

Figure 25:
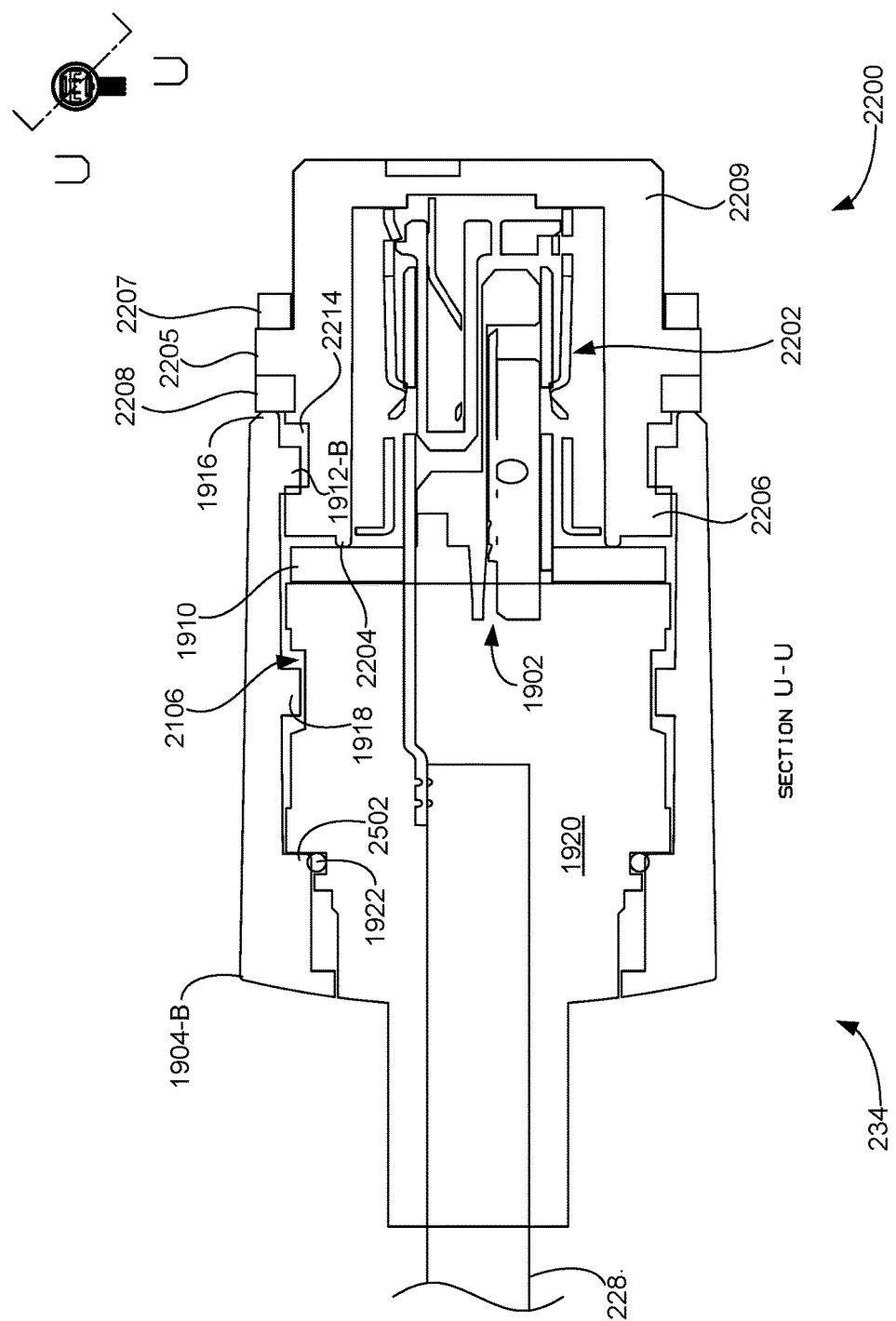
FIG. 25 illustrates a diagonal cross-sectional view of the male connector and the female connector of the waterproof electrical connector connected together, with the cover in the locked state, in accordance with some implementations.

FIGS. 24A-24B illustrate multiple perspective views of the male connector 234 and the female connector 2200 connected together and in the locked state, in accordance with some implementations. FIG. 24A is a perspective view with the rear portion 2209 of the female connector 2200 angled toward the viewer. FIG. 24A is a perspective view with the rear portion 2209 of the female connector 2200 angled away from the viewer. FIG. 25 illustrates a diagonal cross-section of the male connector 234 and the female connector 2200 connected together and in the locked state, in accordance with some implementations.

To connect the male connector 234 to the female connector 2200, the USB plug 1902 is inserted into the USB receptacle 2202. As is well-known in the art, the USB plug 1902 can fit the USB receptacle 2202 in only one orientation. With the USB plug 1902 inserted as far as possible into the USB receptacle 2202, the cover 1904 is then pushed or pulled in direction 1950 and rotated in direction 2050 (FIG. 20C). With the movement and rotation of the cover 1904, the locking pin(s) 1912 move through opening(s) 2210 into the channel(s) 2212, which guide the locking pin(s) 1912 to reservoir(s) 2214. As the cover 1904 continues rotating to reservoir(s) 2214 at angle 2004, the channel(s) 2212 facilitates further pushing of the cover 1904 in direction 1950, forcing the pressure rib 2204 to engage the gasket 1910 with pressure, forcing the lip 1916 of the cover 1904 to engage the gasket 2208 with pressure, and forcing an inner ridge 2502 of the cover 1904 to engage the O-ring 1922 with pressure. These engagements that occur when the cover 1904 is in the closed/locked state, create multiple waterproof seals around the connected male connector 234 and female connector 2200. Meanwhile, the compression resistance of the spring 1906 (not shown in FIG. 25) pushes the cover in direction 1952, which keeps the locking pin(s) 1912 restrained within reservoir(s) 2214, keeping the connectors locked to each other. Thus, as described above, the locking mechanism on the female connector 2200 and the locking pins 1912 in the male connector 234 function in a manner similar to a bayonet mount to lock the connectors together.

To release the male connector 234 from the female connector 2200, the cover 1904 is rotated in the opposite of direction 2050, from angle 2004 back to angle 2002; the locking procedure described above is reversed. As the cover 1904 is rotated, the decompression of the spring 1906 is also pushing the cover in direction 1952. Thus, the locking pin(s) 1912 move through channel 2212 back through the opening 2210, and back to the locking pin reservoir(s) 2102, restrained by backstop(s) 2104. Further, the alignment pin(s) 1918 work in conjunction with channel(s) 2106 to bound the rotation of the cover 1904 so that the locking pin(s) 1912 is aligned with angle 2002, which is a nominal position that is aligned with opening(s) 2210 on the female connector 2200.

As described above, the cover 1904 in the closed state facilitates waterproofing of the connection between the male connector 234 and the female connector 2200. It should be appreciated, however, that the USB plug 1902 may still be plugged into the USB receptacle 2202 with the cover 1904 remaining in the opened state (e.g., when waterproofing is not necessary). This allows the male connector 234 to engage with conventional female connectors (e.g., female connectors without the locking mechanism).

In some implementations, the implementations described herein are also applicable to provide sealing to non-electronic devices. As the sealing provided by the implementations described herein are pressure-tight (i.e., under pressure), the implementations may also be used to provide sealing for low pressure fluids like compressed air or liquid coupling.

Outdoor Electrical Device Mounting Structure

Figure 26A:
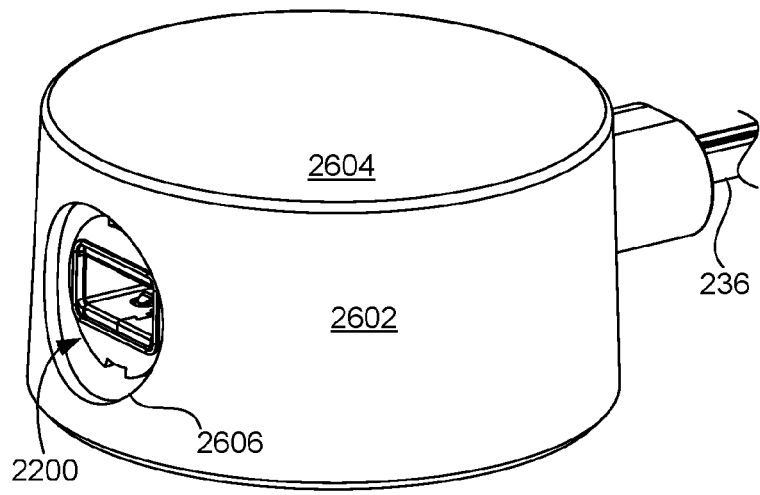
FIGS. 26A-26B and 27A-27D illustrate multiple views of an outdoor AC/DC power converter or adapter, in accordance with some implementations.
Figure 26B:
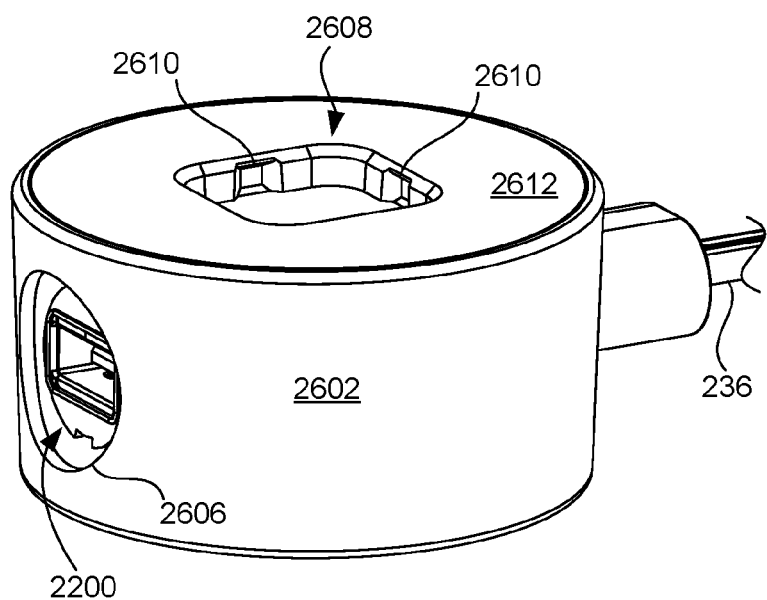
Figure 27A:
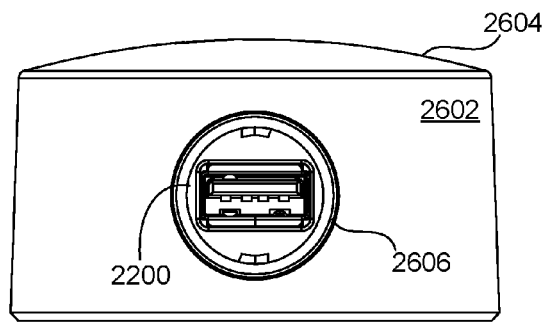
Figure 27B:
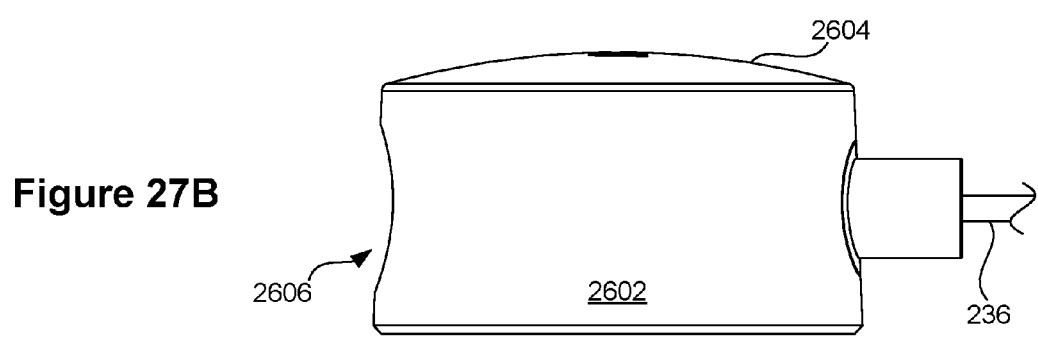
Figure 27C:
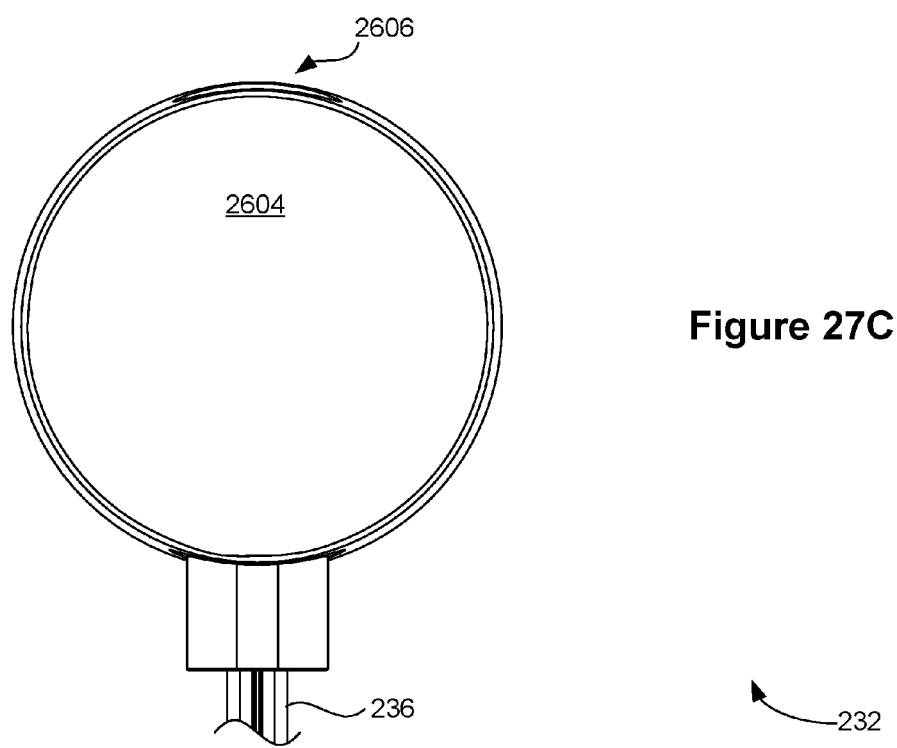
Figure 27D:
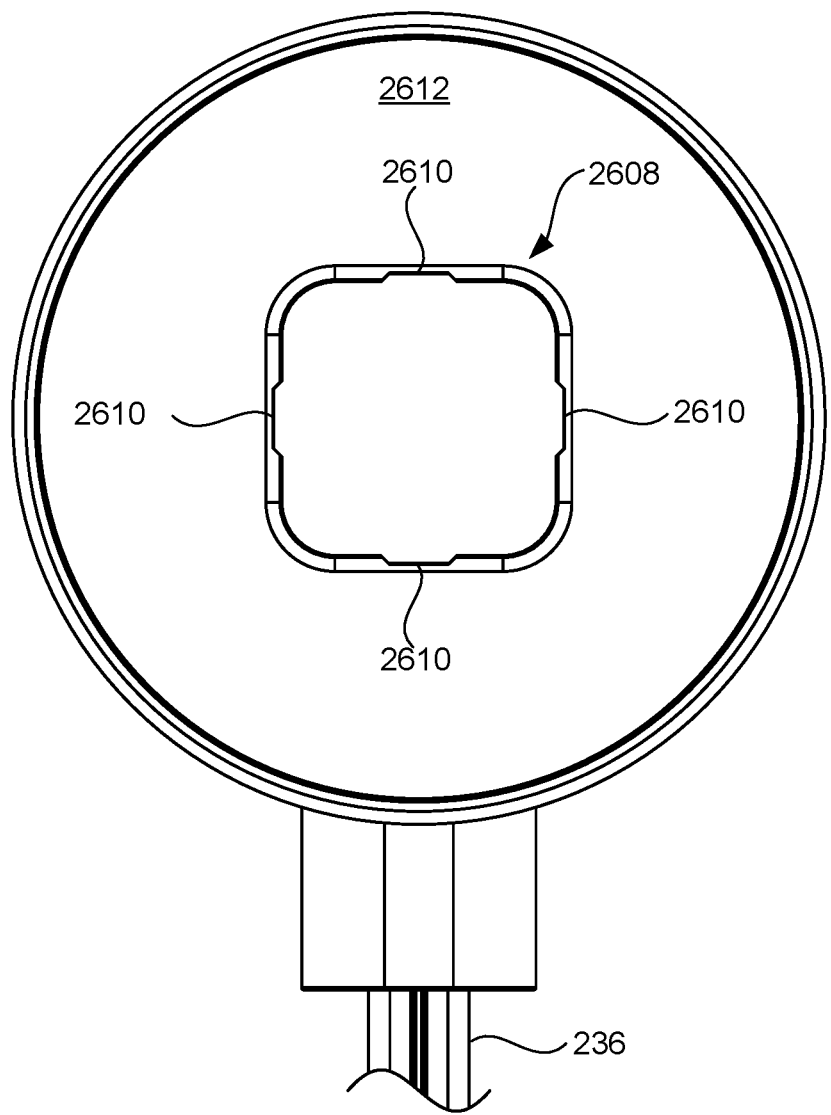

FIGS. 26A-27D illustrate multiple views of the adapter 232 in accordance with some implementations. FIG. 26A illustrates a perspective view of the adapter 232 with the top side up. FIG. 26B illustrates a perspective view of the adapter 232 with the bottom side up. FIG. 27A illustrates an end view of the adapter 232. FIG. 27B illustrates a side view of the adapter 232. FIG. 27C illustrates a top view of the adapter 232. FIG. 27D illustrates a bottom view of the adapter 232.

The adapter 232 includes a base housing 2602 that houses the electrical components of the adapter 232. The top of the base housing 2602 is covered by a top cover 2604. In some implementations, the top cover 2604 is coupled to the base housing 2602 using ultrasonic welding techniques. In some implementations, the coupling of the top cover 2604 to the base housing 2602 is waterproof due to the ultrasonic welding and a gasket (not shown) at the edge of the housing 2602 configured to engage with the edge of the top cover 2604. The cable 236 leads into the base housing 2602, where the cable 236 is electrically coupled to the electrical components of the adapter 232.

In some implementations, the adapter 232 is an AC to DC power converter. The adapter 232 includes an AC power supply input and a DC power supply output. It should be appreciated that the housing 2602 can contain any sort of electrical device that is supplied by an AC power supply and provides a DC and/or data output over a connector. In some implementations, the housing 2602 is weather resistant in accordance with an industrial standard (e.g., IP Code, National Electrical Manufacturers Association (NEMA)).

In some implementations, the cable 236 is electrically coupled to the electrical components of the adapter 232 (e.g., the AC power supply input) such that the coupling is a fixed and waterproof connection (i.e., the cable 236 is permanently attached to the adapter 232 and not intended for removal from the adapter 232). For example, the area where the cable 236 enters into the housing 2602 includes waterproof sealing. The electrical leads of the cable 236 is fixed (e.g., soldered), within the housing 2602, to a circuit (e.g., a printed circuit board) that serves as the AC power supply input.

The base housing 2602 includes a recessed area 2606 configured to hold a female connector 2200. The back of the recessed area has an opening (not shown) to the interior of the housing 2602. The rear portion 2209 of the female connector 2200 is positioned within the interior of the housing 2602 through the opening in the back of the recessed area 2606, and that opening is sealed by the gasket 2207. The remainder of the female connector 2200 (e.g., the front portion 2206 and the middle portion 2205) is within the recessed area 2606 but still exposed to external environmental conditions when not connected to a male connector 234. The diameter of the recessed area 2606 is sufficiently large to receive the male connector 234 (e.g., the diameter of the recessed area 2606 is larger than the diameter of the cover 1904) for connection with the female connector 2200 and for at least a portion of the connected male connector 234 to be within the recessed area 2606.

The bottom 2612 of the base housing 2602 includes a receiving fastener structure 2608 configured to receive a protruding fastener structure, on a mounting plate, complementary to the receiving fastener structure 2608 (further details of which are described below). The receiving fastener structure receptacle 2608 is recessed into the bottom 2612 surface of the base housing 2602. In some implementations, the receiving fastener structure 2608 has a substantially polygonal (e.g., rectangular, square, triangular, hexagonal, etc.) cross-sectional profile, and may have rounded or sharp corners. For example, the receiving fastener structure 2608, as shown in FIGS. 26B and 27D, is substantially rectangular shaped (or more precisely, substantially square shaped).

The receiving fastener structure 2608 includes two or more retaining members 2610. The retaining members 2610 grip to respective snapping members on the protruding fastener structure to secure the adapter 232 to the mounting plate. The protruding fastener structure has as many snapping members as the receiving fastener structure 2608 has retaining members 2610. In some implementations, the receiving fastener structure 2608 includes a number of retaining members in accordance with the polygonal cross-sectional profile of the receiving fastener structure 2608. For example, if the cross-sectional profile is rectangular/square, the receiving fastener structure 2608 has four retaining members 2610, one for each side of the rectangular/square cross-sectional profile. If the cross-sectional profile is triangular, the receiving fastener structure 2608 has three retaining members 2610, one for each side of the triangular cross-sectional profile. For a side of the cross-sectional profile, the corresponding retaining member 2610 is located at substantially the center of the side.

Figure 28B:
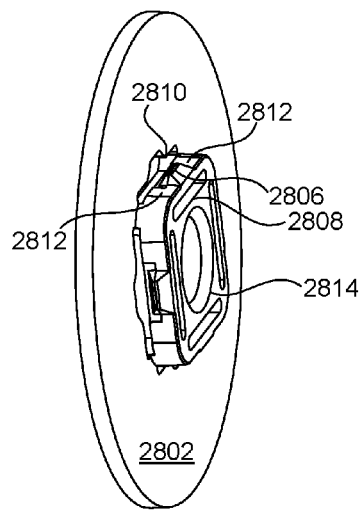
FIGS. 28A-28E illustrate multiple views of a mounting plate for mounting an outdoor AC/DC power converter, in accordance with some implementations.
Figure 28A:
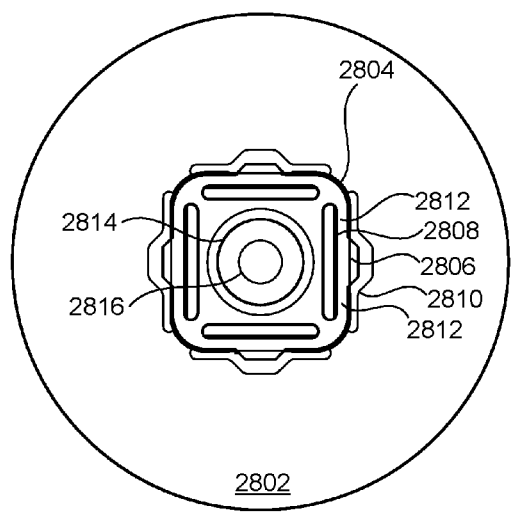
Figure 28D:
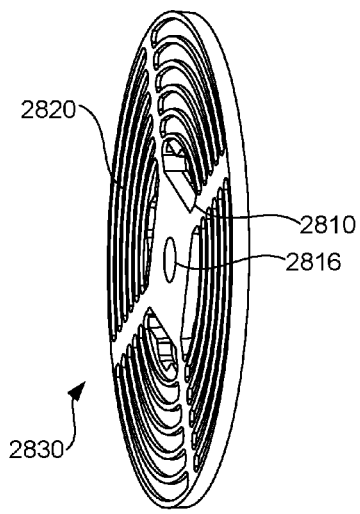
Figure 28C:
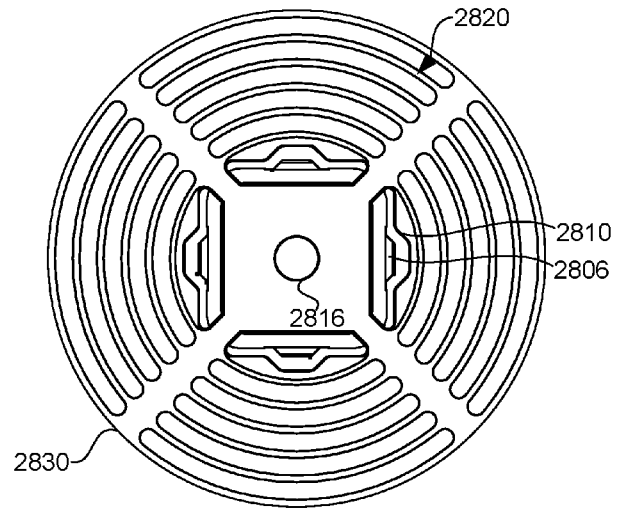
Figure 28E:
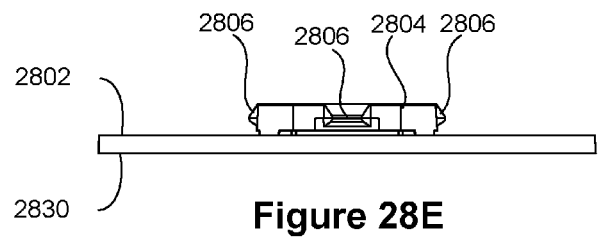

FIGS. 28A-28E illustrate multiple views of a mounting plate 2800 for mounting the adapter 232 to a surface, in accordance with some implementations. FIG. 28A is a top view of the mounting plate 2800. FIG. 28B is a perspective view of the top of the mounting plate 2800. FIG. 28C is a bottom view of the mounting plate 2800. FIG. 28D is a perspective view of the bottom of the mounting plate 2800. FIG. 28E is a side view of the mounting plate 2800.

The mounting plate 2800 includes a top surface 2802, from which protrudes a protruding fastener structure 2804 centered on the top surface 2802 of the mounting plate 2800. The protruding fastener structure 2804 is complementary to the receiving fastener structure 2608. The protruding fastener structure 2804 includes a number of a set of elements. The set of elements include a snapping member 2806 connected (e.g., integrated) to the protruding fastener structure 2804 by flexible portions 2812, and a flex space 2808 cut into the protruding fastener structure 2804. The flex space 2808 enables the snapping member 2806 to flex into and out of the flex space 2808. A hole or space 2810 cut into the mounting plate 2800 also accompanies the set of elements. This set of elements is complementary to a retaining member 2610 on the receiving fastener structure 2608. In some implementations, there are as many of these sets of elements as there are retaining members 2610 on the receiving fastener structure 2608.

The snapping member 2806, connected to protruding fastener structure 2804 by flexible portions 2812, is configured to flex into and out of the flex space 2808 when the adapter 232 and the mounting plate 2800 are snapped together or are separated (e.g., the snapping member 2806 is pushed into flex space 2808 by the retaining member 2610 when the adapter 232 and the mounting plate 2800 are snapped together or are separated). In some implementations, the retaining members 2610 and the snapping members 2806 are tooth-like; the retaining member 2610 grips the snapping member 2806, thus facilitating securing of the adapter 232 to the mounting plate 2800. In some implementations, the fastener structures 2608 and 2804 provide sufficient tension to safely retain the adapter 232 to the mounting plate 2800 mounted to a wall while being separable by a force than can be applied by hand.

The protruding fastener structure 2804 also includes a well 2814. In the middle of the well is a through hole 2816 that goes through to the bottom surface 2830 of the mounting plate 2800. In some implementations, the diameter of the through hole 2816 is substantially less than the diameter of the well 2814. The through hole 2816 serves as a fastener hole for coupling a fastener (e.g., a screw, a nail) to the mounting plate 2800 to secure the mounting plate 2800 to a surface (e.g., a wall); the fastener head (e.g., screw head) pushes on the bottom surface of the well 2814.

The bottom surface 2830 of the mounting plate 2800 includes a pattern of grooves or ridges 2820. The grooves 2820 are configured to touch the wall when the mounting plate 2800 is secured to the wall, and can provide additional stability to the mounting plate 2800 against the wall. In some implementations, the grooves 2820 follow a concentric pattern (e.g., as shown in FIGS. 28C-28D). In some implementations, the outer ring(s) of the grooves/ridges 2820 project further than the inner ring(s) to promote more stable mounting on uneven surfaces.

In some implementations, the mounting plate 2800 includes a raised ridge ring (not shown) on the top surface 2802 that is concentric with the circumference of the mounting plate 2800 and situated around the protruding fastener structure 2804; the raised ridge ring is configured to touch the adapter 232 when the adapter 232 is secured to the mounting plate 2800 to provide additional stability.

Figure 29A:
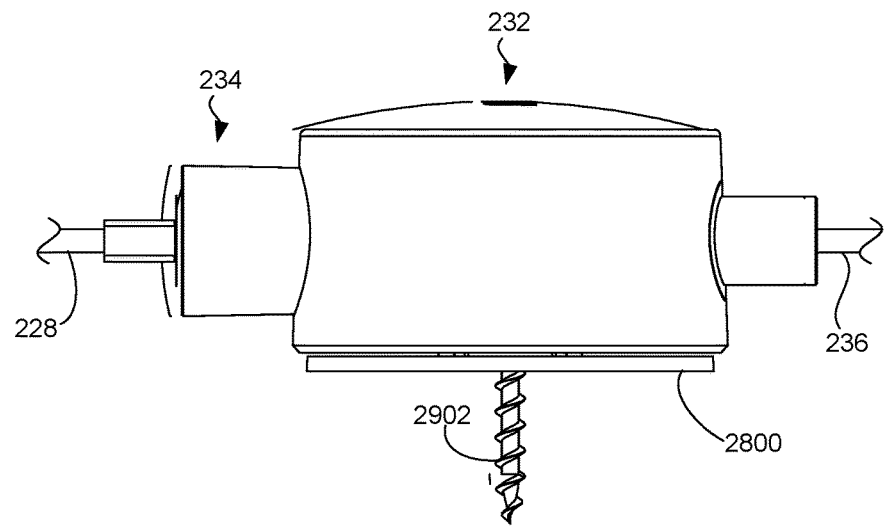
FIGS. 29A-29B and 30A-30D illustrate multiple views of the outdoor AC/DC power converter coupled to a mounting plate and with male and female connectors connected, in accordance with some implementations.
Figure 29B:
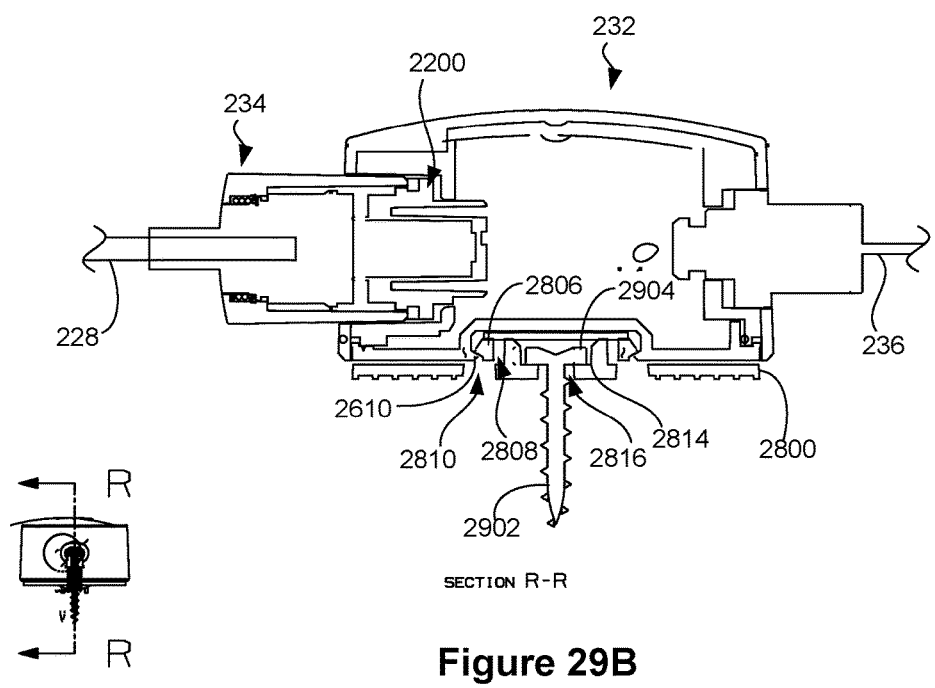

FIGS. 29A-30D illustrate multiple views of the adapter 232 coupled (e.g., secured) to the mounting plate 2800, and with the male connector 234 and the female connector 2200 connected and in the locked state, in accordance with some implementations. FIG. 29A is a side view of the coupled and connected adapter 232. FIG. 29B is a side cross-sectional view of the coupled and connected adapter 232. FIG. 30A is a perspective view of the coupled and connected adapter 232, with the cable 228 angled toward the viewer.

Figure 30A:
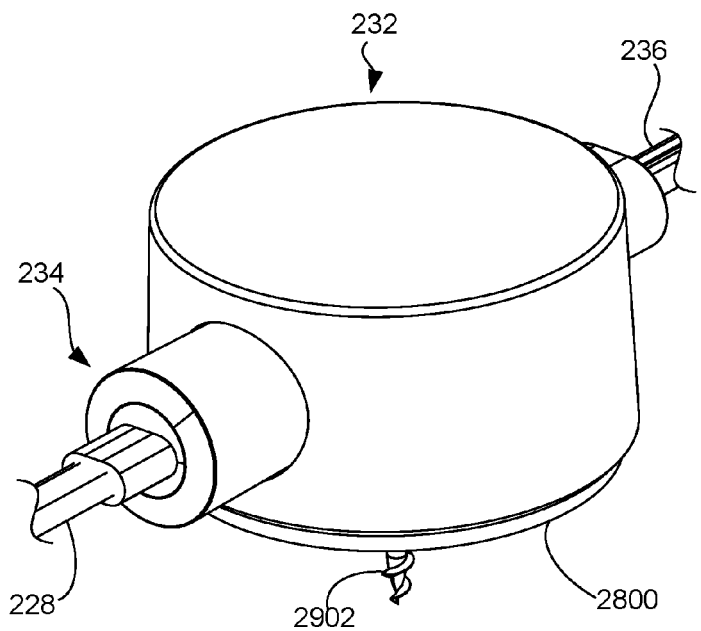
Figure 30B:
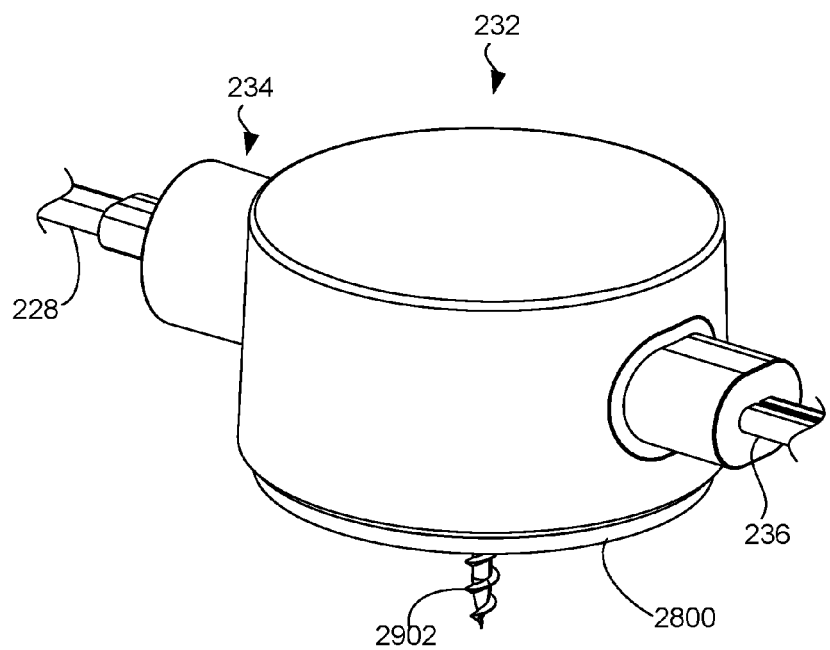
Figure 30D:
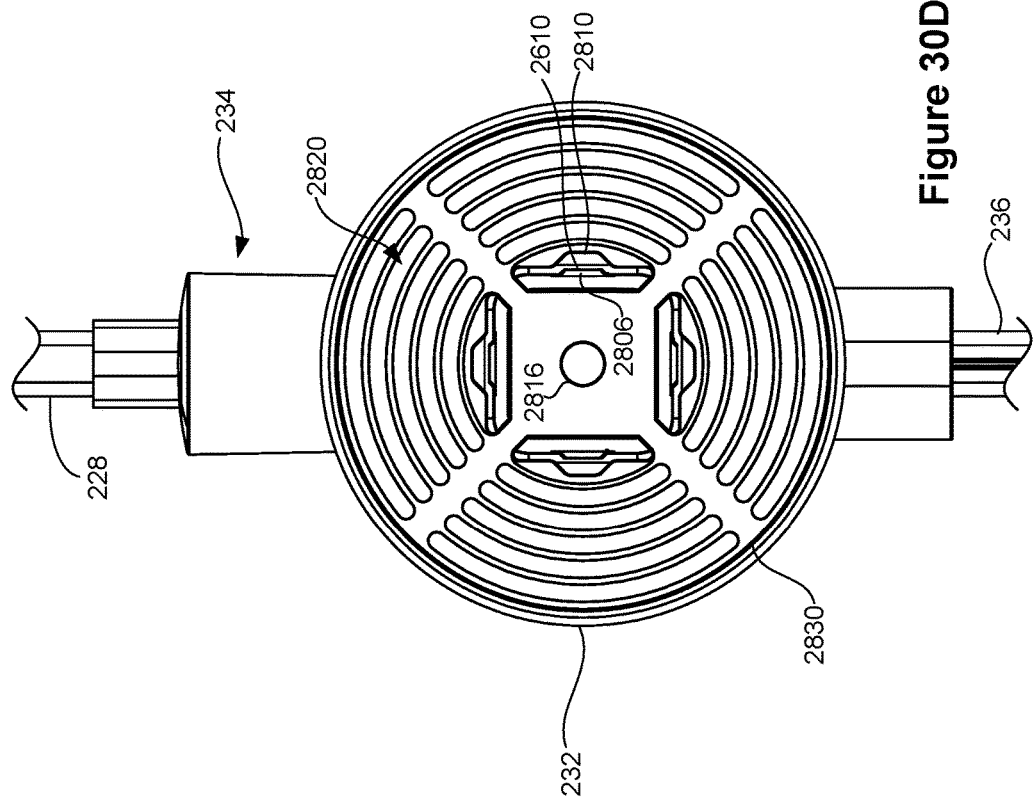
Figure 30C:
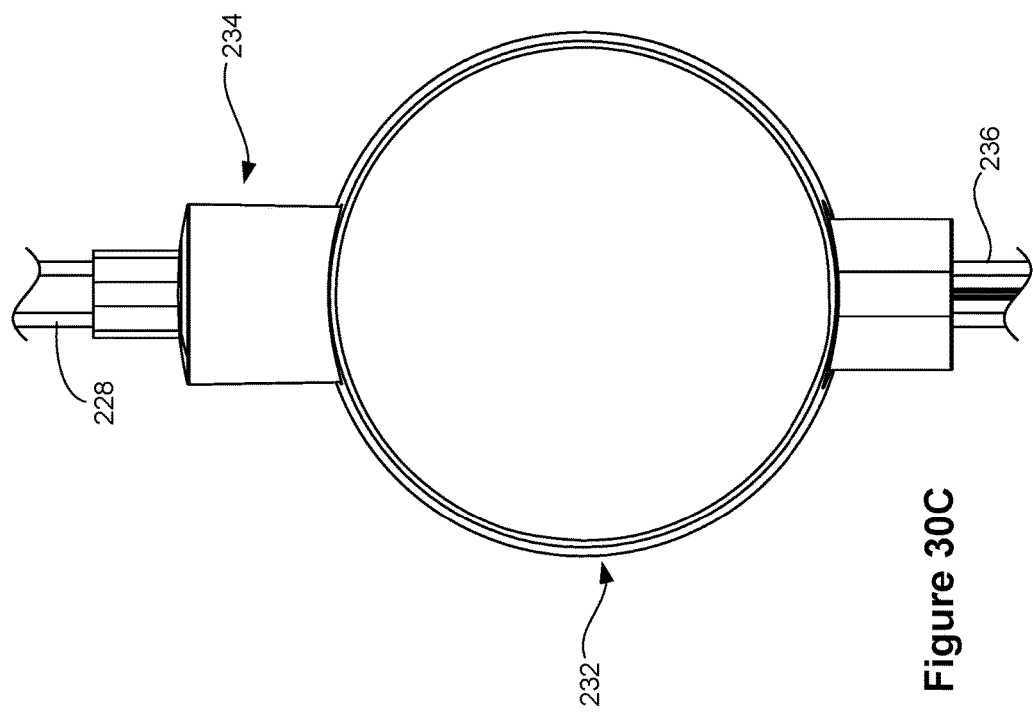

FIG. 30B is a perspective view of the coupled and connected adapter 232, with the cable 228 angled away from the viewer. FIG. 30C is a top view of the coupled and connected adapter 232. FIG. 30D is a bottom view of the coupled and connected adapter 232, with the mounting fastener omitted.

The mounting plate 2800 is mounted to a surface (e.g., a wall, not shown) by first inserting a fastener (e.g., screw 2902) through the hole 2816 of the mounting plate and tightening the screw 2902 on the wall, such that the screw head 2904 pushes against the bottom surface of the well 2814, thus pushing the mounting plate 2800 against the wall and securing the mounting plate 2800 to the wall. The adapter 232 is snapped onto the mounting plate 2800 by aligning the receiving fastener structure 2608 (FIG. 26B) with the protruding fastener structure 2804 and "inserting" the protruding fastener structure 2804 into the receiving fastener structure 2608, such that the tooth-like retaining members 2610 grip the tooth-like snapping members 2806.

Figure 31:
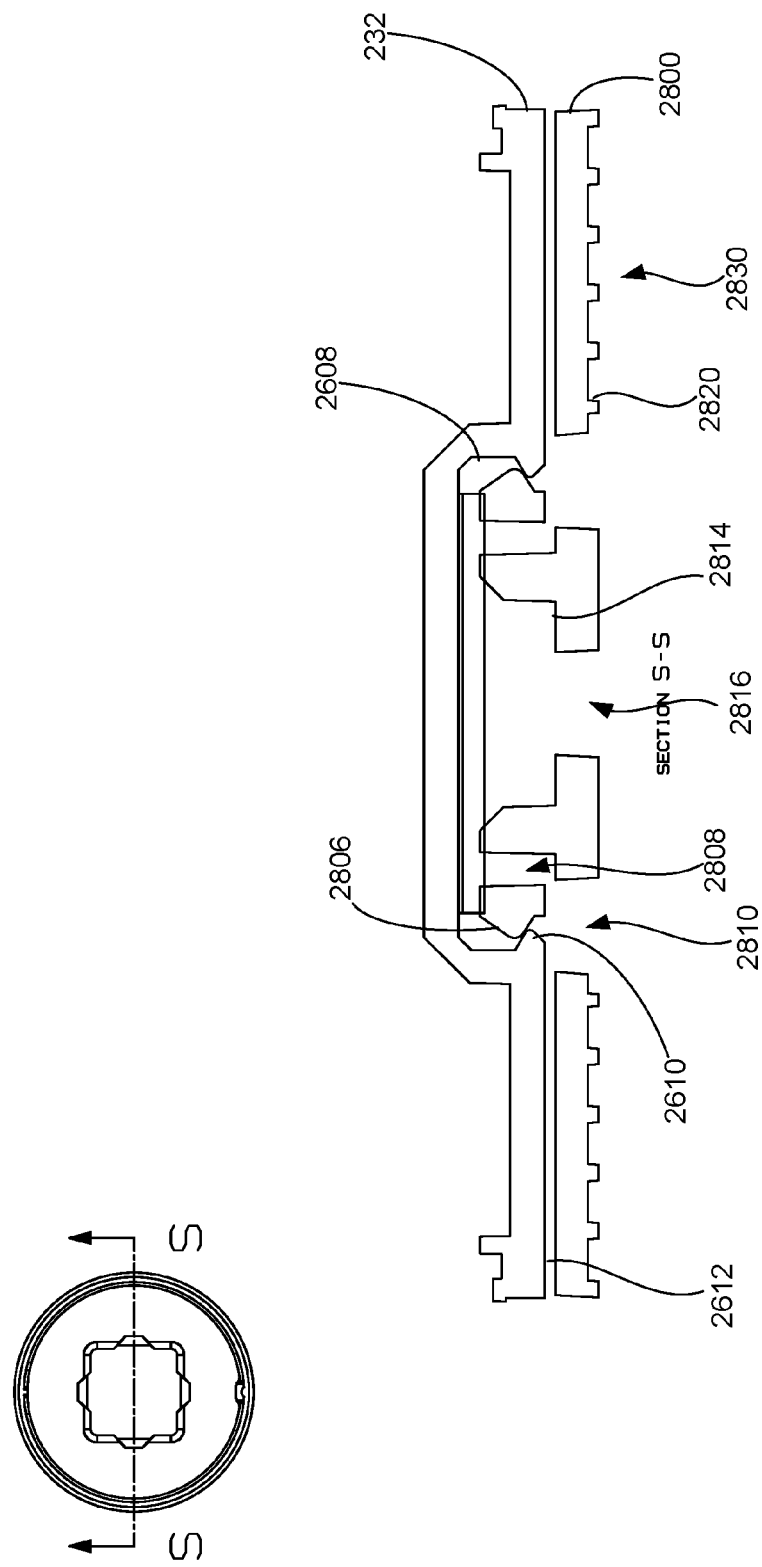
FIG. 31 illustrates a portion of cross-sectional view of an outdoor AC/DC power converter coupled to a mounting plate, in accordance with some implementations.

FIG. 31 illustrates a cross-sectional view of the adapter 232 coupled to the mounting plate 2800, focusing on the bottom surface 2612 of the adapter 232 and the mounting plate 2800, in accordance with some implementations. As shown in FIG. 31, the retaining member 2610 of the receiving fastener structure 2608 grips the snapping member 2806. The snapping member 2806 is configured to flex into a position to grip the retaining member 2610 by flexing into the flex space 2808 when pushed by the incoming retaining member 2806 and then rebounding when able.

Further, FIG. 31 shows a cross-section of the grooves/ridges 2820 on the bottom surface 2830 of the mounting plate 2800, and that the through hole 2816 has a smaller diameter than the well 2814.

While the adapter 232 is coupled to a mounting plate 2800 that is secured to a surface (e.g., a wall), the adapter-mounting plate unit may be rotated about an axis (e.g., an axis running through the through hole 2816 and parallel to the mounting fastener) with an unlimited range of rotation. The grooves/ridges 2820 provide substantially consistent resistance through the range of rotation.

Cable Clip for Securing Outdoor Cable

Figure 32D:
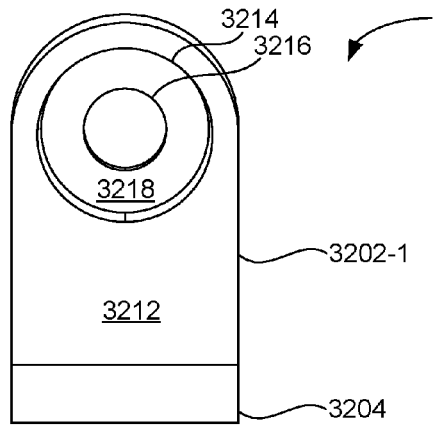
FIGS. 32A-32G illustrate multiple views of a cable clip in the open position, in accordance with some implementations.
Figure 32A:
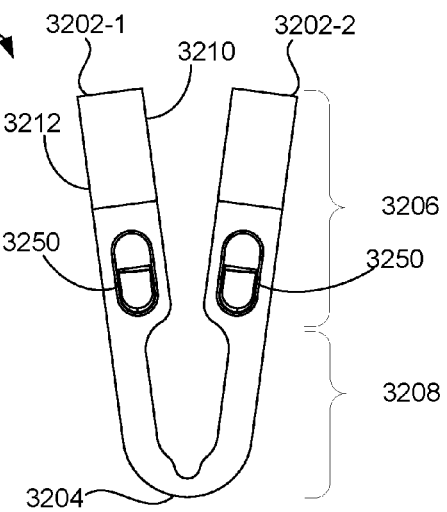
Figure 32E:
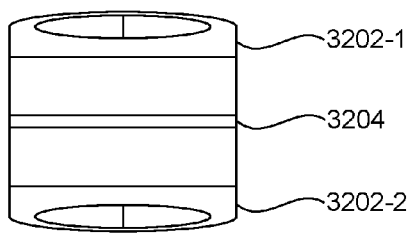
Figure 32B:
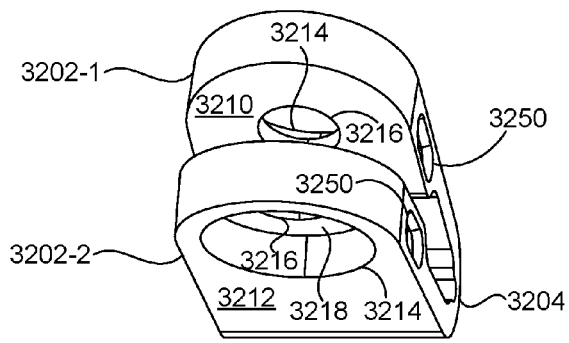
Figure 32F:
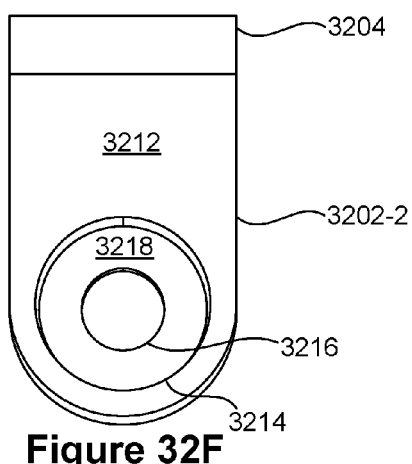
Figure 32G:
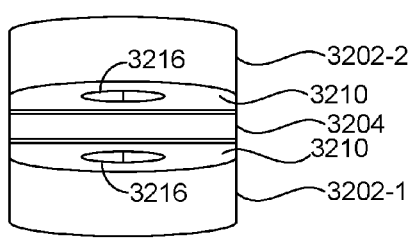
Figure 32C:
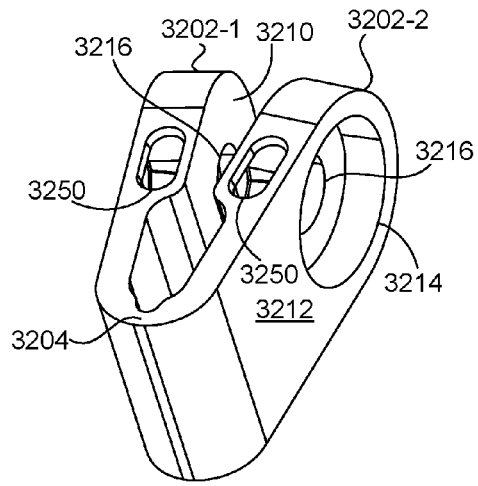

FIGS. 32A-32G illustrate multiple views of a cable clip 230 (e.g., cable clip 514, FIG. 5A et al.) in an open state or position, in accordance with some implementations. FIG. 32A illustrates a side view of the cable clip 230. FIGS. 32B-32C illustrate multiple perspective views of the cable clip 230. FIG. 32D is a top view of the cable clip 230, and FIG. 32F is a bottom view of the cable clip 230. FIG. 32E is an end view of the cable clip 230 viewed from a flexion point of the cable clip 230 toward the open end, and FIG. 32G is an end view of the cable clip 230 viewed from the open end toward the flexion point.

The cable clip 230 is made (e.g., molded) from a single piece of flexible material and includes two opposing "fingers" 3202-1 and 3202-2. The fingers 3202 are joined at a flexion joint 3204. In some implementations, the single piece of material is bent in half to form the fingers 3202, and the bending point forms the flexion joint 3204. In some implementations, the cable clip 230 is waterproof (e.g., coated with a waterproof coating). In some implementations, the fingers 3202-1 and 3202-2 are substantially symmetrical.

Thus, details regarding the fingers 3202 described below apply equally to both fingers.

Each of the two fingers 3202 includes a peripheral portion 3206 at the open end of the cable clip 230. Going from the open end of the cable clip 230 towards the flexion joint 3204, the peripheral portion 3206 tapers into an inner portion 3208 that is continuous with the peripheral portion 3206; the peripheral portion 3206 is thicker than the inner portion 3208 due to the tapering. The flexion joint 3204 connects the inner portions 3208 of the fingers 3202.

In some implementations, when the cable clip 230 is held in the open position, the fingers 3202 and the flexion joint 3204 form a "V" shape (e.g., as shown in FIG. 32A) and the "V" shape is configured to hold an opening angle that is substantially less than 90 degrees.

For each of the two fingers 3202, the peripheral portion 3206 includes an inner surface 3210 facing the interior of the cable clip 230 and an outer surface 3212 facing the exterior of the cable clip 230. In some implementations, the inner surface 3210 and the outer surface 3212 of a finger 3202 are substantially parallel to each other.

Each of the two fingers 3202 includes a well 3214 recessed at the outer surface 3212 into the finger 3202. The well 3214 includes a surface 3218 located at the "bottom" of the well 3214. In some implementations, the surface 3218 is substantially parallel with the outer surface 3212 and/or the inner surface 3210. The finger 3202 also includes a through hole 3216 that goes through the finger 3202 substantially perpendicularly with respect to the surface 3218 of the well 3214 and the inner surface 3210 of the finger 3202. The through hole 3216 has a smaller diameter than the well 3214 and is concentric with the well 3214. In some implementations, the through hole 3216 has a smooth surface.

The cable clip 230 is configured to be held in the open position when not under tension, i.e., when there is no force applied to the peripheral portion 3206 of either finger 3202 at the outer surface 3212 or at the surface 3218 of the well 3214 toward the peripheral portion 3206 of the opposing finger. The cable clip 230 is configured to be held in the closed position when under sufficient tension, i.e., when there is a force applied to the peripheral portion 3206 of either finger 3202 at the outer surface 3212 or at the surface 3218 of the well 3214 toward the peripheral portion 3206 of the opposing finger such that the inner surfaces 3210 of the peripheral portions 3206 touch each other.

As noted above, the inner portion 3208 of a finger 3202 is tapered from the peripheral portion 3206 of the finger. When the cable clip 230 is in the open position, the cable 228 may be slipped through the opening between the fingers 3202 at the open end of the cable clip 3202, toward the tapered inner portions 3208; the cable clip 230 wraps around the cable 228 at the space between the inner portions 3208. When the cable clip 230 is in the closed position, the tapered inner portions 3208 form a space 3302 (FIGS. 33A and 33C) at the interior of the cable clip 230 for the cable 228 to run through. In some implementations, when in the open position, the fingers 3202 wrap loosely around the cable 228 (e.g., at the space between the inner portions 3208), thus allowing the cable clip 230 to be moved along the length of the cable 228 or vice versa.

FIGS. 33A-33C illustrate multiple views of the cable clip 230 in the closed position, in accordance with some implementations. FIG. 33A illustrates a side view of the cable clip 230. FIG. 33B illustrates a top view of the cable clip 230 FIG. 33C illustrates a perspective view of the cable clip 230.

When the cable clip 230 is under tension (e.g., due to a force applied to a peripheral portion 3206 toward the opposite peripheral portion 3206), the cable clip 230 is held in the closed position, such that the fingers 3202 come together and the inner surfaces 3210 of the peripheral portions 3206 touch. In some implementations, the inner surfaces 3210 of the peripheral portions 3206 are substantially flat, and are substantially flush with each other when touching (as shown in FIGS. 33A and 33C).

While the cable clip 230 is held in the closed position, the through holes 3216 of the two fingers 3202 align, forming a fastener hole through the cable clip 230 for receiving a fastener (e.g., a screw, a nail) for securing the cable clip 230 to a mounting surface (e.g., a wall); the fastener hole acts as the screw hole of the cable clip 230. When the cable clip 230 is secured to the wall by the fastener, one finger 3202 is touching the wall and the other finger 3202 is opposite the wall. When the cable clip 230 is secured to the wall by the fastener, the cable clip 230 is held in the closed position by the head of the fastener (e.g., the screw head) pushing the surface 3218 of the well 3214 of the finger 3202 opposite of the wall towards the wall and the other finger 3202, where the diameter of the fastener head is substantially larger than the diameter of the through holes 3216 (but still less than the diameter of the well 3214. In some implementations, the fastener head (e.g., the screw head) is a special tamper-proof head that requires a specific tool for installation/removal, to help deter improper removal (e.g., theft).

It should be appreciated that because the cable clip 230 is substantially symmetrical, the cable clip 230 may be mounted to the wall such that either finger 3202 is touching the wall and the other finger 3202 is opposite the wall.

In some implementations, the outer surfaces 3212 of the fingers 3202 are substantially flat. When the cable clip 230 is secured to the wall, either outer surface 3212 is configured to touch then wall.

When the cable clip 230 is in the closed position, the tapered inner portions 3208 form a space 3302 at the interior of the cable clip 230 for the cable 228 to run through. The touching inner surfaces 3210 of the fingers 3202, the inner portions 3208, and the flexion joint 3204 enclose the space 3302. In some implementations, the inner portions 3208 conform to the cross-sectional profile of the cable 228, where the cable 228 is of predetermined thickness and cross-sectional profile. Thus, the space 3302 formed by the inner portions 3208 follow the contours of the cross-sectional profile of the cable 228; the space 3302 is shaped to fit the cable 228.

In some implementations, mounting the camera 118 to a mounting surface (e.g., a wall) includes securing the cable 228 extending from the camera 118 to the wall using one or more cable clips 230. If using multiple cable clips 230, the cable clips 230 may be arranged along the length of the cable 228 at intervals of equal or different lengths. In some implementations, the cable clip 230 to be arranged closest to the camera 118 on the cable is arranged less than or equal to 12 inches from the camera 118. In some implementations, the cable clip 230 closest on the cable 228 to the camera 118 is configured to prevent the camera 118 from falling to the ground when the camera 118 becomes detached from the wall; the cable clip 230 closest to the cable 228 on the camera 118 is the first to bear the weight of the camera 118 when the camera 118 becomes detached from the wall. In some implementations, the cable clip 230, when secured to the wall, has a retention force (e.g., at least 50 newtons in any direction from the center of mass) sufficient to hold the weight of the camera 118 when the camera 118 is detached from the wall. The cable clips 230 also provide a measure of security to prevent easy removal of the camera 118 from its mounted position due to the fixed attachment in some implementations between the camera 118 and the cable 228 secured by the cable clips 230.

After inserting the cable 228 between the peripheral portions 3206 of a cable clip 230 and into the space between the inner portions 3208, the cable clip 230 is secured to the wall by inserting a fastener (e.g., a screw, a nail) through the aligned through holes 3216 of the peripheral portions 3206, and securing the fastener to the wall. The fastener head (e.g., screw head) pushes the surface 3218 of the well 3214 of the peripheral portion 3206 opposite the wall, and thus pushes the cable clip 230 towards the wall, securing the fastener to the wall. While the cable clip 230 is secured to the wall, the cable 228 goes through the space 3302 formed by the inner portions 3208 of the touching fingers 3202. The space 3302 conforms to the contours of the cross-sectional profile of the cable 228. For example, as shown in FIG. 33A, in some implementations, the space 3302 is more elongated, to accommodate a cable 228 with a flatter cross-sectional profile. In some other implementations, the space 3302 is more circular or rounded, for a cable 228 with a circular cross-sectional profile.

In some implementations, each finger 3202 includes one or more structural openings 3250. These structural openings 3250 are made during the manufacturing (e.g., molding) of the cable clip 230 to ensure consistent cooling and formation of the cable clip 230 and thus reduce cosmetic defects (e.g., sinks).

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, mechanical structures, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first surface can be termed a second surface, and, similarly, a second surface can be termed a first surface, without departing from the scope of the various described implementations. The first surface and the second surface are both surfaces, but they are not the same surface.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, components, structures and/or groups, but do not preclude the presence or addition of one or more other features, integers, steps, operations, elements, components, structures, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

It is noted that the assemblies described herein are exemplary and are not intended to be limiting. For example, any dimensions, shapes, styles, and/or materials described herein are exemplary and are not intended to be limiting. Drawings are not to scale. For brevity, features or characters described in association with some implementations may not necessarily be repeated or reiterated when describing other implementations. Even though it may not be explicitly described therein, a feature or characteristic described in association with some implementations may be used by other implementations.

What is claimed is:

1. A camera, comprising:
   a housing;
   a lens assembly for focusing light received from outside of the camera, the lens assembly being arranged at a front portion of the housing;
   a plurality of electronic components arranged at the front portion of the housing, the electronic components including:
      an image sensor coupled to receive light through the lens assembly;
      a memory for storing information;
      a processor for processing information from the image sensor; and
      a wireless communication module for wirelessly communicating with an electronic device; and
   a heat dissipation element arranged at a rear portion of the housing and located between the plurality of electronic components and a rear surface of the housing, wherein the heat dissipation element is configured to transfer heat from the plurality of electronic components to the rear portion of the housing;
   wherein:
   the heat dissipation element is enclosed within the housing of the camera and includes a plate and a heat sink;
   the heat sink is made of thermally conductive material, coupled to the plurality of electronic components to absorb the heat generated by the plurality of electronic components, and mechanically and thermally coupled to the plate to further transfer at least part of the generated heat to the plate; and
   the plate is thermally coupled between the heat sink and the rear surface of the housing and configured to spread heat generated by the plurality of electronic components and enhance dissipation of the generated heat from the heat sink to the housing, such that the heat is directed away from the front portion of the housing where optical or electrical components are located.

2. The camera of claim 1, wherein the plate includes a magnetic plate disposed inside the housing of the camera, and the magnetic plate is configured to at least partially dissipate heat generated by the plurality of electronic components and be attracted to a magnet mount that is external to the housing of the camera for mounting the camera onto a mounting surface.

3. The camera of claim 1, wherein the plate and the heat sink are integrated as one component for dissipating the heat generated by the plurality of electronic components.

4. The camera of claim 1, wherein the heat sink is configured to provide a fast path to dissipate the heat generated by the plurality of electronic components located in the front portion of the housing to the plate located in the rear portion of the housing.

5. The camera of claim 1, wherein a rear portion of the heat sink has a first shape that conforms to the plate and the rear surface of the housing.

6. The camera of claim 1, wherein the thermally conductive material of the heat sink is a non-magnetic material.

7. The camera of claim 6, wherein the heat sink is made of Aluminum and has a substantially low weight.

8. The camera of claim 1, wherein the heat sink is bonded to the plate via a thermoplastic substance that has a substantially high thermal conductivity.

9. The camera of claim 1, wherein the heat sink includes a plurality of hollow pillars configured to avoid formation of air bubbles during a casting process that creates the heat sink.

10. The camera of claim 9, wherein the plurality of hollow pillars are parallel, and extend from a front surface to a rear surface of the heat sink.

11. The camera of claim 9, wherein a respective cross section of each of the plurality of hollow pillars has one of a square, round, rectangular, and triangular shape.

12. The camera of claim 1, wherein a camera lens is exposed from a front surface of the camera, and the camera lens is fully contained within the housing, the housing having a smooth body surface mechanically coupled to the front surface.

13. A system, comprising:
    a housing;
    a plurality of electronic components arranged at a front portion of the housing, the electronic components including:
       a memory for storing information;
       a processor for processing information from the image sensor; and
       a wireless communication module for wirelessly communicating with an electronic device; and
    a heat dissipation element arranged at a rear portion of the housing and located between the plurality of electronic components and a rear surface of the housing, wherein the heat dissipation element is configured to transfer heat from the plurality of electronic components to the rear portion of the housing;
    wherein:
    the heat dissipation element is enclosed within the housing of the system and includes a plate and a heat sink;
    the heat sink is made of thermally conductive material, coupled to the plurality of electronic components to absorb the heat generated by the plurality of electronic components, and mechanically and thermally coupled to the plate to further transfer at least part of the generated heat to the plate; and
    the plate is thermally coupled between the heat sink and the rear surface of the housing and configured to spread heat generated by the plurality of electronic components and enhance dissipation of the generated heat from the heat sink to the housing, such that the heat is directed away from the front portion of the housing where optical or electrical components are located.

14. The system of claim 13, wherein the heat dissipation element is disposed between the rear surface of the housing and a printed circuit board (PCB) on which at least a subset of the plurality of electronic components are mounted, thereby facilitating heat transfer from the front portion of the housing to the rear portion of the housing.

15. The system of claim 14, wherein a rear portion of the heat dissipation element has a first shape that conforms to the rear surface of the housing, and a front portion of the heat dissipation element has a second shape that conforms to a rear surface of the PCB.

16. The system of claim 13, wherein the housing has a smooth body surface, and the smooth body surface is coated with matte material configured to protect the smooth body surface from ultraviolet light incident thereon, and avoid a change of color of the smooth body surface of the housing of the system.

17. The system of claim 13, wherein the system includes an outdoor camera that is mounted and applied for outdoor surveillance.

18. A physical module, comprising:

a housing;

a lens assembly for focusing light received from outside of the physical module, the lens assembly being arranged at a front portion of the housing;

a plurality of electronic components arranged at the front portion of the housing, the electronic components including:

an image sensor coupled to receive light through the lens assembly;

a memory for storing information;

a processor for processing information from the image sensor; and a wireless communication module for wirelessly communicating with an electronic device; and a heat dissipation element arranged at a rear portion of the housing and located between the plurality of electronic components and a rear surface of the housing, wherein the heat dissipation element is configured to transfer heat from the plurality of electronic components to the rear portion of the housing;

wherein:

the heat dissipation element is enclosed within the housing of the physical module and includes a plate and a heat sink;

the heat sink is made of thermally conductive material, coupled to the plurality of electronic components to absorb the heat generated by the plurality of electronic components, and mechanically and thermally coupled to the plate to further transfer at least part of the generated heat to the plate; and the plate is thermally coupled between the heat sink and the rear surface of the housing and configured to spread heat generated by the plurality of electronic components and enhance dissipation of the generated heat from the heat sink to the housing, such that the heat is directed away from the front portion of the housing where optical or electrical components are located.

19. The physical module of claim 18, wherein the plate includes a magnetic plate disposed inside the housing of the camera, and the magnetic plate is configured to at least partially dissipate heat generated by the plurality of electronic components and be attracted to a magnet mount that is external to the housing of the camera for mounting the camera onto a mounting surface.

20. The physical module of claim 18, wherein the heat sink is configured to provide a fast path to dissipate the heat generated by the plurality of electronic components located in the front portion of the housing to the plate located in the rear portion of the housing.

* * * * *